(12) United States Patent
Takahashi

(10) Patent No.: US 7,130,082 B2
(45) Date of Patent: Oct. 31, 2006

(54) IMAGE PROCESSING APPARATUS AND METHOD

(75) Inventor: Hiroyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/704,804

(22) Filed: Nov. 12, 2003

(65) Prior Publication Data

US 2004/0095591 A1 May 20, 2004

Related U.S. Application Data

(62) Division of application No. 09/141,417, filed on Aug. 27, 1998, now Pat. No. 6,697,167.

(30) Foreign Application Priority Data

Aug. 29, 1997 (JP) .................................. 9-234757
Aug. 7, 1998 (JP) ................................. 10-224647

(51) Int. Cl.
*H04N 1/46* (2006.01)
(52) U.S. Cl. ........................ 358/2.1; 358/504
(58) Field of Classification Search ................ 358/1.9, 358/2.1, 500–504, 400, 406; 382/162–167
See application file for complete search history.

(56) References Cited

U.S. PATENT DOCUMENTS

| | | | | |
|---|---|---|---|---|
| 5,493,321 A | * | 2/1996 | Zwadlo | ........................ 347/131 |
| 5,553,200 A | | 9/1996 | Accad | ........................ 358/1.15 |
| 5,760,913 A | * | 6/1998 | Falk | ........................... 382/167 |
| 5,936,741 A | | 8/1999 | Burns | ........................ 358/1.9 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

Variations of image density and gradation reproducibility upon image formation include short-term variations resulting from variations of apparatus environments, and long-term variations resulting from aging of the photosensitive bodies and toners. In order to standardize the density and gradation reproducibility of a copy image and print image, these variations must be corrected together. For this purpose, test print 1 is formed (S101), a correction coefficient ka of the contrast potential for image formation is optimized based on density information obtained in step S102 (S103), and the grid potential and developing bias potential are set to obtain the contrast potential (S104). Test print 2 is formed (S105), the relationship between the laser output and density is calculated from density information obtained in step S106 (S107), and gamma conversion characteristics are set (S108).

6 Claims, 43 Drawing Sheets

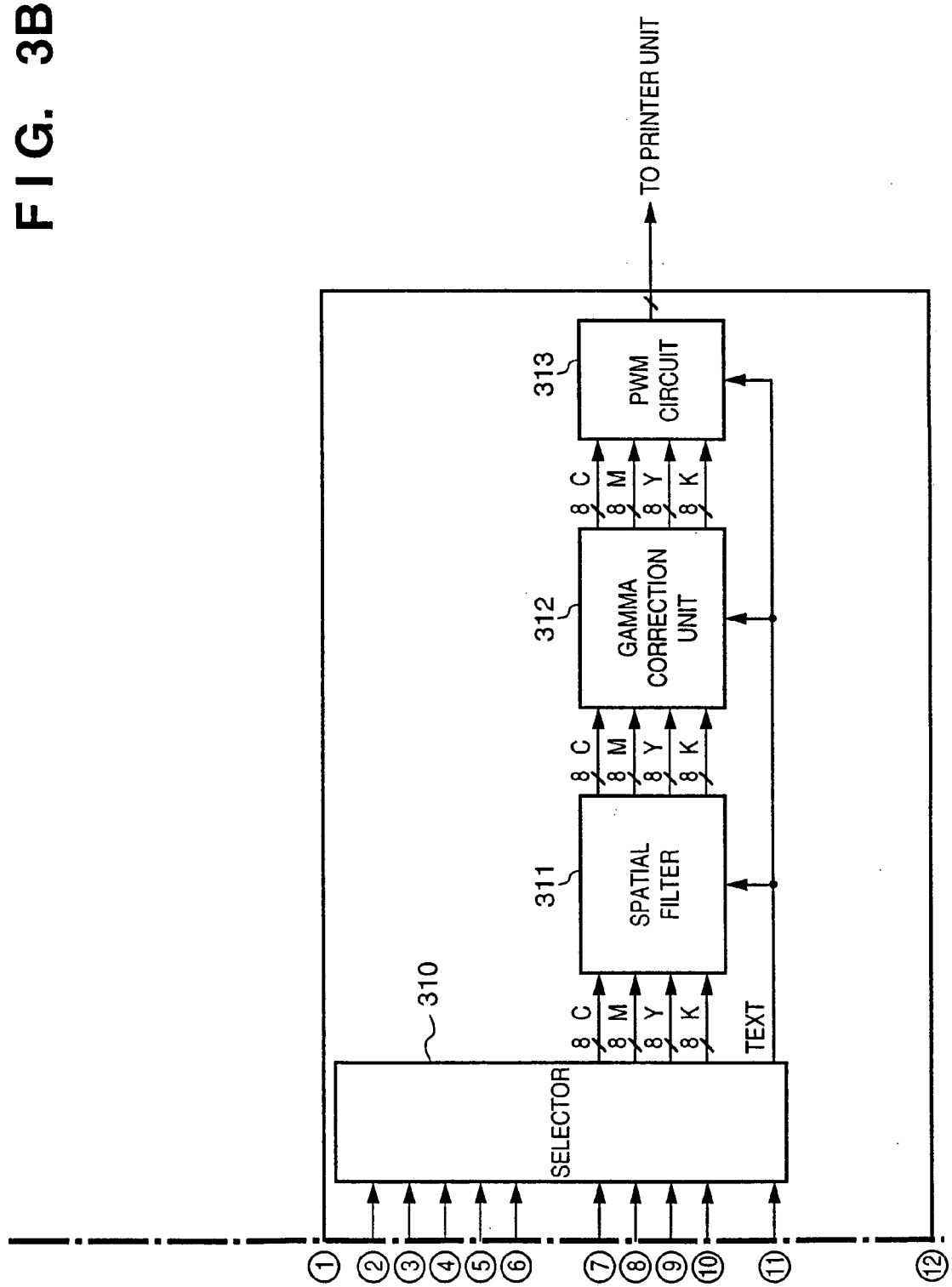

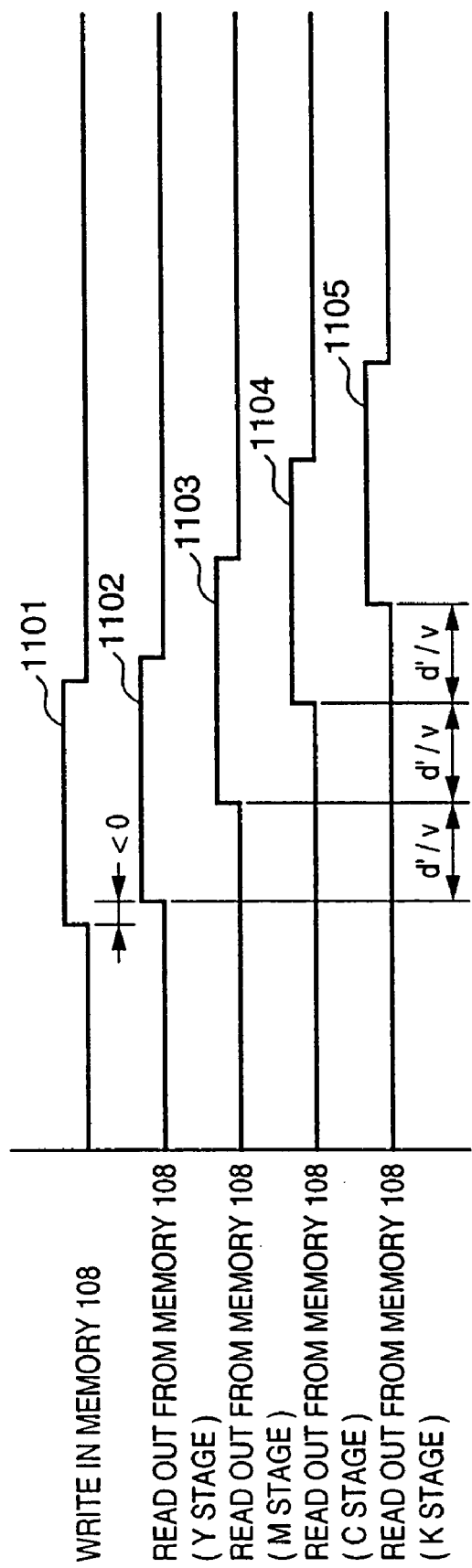

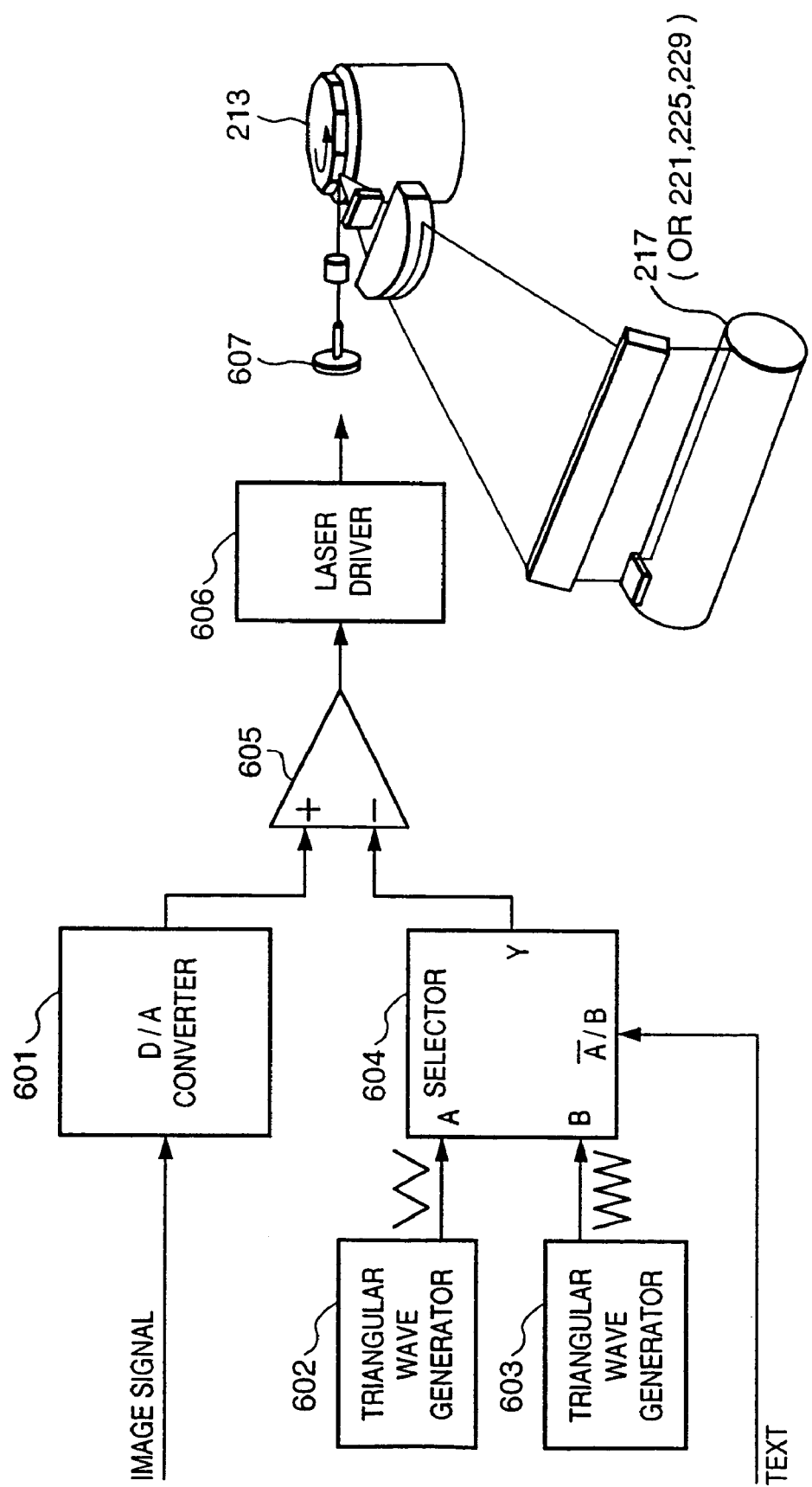

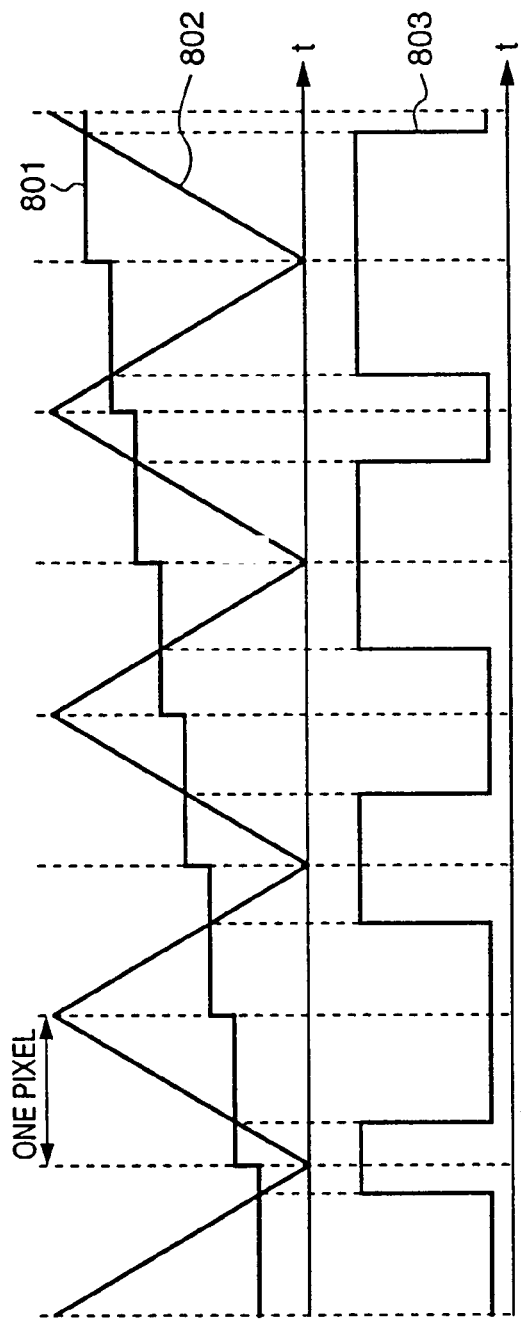
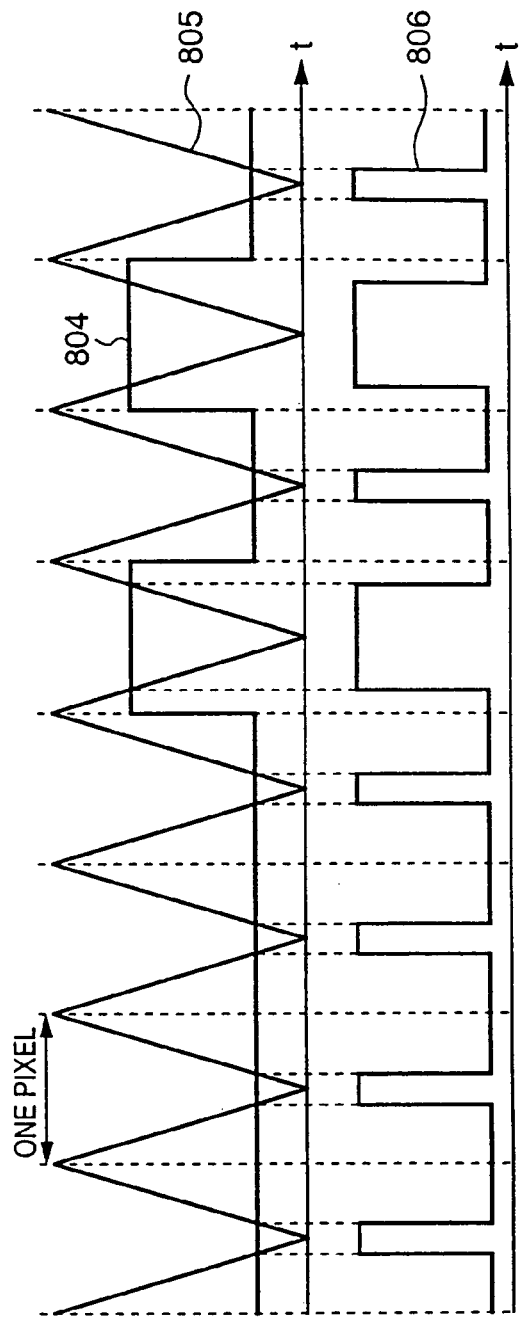

OUTPUT TEST PRINT USED IN AUTOMATIC GRADATION CORRECTION

[TEST PRINT 1]

PLACE OUTPUT TEST PRINT 1 ON PLATEN WITH PRINTED SURFACE FACING DOWN, AND PRESS READ KEY

[CANCEL]

BLACK BAND

[READ]

OUTPUT TEST PRINT USED IN AUTOMATIC GRADATION CORRECTION

[TEST PRINT 2]

PLACE OUTPUT TEST PRINT 2 ON PLATEN WITH PRINTED SURFACE FACING DOWN, AND PRESS READ KEY

[CANCEL]

BLACK BAND

[READ]

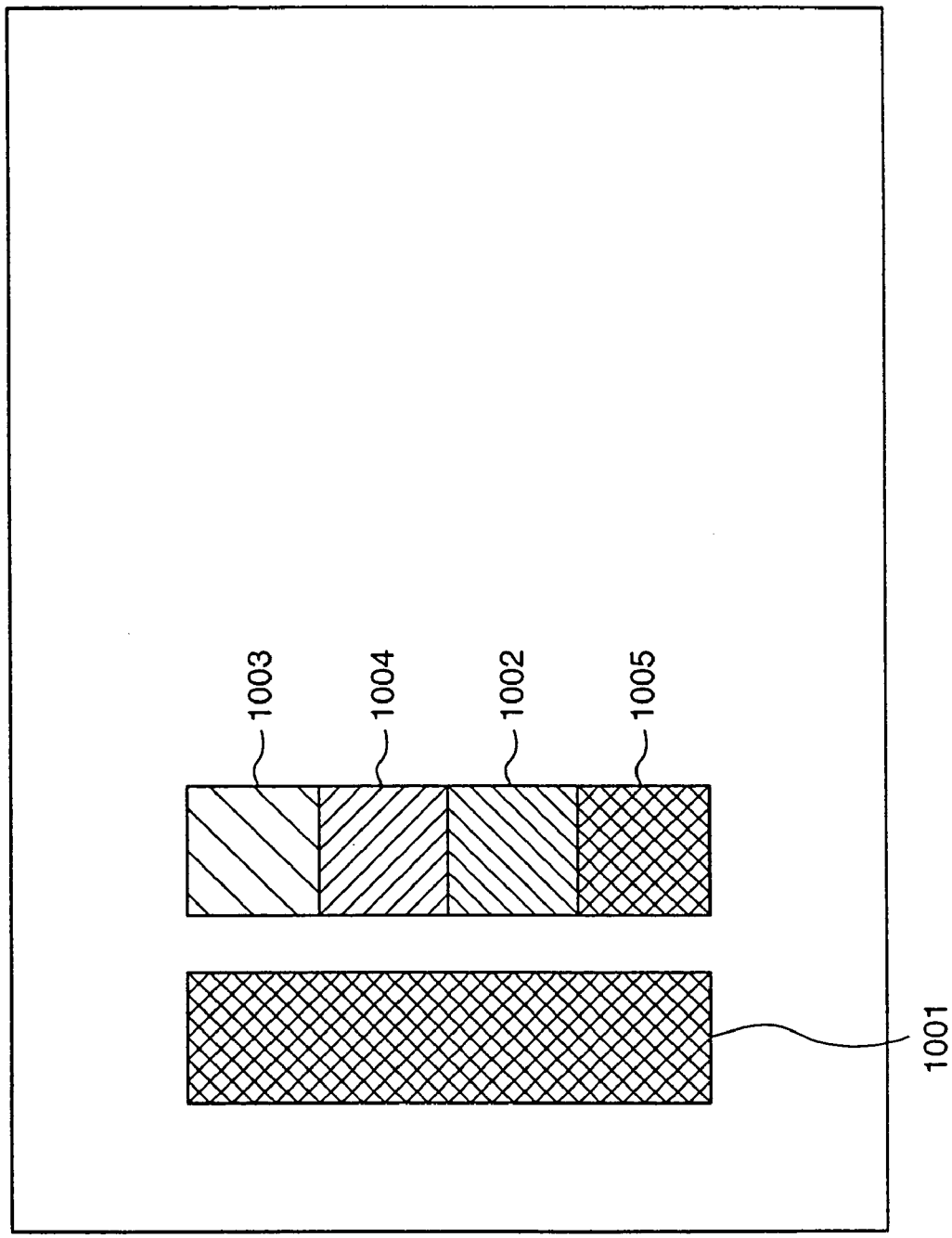

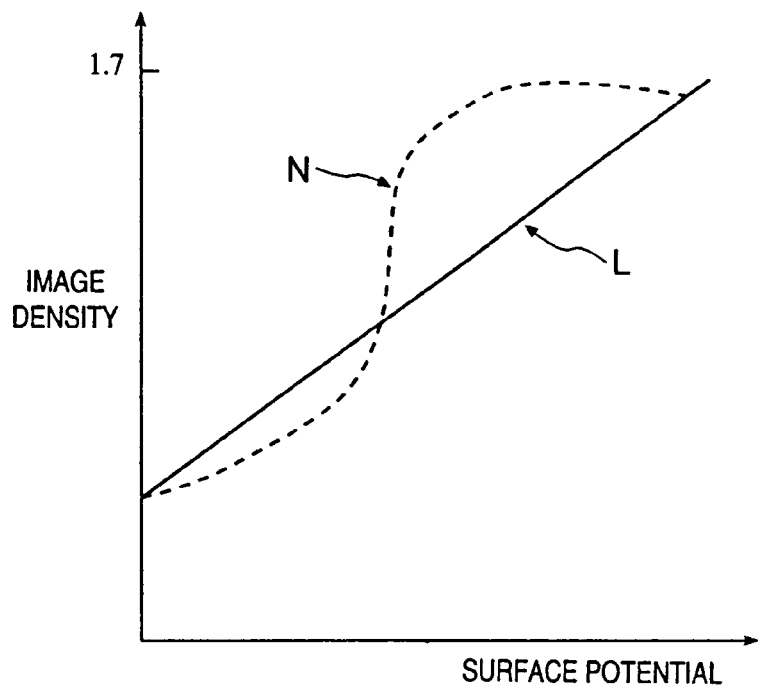
F I G. 12A
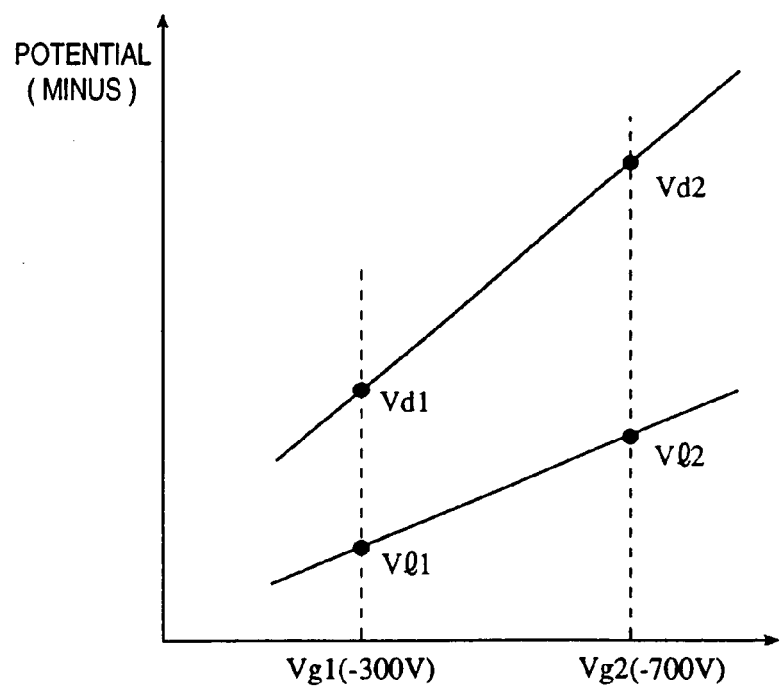
F I G. 12B

```
char_color = {0.0,0.0,0.0,1.0} ;            L100
string1 = " IC " ;                          L101
put_char ( 0.0,0.0,0.3,0.1,string1 ) ;      L102
```

```
line_color = { 0.0,1.0,1.0,0.0 } ;          L103
put_line ( 0.9,0.0,0.9,1.0,0.1 ) ;          L104
```

```
image = {CMYK,8,5,5,C0,M0,Y0,K0,
               C1,M1,Y1,K1,                 L105
                    :
               C24,M24,Y24,K24 } ;

put_image ( 0.0,0.5,0.5,0.5,image1 ) ;      L106
```

FIG. 18

[ DESCRIPTION OF R100 ]
    char_color = {0.0,0.0,0.0,1.0} ; ⌒——L100
    string1 = " IC " ; ————————L101
    put_char ( 0.0,0.0,0.3,0.1,string1 ) ; ⌒——L102

[ DESCRIPTION OF R101 ]
    line_color = {0.0,1.0,1.0,0.0} ; ⌒——L103
    put_line ( 0.9,0.0,0.9,1.0,0.1 ) ; ⌒——L104

[ DESCRIPTION OF R103 ]
    outline_color = {0.0,1.0,0.0,0.0} ; ⌒—— L107
    inside_color = {0.0,0.0,1.0,0.0} ; ⌒——L108
    put_circle ( 0.3,0.7,0.3,0.05 ) ; ⌒——L109

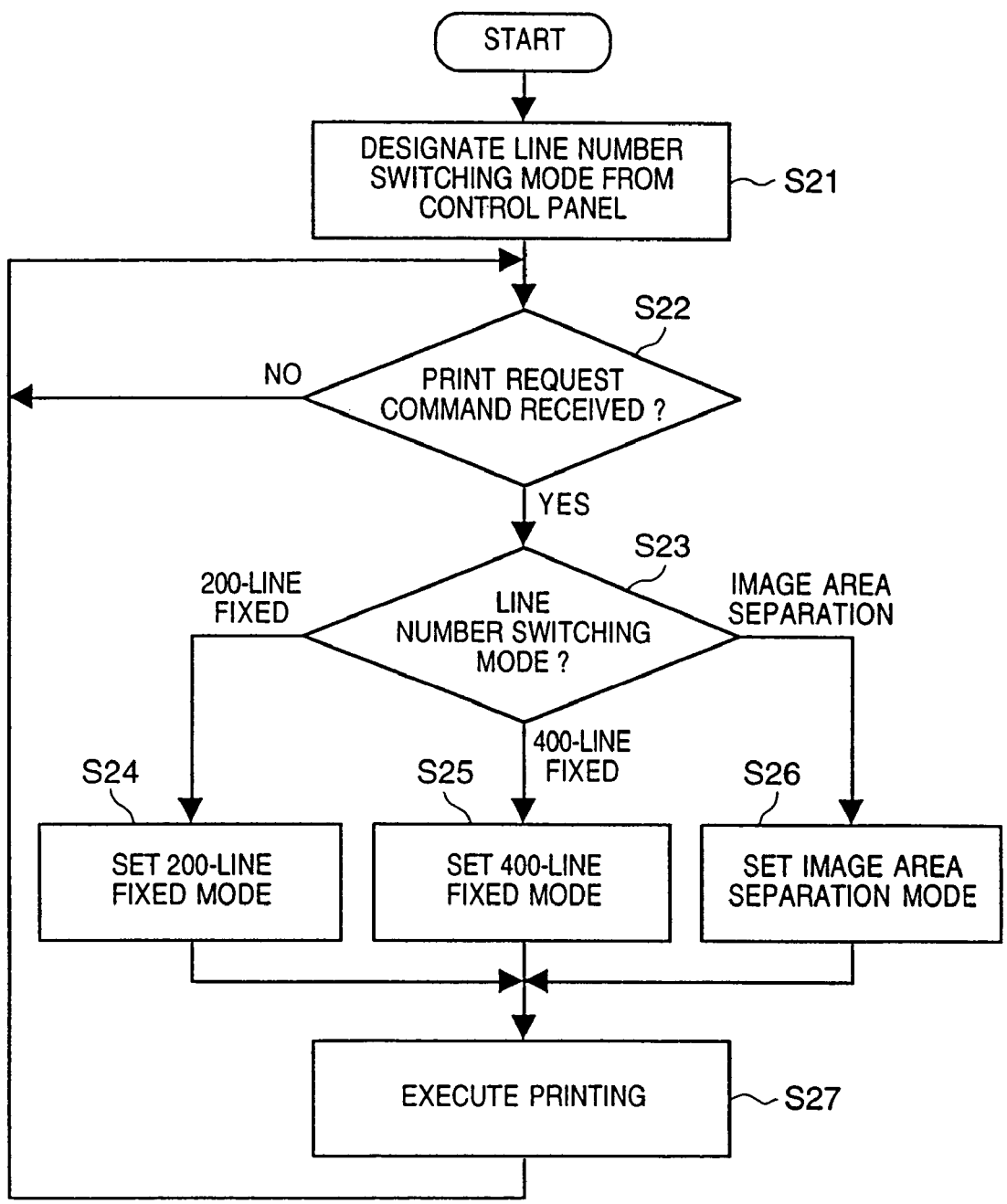

FIG. 24

/\* # # # Description for R201 # # # \*/
    Square_color = {0.25, 0.25 ,0.25 ,0.25 ,
                  0.25 ,0.25 ,0.25 ,0.25} ; ⎯⎯ L201
    put_square (0.25 ,0.00 ,0.50 ,1.00 ,0.01) ; ⎯⎯ L202

/\* # # # Description for R202 # # # \*/
    Square_color = {0.00, 0.00 ,1.00 ,0.00 ,
                  0.00 ,0.00 ,1.00 ,0.00} ; ⎯⎯ L203
    put_square (0.75 ,0.75 ,1.00 ,1.00 ,0.01) ; ⎯⎯ L204

/\* # # # Description for R203 # # # \*/
    Square_color = {0.00, 1.00 ,0.00 ,0.00 ,
                  0.00 ,1.00 ,0.00 ,0.00} ; ⎯⎯ L205
    put_square (0.50 ,0.75 ,1.00 ,0.75 ,0.01) ; ⎯⎯ L206

/\* # # # Description for R204 # # # \*/
    Square_color = {1.00, 0.00 ,0.00 ,0.00 ,
                  1.00 ,0.00 ,0.00 ,0.00} ; ⎯⎯ L207
    put_square (0.75 ,0.25 ,1.00 ,0.50 ,0.01) ; ⎯⎯ L208

/\* # # # Description for R205 # # # \*/
    Square_color = {0.00, 0.00 ,0.00 ,1.00 ,
                  0.00 ,0.00 ,0.00 ,1.00} ; ⎯⎯ L209
    put_square (0.75 ,0.00 ,1.00 ,0.25 ,0.01) ; ⎯⎯ L210

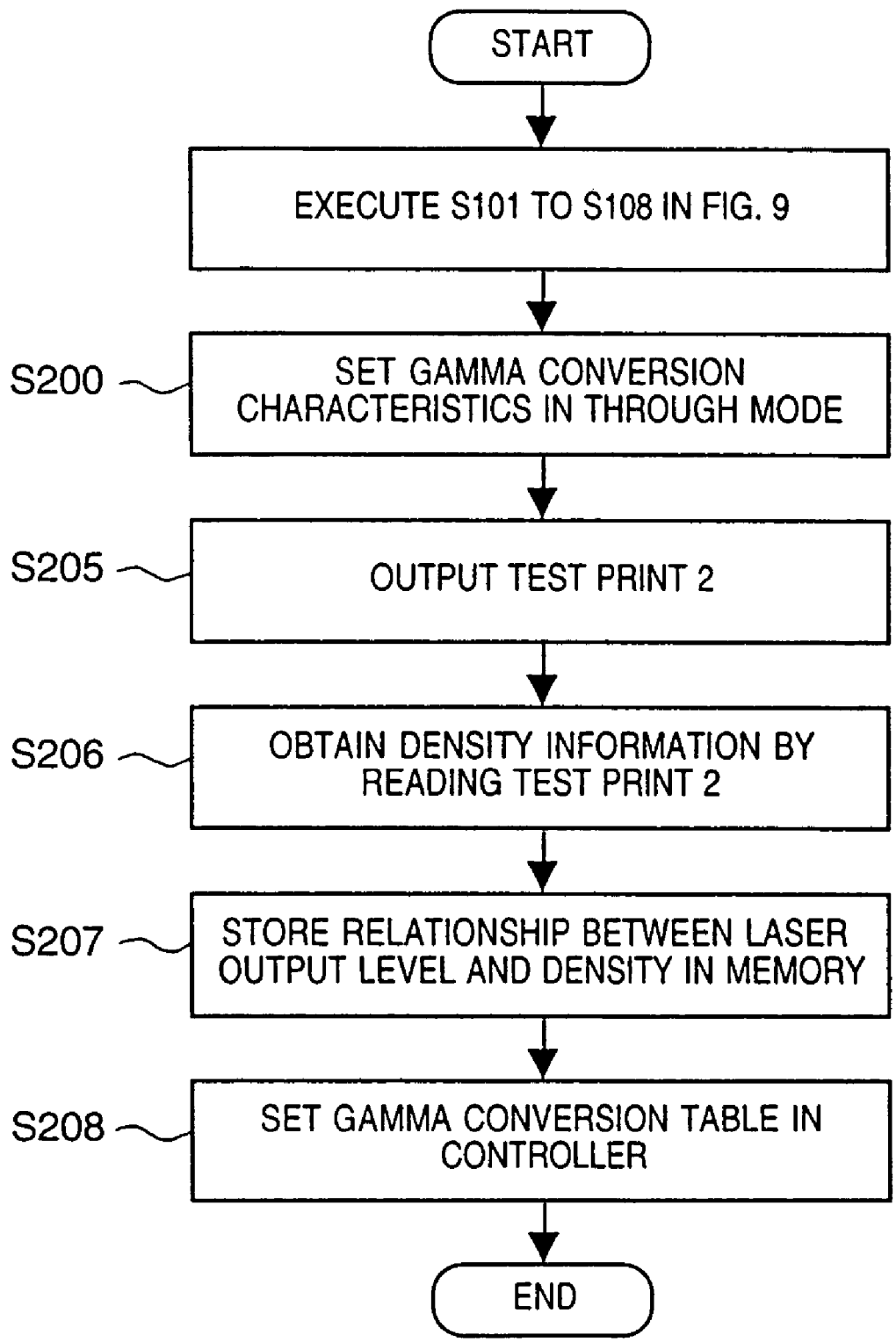

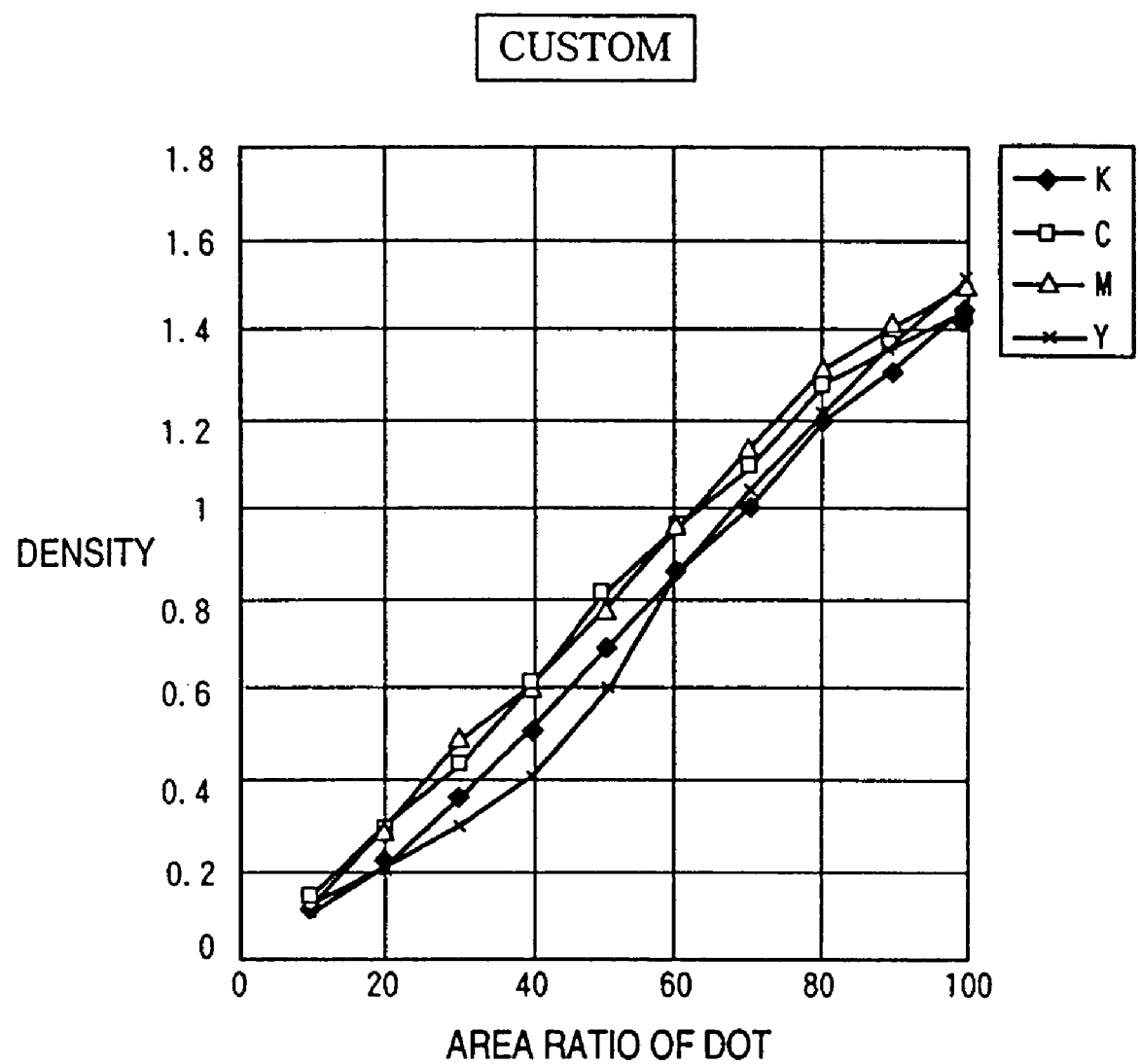

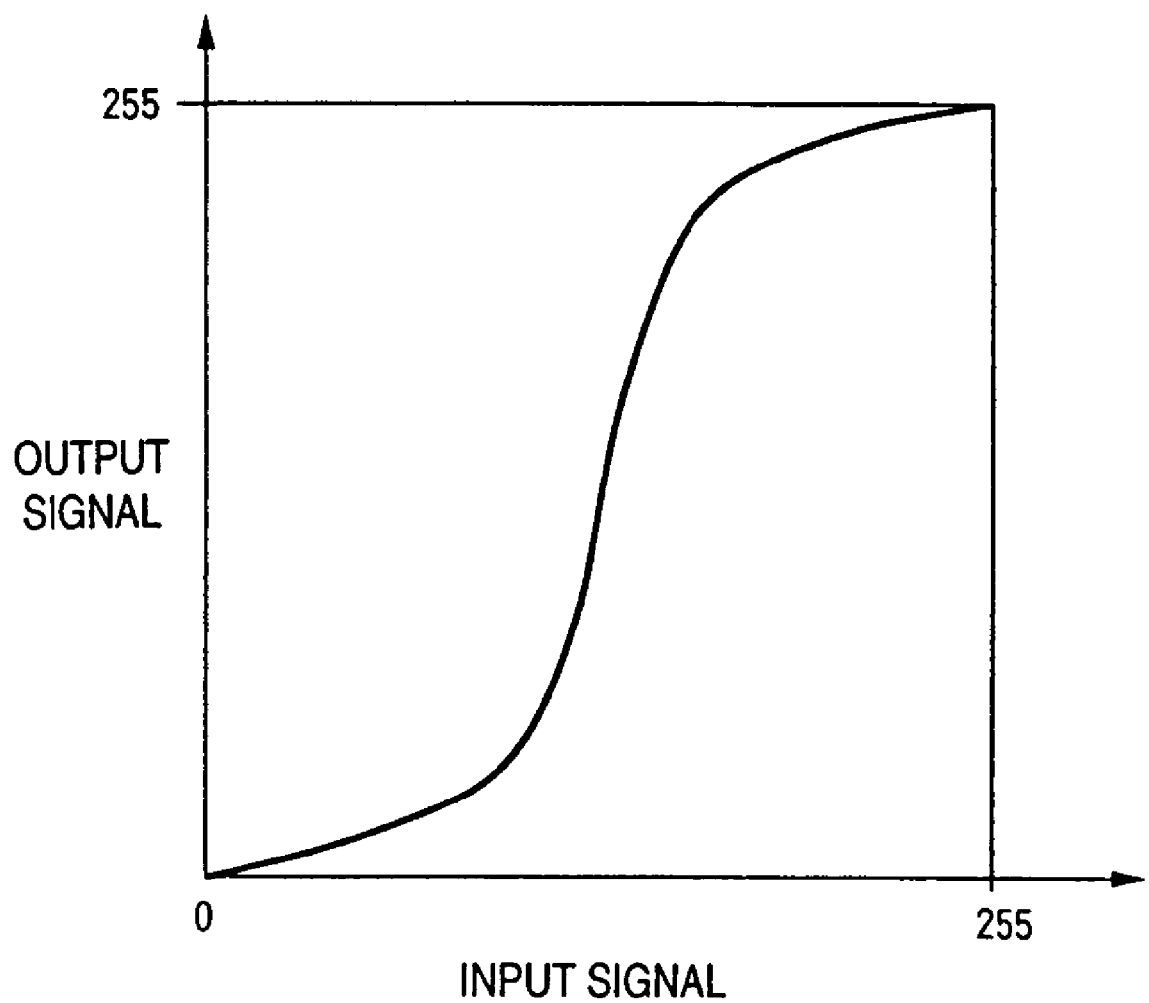

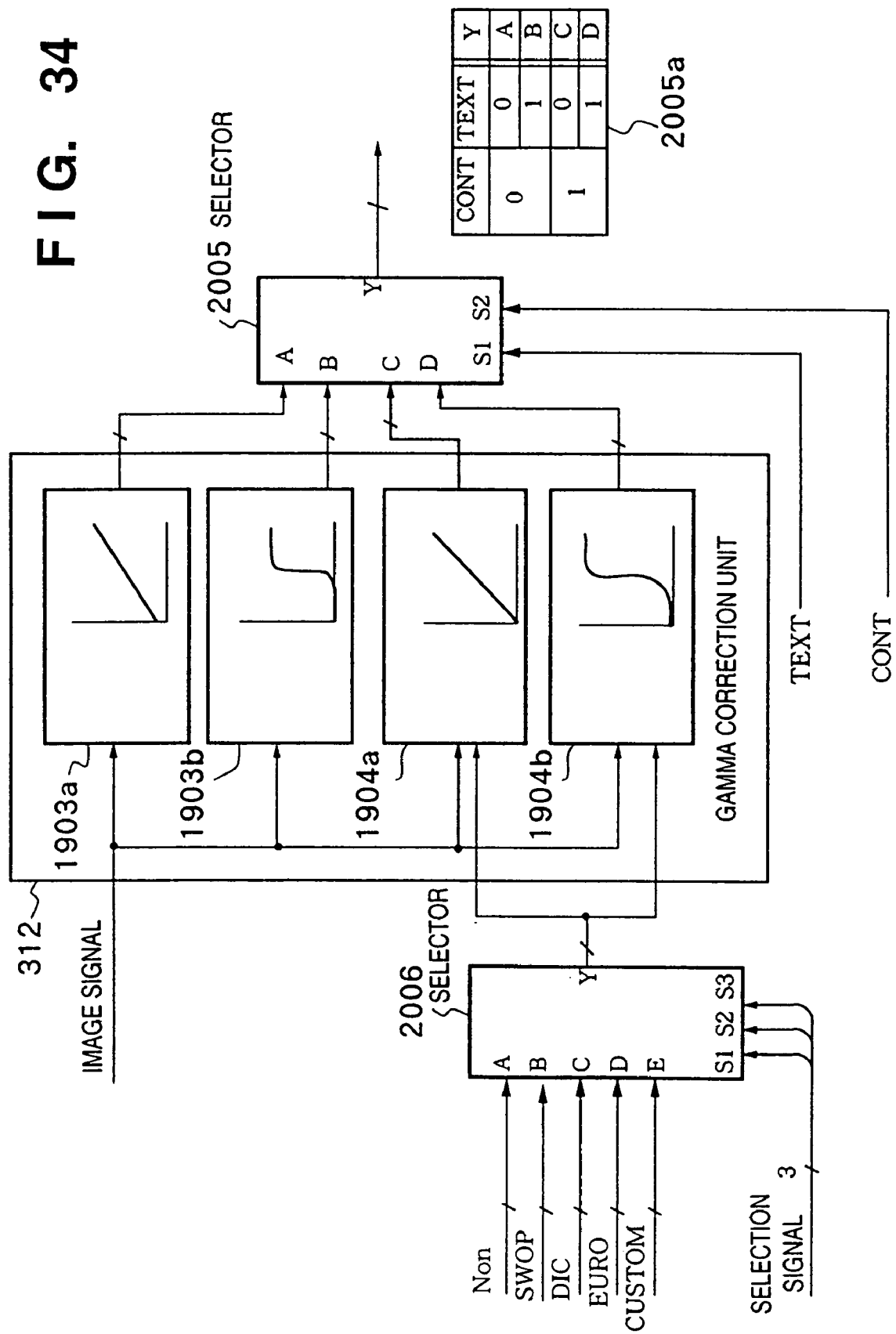

IMAGE PROCESSING APPARATUS AND METHOD

This application is a divisional application of U.S. application Ser. No. 09/141,417, filed Aug. 27, 1998, now U.S. Pat. No. 6,697,167.

BACKGROUND OF THE INVENTION

1. Field of the Invention

The present invention relates to an image processing apparatus and method and, more particularly, to an image processing apparatus and method for processing an image sent from an external apparatus such as a host computer or the like, and an image read from an original.

2. Description of the Related Art

An image forming system which is constructed by a controller for receiving image data from a host computer and sending the received image data to an image forming apparatus, and an image forming apparatus for forming an image on the basis of the image data sent from the controller is known. For example, an image forming system as combination of a CLC500 (tradename) color copying machine as an image forming apparatus and various controllers is commercially available. This color copying machine is a laser beam type color electrophotographic printer which frame-sequentially forms images in correspondence with a plurality of output color components C (Cyan), M (Magenta), Y (Yellow), and K (Black), and realizes halftone expression by controlling laser beam emission by a signal pulse-width-modulated in accordance with an image signal.

In such image forming apparatus, a technique for stabilizing the quality of an output image via density correction and gradation correction by forming a predetermined pattern on an image carrier or recording medium, and reading the density of the formed predetermined pattern is known.

However, the aforementioned technique suffers the following problems.

An image output by reading an original image by the color copying machine alone as the image forming apparatus (to be referred to as a "copy image" hereinafter), and an image output based on image data sent from the controller (to be referred to as a "print image" hereinafter) are not yet sufficiently standardized in terms of their density and gradation reproducibility.

A calibration system which adjusts the density and gradation reproducibility of a print image using an expensive densitometer is known. However, calibration that uses a reader/scanner of the color copying machine is not performed.

Furthermore, calibration that takes a color sample used as a standard into consideration is made, but no image adjustment corresponding to the color sample is made.

On the other hand, variations of the image density and gradation reproducibility include a short-term variation resulting from a variation of the apparatus environments, a long-term variation resulting from aging of a photosensitive body and toner, and the like. In order to standardize the density and gradation reproducibility of a copy image and print image, such variations must be corrected together.

SUMMARY OF THE INVENTION

The present invention has been made to solve the above-mentioned problems, and has as its object to provide an image processing apparatus and method, which can correct short- and long-term variations of the image density and gradation reproducibility by a standardized scheme upon formation of a copy image by the operation of the image forming apparatus alone, and upon formation of a print image based on image data sent from an external apparatus.

It is another object of the present invention to provide an image processing apparatus and method, which can perform image adjustment suitable for the image forming system with low cost using an image reading means of the image forming apparatus.

It is still another object of the present invention to provide an image processing apparatus and method which can perform image adjustment suitable for the image forming apparatus connected.

It is still another object of the present invention to provide an image processing apparatus and method which can perform image adjustment corresponding to a color sample.

To achieve the above object, according to one aspect of the present invention, there is provided to an image processing apparatus connected to a color-copy machine having calibration processing modes for a color-copy process and a color-print process, said apparatus comprising output means for outputting a command which indicates execution of calibration processing to said color-copy machine.

To achieve the above object, according to another aspect of the present invention, there is provided to an image processing apparatus which has an image reader generating a first image signal from an original, an generating unit generating a second image signal from image data described by page description language, and a printer forming a visible image on a recording medium based on the first or second image signal, said apparatus comprising first coordinating means for coordinating the visible image formed from the second image signal, using said image reader, and second coordinating means for subjecting image coordinating process to the second image signal using a conversion table which has a predetermined characteristic.

To achieve the above object, according to another aspect of the present invention, there is provided to an image processing apparatus comprising an image reader generates a first image signal form an original, generating means for generating a second image signal from image data described by page description language, correcting means for correcting the first or second image signal, a printer forms a visible image on a recording medium based on the corrected image signal, first setting means for, in image forming process based on the first image signal, setting correcting process of said correcting means and an image forming condition of said printer on the basis of an image signal generated by a pattern generator, and second setting means for, in image forming process based on the second image signal, setting the correcting process and the image forming condition on the basis of an image signal generated from image data described by the page description language.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B is a block diagram showing an image forming unit of an image processing system shown in FIG. 1;

FIG. 4 is a timing chart showing the image data read and write timings of a memory 108 shown in FIGS. 3A and 3B;

FIG. 6 is a block diagram showing the arrangement of a PWM circuit 313 shown in FIGS. 3A and 3B;

FIGS. 7A and 7B are charts showing pulse-width modulation processes;

FIG. 11 shows an example of test print 1;

FIGS. 12A and 12B are graphs for explaining the method of correcting the maximum density on the basis of density information;

FIG. 18 is a view showing an example of PDL data;

FIG. 21 is a flow chart for explaining the control for switching the number of lines in accordance with the determination signal TEXT;

FIG. 24 shows PDL data for forming test print 1;

FIG. 28 is a flow chart showing another example of the processing sequence of automatic gradation correction from the controller according to the third embodiment of the present invention;

FIG. 31E is a graph showing the density characteristics obtained when the output from the controller is adjusted in correspondence with a color sample unique to the user;

FIG. 32B is a graph showing an example of the characteristics of a gamma conversion table corresponding to FIG. 32A;

FIG. 34 is a diagram for explaining switching of a gamma conversion table in accordance with a selection signal of a color sample.

DESCRIPTION OF THE PREFERRED EMBODIMENTS

An image processing apparatus according to one embodiment of the present invention will now be described in detail with reference to the accompanying drawings.

First Embodiment

[Outline of System]

Figure 1:
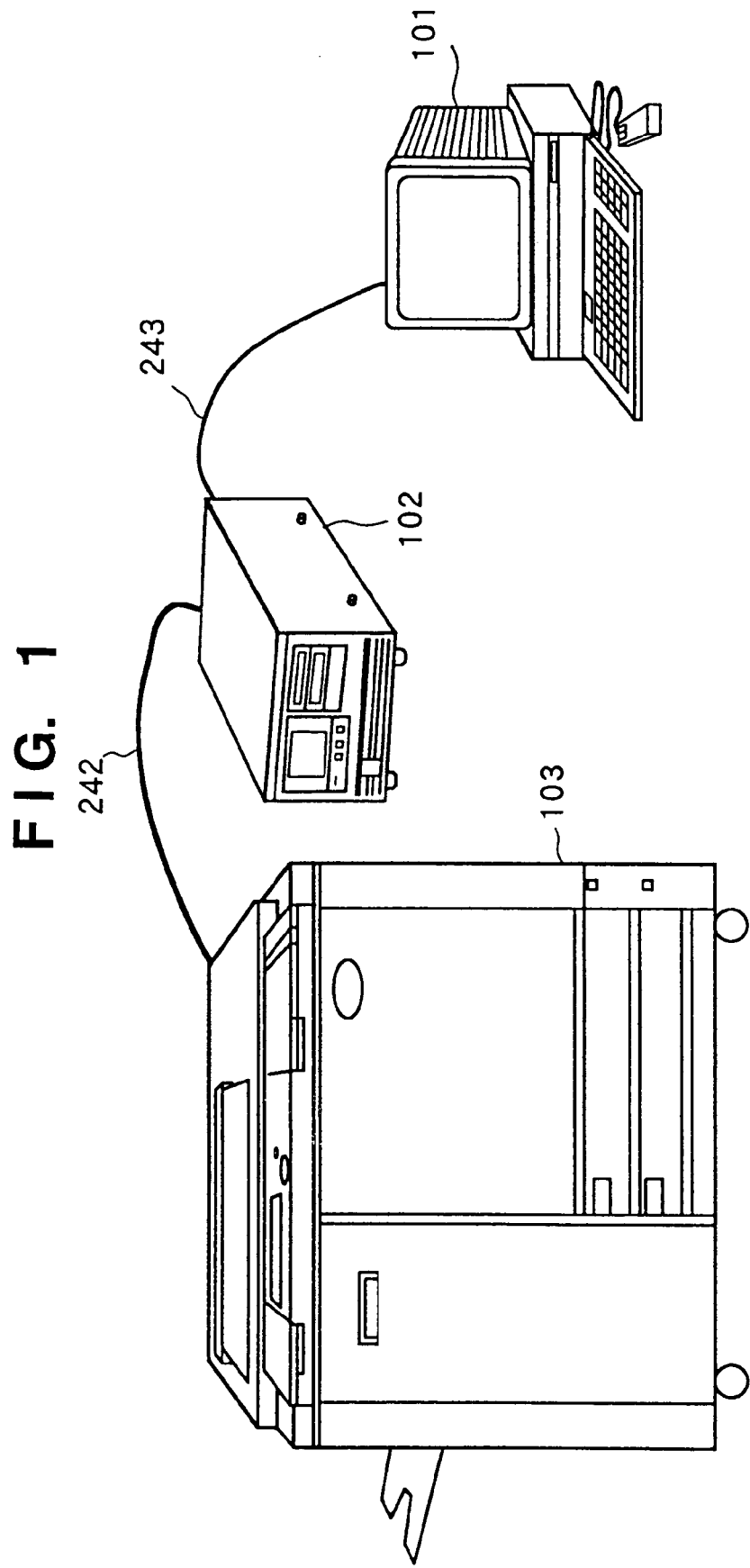
FIG. 1 is a schematic view showing the arrangement of an image processing system according to an embodiment of the present invention.

FIG. 1 is a schematic view showing the arrangement of an image processing system according to an embodiment of the present invention. Reference numeral 101 denotes a host computer; 102, a controller; and 103, an image forming apparatus.

The image forming apparatus 103 forms a color copy of an original image placed on a platen, and outputs a color image based on image data sent from the host computer 101 via the controller 102.

A DTP (Desk Top Publishing) application software program runs on the host computer 101 to create and edit various documents and figures. The host computer 101 converts the created and edited documents and figures into data described in a page description language (PDL) (to be referred to as "PDL data" hereinafter), and sends the PDL data to the controller 102 via a connection cable 243.

The controller 102 preforms raster image processing (RIP) for interpreting and rasterizing the PDL data sent from the host computer 101. An image signal obtained as a result of the RIP is sent to the image forming apparatus 103 via a connection cable 242 to output an image.

[Outline of Image Forming Apparatus]

Figure 2:
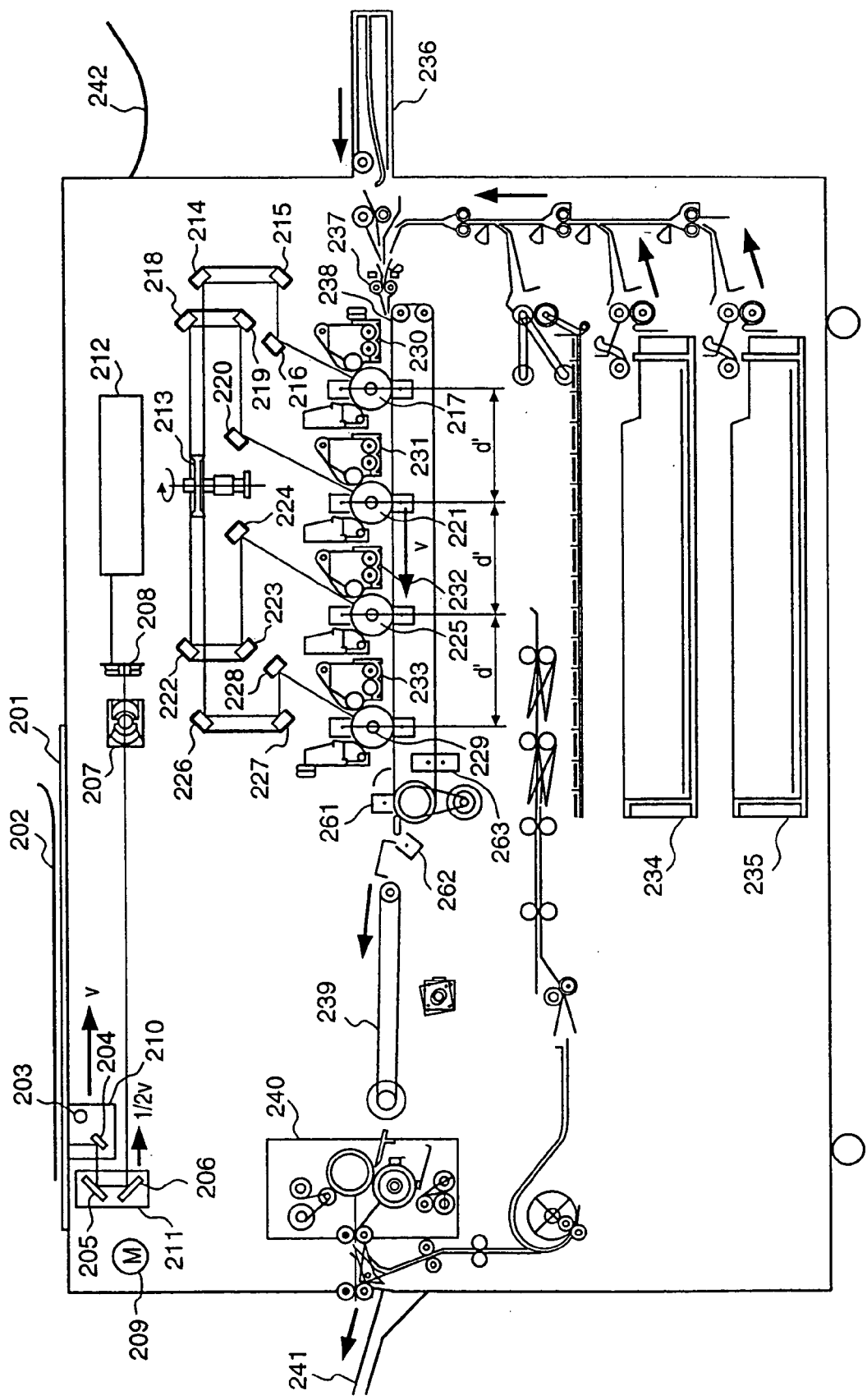
FIG. 2 is a schematic view showing the arrangement of an image forming apparatus shown in FIG. 1.

FIG. 2 is a schematic view showing the arrangement of the image forming apparatus 103.

Copying of an original image will be exemplified below. Reference numeral 201 denotes a platen on which an original 202 bearing an image to be read is placed. Light emitted by a lamp 203 is irradiated on the original 202, and light reflected by the original 202 is guided to a CCD 208 as a line sensor by an optical system 207 via mirrors 204, 205, and 206, thus forming an image on the CCD 208. When a mirror unit 210 including the mirror 204 and lamp 203 is mechanically moved by a motor 209 at a velocity v, and a mirror unit 211 including the mirrors 205 and 206 is mechanically moved by the motor 209 at a velocity ½v, the entire surface of the original 202 is scanned.

Reference numeral 212 denotes an image processing unit which processes an image signal output from the CCD 208, temporarily stores the processed image signal on an image signal, and outputs the stored image signal as a print signal at a predetermined timing. The print signal output from the image processing unit 212 is sent to a laser driver 1006 (to be described later) to drive four semiconductor laser elements (not shown).

Reference numeral 213 denotes a polygonal mirror for reflecting four laser beams output from the four semiconductor laser elements. One of the four laser beams scans a photosensitive drum 217 via mirrors 214, 215, and 216. Other laser beams respectively scan a photosensitive drum 221 via mirrors 218, 219, and 220, a photosensitive drum 225 via mirrors 222, 223, and 224, and a photosensitive drum 229 via mirrors 226, 227, and 228.

Reference numeral 230 denotes a developer for supplying yellow toner. The developer 230 develops a latent image formed on the photosensitive drum 217 upon scanning the laser beam with toner to form a yellow toner image. Similarly, developers 231, 232, and 233 for respectively supplying magenta, cyan, and black toners develop latent images formed on the photosensitive drums 221, 225, and 229 upon scanning the laser beams with toners.

A recording paper sheet fed from one of recording paper cassettes 234 and 235, and a manual insertion tray 236 is electrostatically attracted and conveyed by a transfer belt 238 via registration rollers 237. The respective color toner images (four-color, Y, M, C, and K toner images) are formed on the photosensitive drums in synchronism with the feed timing of the recording paper sheet, and are transferred onto the conveyed recording paper sheet to overlap each other, thus obtaining a full-color image. The recording paper sheet on which the toner images are transferred is separated from the transfer belt 238, and is conveyed to a fixing device 240 by a conveyor belt 239 to fix the toner images. After that, the recording paper sheet is exhausted onto an exhaust tray 241.

On the other hand, when an image is to be output on the basis of image data sent from the host computer 101 via the controller 102, the image data is input to the image processing unit 212 via the interface cable 242, and an image is formed in the same manner as in the above-mentioned copying operation.

Note that the four photosensitive drums are placed to be spaced an equal distance d, and the recording paper sheet is conveyed by the transfer belt 238 at a predetermined velocity v'. Hence, the four semiconductor laser elements are respectively driven to have a time difference d/v', thus synchronizing the toner image formation and transfer timings.

[Copying Machine Operation]

The image processing system of this embodiment operates as a copying machine alone, and also operates as a system including the controller 102. Switching of these operations and setups of operation conditions such as the number of prints, recording paper size, and the like can be done at a control panel 300d of the image forming apparatus 103 or the host computer 101. The operation as the copying machine alone (to be referred to as "copying machine operation" hereinafter) will be explained below.

Figure 3A:
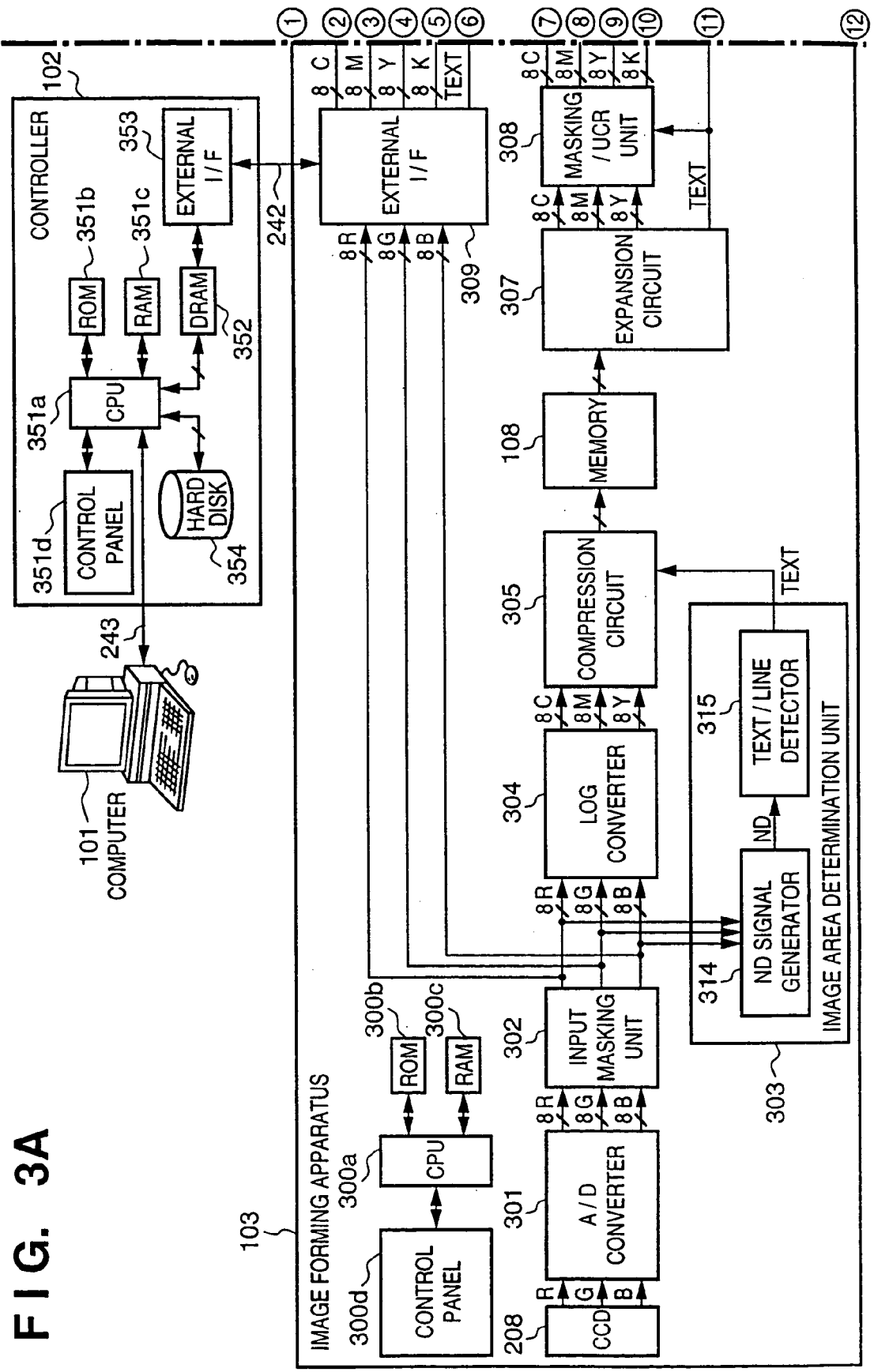

In case of the copying machine operation, as shown in FIGS. 3A and 3B, an image signal output from the CCD 208 is compressed by a compression circuit 305 via an A/D converter 301, input masking unit 302, and LOG converter (luminance/density converter) 304, and the compressed signal is written in a memory 108. Also, a character/line image determination signal TEXT which represents the determination result of an image area determination unit 303 that determines character and line image areas is compressed by the compression circuit 305, and the compressed signal is written in the memory 108.

The compressed data read out from the memory 108 is expanded by an expansion circuit 307, and the expanded image signals are then sent to the subsequent units in accordance with the image formation timing of the printer unit. The image signals are subjected to masking for matching the spectral sensitivity characteristics of the image signal to those of toners, and UCR (Under Color Remove) processing in a masking/UCR unit 308, and are converted into Y, M, C, and K image signals. The Y, M, C, and K image signals are subjected to processing such as edge emphasis, smoothing, and the like by a spatial filter 311, and are also subjected to gamma processing for matching the characteristics of the image signal with the printer characteristics by a gamma correction unit 312. The C, M, Y, and K image signals that have been matched with the printer characteristics are converted into pulse signals for driving the semiconductor laser elements by a PWM circuit 313, and the pulse signals are sent to a laser driver (not shown).

FIG. 4 is a timing chart showing the image data read and write timings of the memory 108. The compressed image data is written in the memory 108 at a timing 1101, and is read out and expanded at timings 1102, 1103, 1104, and 1105. Note that the interval between the neighboring timings 1102, 1103, 1104, and 1105 is the above-mentioned time d/v'.

Note that the operation of the image forming apparatus 103 is controlled by a CPU 300a which executes a control program and image processing program stored in a ROM 300b using a RAM 300c as a work memory.

[Print Operation]

The system operation including the controller 102 includes two operations, i.e., print operation for outputting an image by the image forming apparatus 103 on the basis of image data sent from the controller 102, and scan operation for outputting image data from the image forming apparatus 103 to the controller 102. The print operation will be described first.

The host computer 101 sends PDL data to a CPU 351a of the controller 102. The CPU 351a stores the received PDL data in a hard disk 354. Upon completion of storage of the entire job sent from the computer 101 in the hard disk 354, the CPU 351a starts interpretation of the PDL data stored in the hard disk 354. The interpreted PDL data is rasterized to full-color image data in the print order, and is stored in a DRAM 352 as a raster image. Note that the rasterized image data includes image data color-separated into four colors, i.e., Y, M, C, and K in correspondence with the characteristics of the image forming apparatus 103. Furthermore, the aforementioned character/line image determination signal TEXT is written in the DRAM 352. The image data and determination signal TEXT are read out from the DRAM 352 at the same timings as the read/write timings of the memory 108 shown in FIG. 4, and are sent to the image forming apparatus 103 via an external interface (I/F) 353 and the cable 242.

When PDL data for one job cannot be stored in the hard disk 354 at a time, or when high-speed printing is required, the job may be divided, and PDL data may be transferred in units of divided jobs. Rasterization is normally done in units of pages. However, when a sufficiently large storage capacity of the DRAM 352 is assured, all the data for one job are rasterized. When the storage capacity is insufficient or a first print is to be obtained earlier, print preparation is started in the rasterized order, and image data is sent to the image forming apparatus 103 via the external interface 353.

Note that the CPU 351a executes processing such as interpretation and rasterization of PDL data, the same masking and UCR processing as in the masking/UCR unit 308, and the like by executing a control program and processing program stored in a ROM 351b using a RAM 351c as a work memory.

On the other hand, the image data and determination signal TEXT sent to an external interface (I/F) 309 of the image forming apparatus 103 are selected by a selector 310 controlled by the CPU 300a, and are sent to the processing blocks after the spatial filter 311. Note that selection of the selector 310 is controlled based on communications between the CPUs 351a and 300a via the external interfaces 353 and 309.

[Scan Operation]

The scan operation will be described below.

The CPU 351a of the controller 102 communicates with the CPU 300a of the image forming apparatus 103 to make the image forming apparatus 103 scan the original 202 and read the image of the original 202. Then, for example, R, G, and B 8-bit image data output from the input masking unit 302 are written in the DRAM 352 as a raster image via the external interfaces 309 and 353. Note that the image data write timing is the same as the timing 1101 shown in FIG. 4. Of course, the image data may be transferred from the DRAM 352 to the hard disk 354 as needed, or may be sent to the host computer 101 and may be displayed on its display.

[Details of Image Processing Unit]

The respective units of the image processing unit 212 will be explained in detail below.

Analog image signals output from the CCD sensor 208 are A/D-converted into R, G, and B 8-bit digital image signals R0, G0, and B0 by the A/D converter 301 after gain and offset adjustments. After that, a shading correction circuit (not shown) performs known shading correction of the digital image signals R0, G0, and B0 using a signal obtained by reading a reference white plate. Furthermore, since color line sensors of the CCD 208 are set to be spaced a predetermined distance from each other, the digital image signals R0, G0, and B0 are subjected to spatial shift correction in the sub-scanning direction by a line delay adjustment circuit (not shown).

The input masking unit 302 converts the color space of the image signals R0, G0, and B0 determined by the spectral characteristics of R, G, and B filters of the CCD 208 into an NTSC (National Television Systems Committee) standard color space by the 3×3 matrix operation:

$$\begin{bmatrix} R \\ G \\ B \end{bmatrix} = \begin{bmatrix} C11 & C12 & C13 \\ C21 & C22 & C23 \\ C31 & C32 & C33 \end{bmatrix} \begin{bmatrix} R0 \\ G0 \\ B0 \end{bmatrix} \quad (1)$$

where Cij (i=1, 2, 3; j=1, 2, 3) is a constant unique to the apparatus in consideration of various characteristics such as the sensitivity characteristics of the CCD 208, spectral characteristics of the lamp 203, and the like.

The LOG converter 304 is comprised of a look-up table (LUT) such as a RAM or the like, and converts the R, G, and B luminance signals into density signals C1, M1, and Y1 by:

$$\left.\begin{aligned} C1 &= -\alpha \times \log_{10}(R/255) \\ M1 &= -\alpha \times \log_{10}(G/255) \\ Y1 &= -\alpha \times \log_{10}(B/255) \end{aligned}\right\} \quad (2)$$

The compression circuit 305 compresses the Y, M, and C image signals and determination signal TEXT to reduce the information volume or redundancy, and stores the compressed data in the memory 108. The expansion circuit 307 expands data read out from the memory 108 to the Y, M, and C image signals and determination signal TEXT. Note that the image compression method may use run length coding, Huffman coding, arithmetic coding, Lempel-Ziv (LZ), and the like as lossless compression, or JPEG coding and the like as lossy compression using the discrete cosine transform (DCT).

The output masking/UCR unit 308 corrects the input image signals C1, M1, and Y1 image signals in correspondence with the spectral sensitivity characteristics of toners by the equations below, and converts them into Y, M, C, and K image signals corresponding to the toner colors. In this conversion, a black generation operation and masking operation are switched in correspondence with the determination signal TEXT. That is, when TEXT="0", i.e., when a picture mode that attaches importance to gradation characteristics is selected, a signal K1 as a black signal is generated by equation (5) below; when TEXT="1", i.e., a character mode that attaches importance to resolution is selected, the signal K1 is generated by equation (6) below:

$$MIN = \min(Y, M, C) \quad (3)$$

$$MAX = \max(Y, M, C) \quad (4)$$

$$K1 = MIN \quad (5)$$

$$K1 = MIN \cdot (MIN/MAX) + MIN \cdot (1-MIN/MAX)(MIN/255)^2 \quad (6)$$

On the other hand, the masking operation is given by equation (7) below when TEXT="0", i.e., in the picture mode, or is given by equation (8) below when TEXT="1", i.e., in the character mode. Note that matrix coefficients aij (i=1, . . . , 4; j=1, . . . , 8) and bij (i=1, . . . , 4; j=1, . . . , 8 assume different values.

$$\begin{bmatrix} C \\ M \\ Y \\ K \end{bmatrix} = \begin{bmatrix} a11 & a21 & a31 & a41 \\ a12 & a22 & a32 & a42 \\ a13 & a23 & a33 & a43 \\ a14 & a24 & a34 & a44 \end{bmatrix} \begin{bmatrix} C \\ M \\ Y \\ K \end{bmatrix} + \begin{bmatrix} a15 & a25 & a35 & a45 \\ a16 & a26 & a36 & a46 \\ a17 & a27 & a37 & a47 \\ a18 & a28 & a38 & a48 \end{bmatrix} \begin{bmatrix} K1^2 \\ Y1 \cdot M1 \\ C1 \cdot Y1 \\ M1 \cdot C1 \end{bmatrix} \quad (7)$$

$$\begin{bmatrix} C \\ M \\ Y \\ K \end{bmatrix} = \begin{bmatrix} b11 & b21 & b31 & b41 \\ b12 & b22 & b32 & b42 \\ b13 & b23 & b33 & b43 \\ b14 & b24 & b34 & b44 \end{bmatrix} \begin{bmatrix} C \\ M \\ Y \\ K \end{bmatrix} + \begin{bmatrix} b15 & b25 & b35 & b45 \\ b16 & b26 & b36 & b46 \\ b17 & b27 & b37 & b47 \\ b18 & b28 & b38 & b48 \end{bmatrix} \begin{bmatrix} K1^2 \\ Y1 \cdot M1 \\ C1 \cdot Y1 \\ M1 \cdot C1 \end{bmatrix} \quad (8)$$

The image area determination unit 303 for detecting a character/line image area is comprised of an ND signal generator 314 and a TEXT/LINE detector 315, as will be described in detail later. The unit 303 determines whether or not the pixel of interest of image data forms a character or line image, and generates a determination signal TEXT indicating that determination result. When the pixel of interest forms a character or line image, a determination signal TEXT="1" is generated; otherwise, a determination signal TEXT="0" is generated.

[Image Area Determination Unit]

The ND signal generator 314 generates an ND signal as a lightness signal that considers the visual sensitivity characteristics of a human being from R, G, and B image signals by the following product sum operation:

$$ND = \begin{bmatrix} d1 & d2 & d3 \end{bmatrix} \begin{bmatrix} R \\ G \\ B \end{bmatrix} \quad (9)$$

where d1, d2, and d3 are constants that take the visual sensitivity characteristics of a human being into consideration.

The TEXT/LINE detector 315 is a means for determining a pixel that forms a character and line image, and generates a TEXT signal upon determining a pixel that forms a character and line image on the basis of the lightness signal ND. Since such circuit is known to those who are skilled in the art, a detailed description thereof will be omitted.

Figure 5:
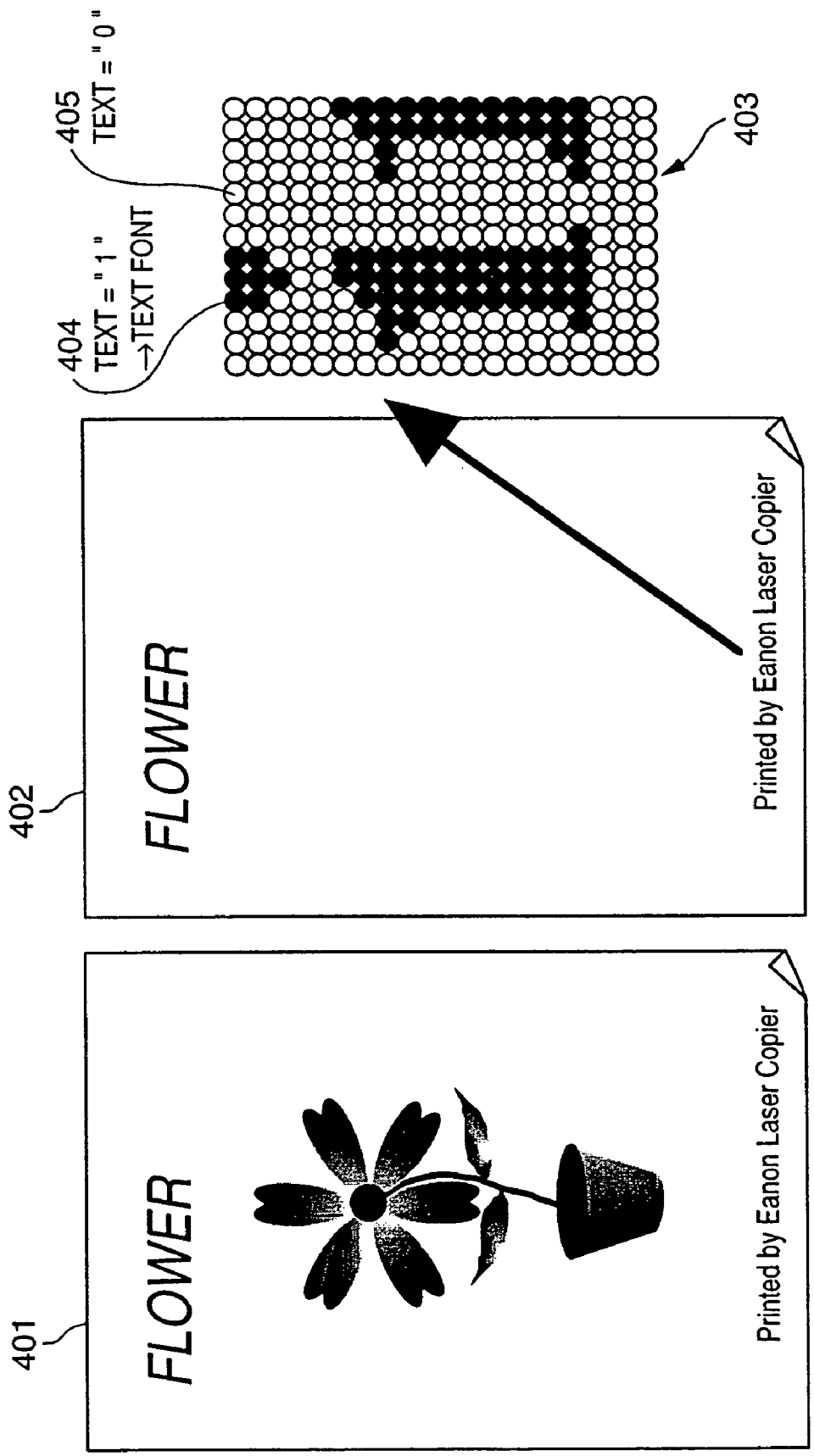
FIG. 5 is a view for explaining a determination signal TEXT.

FIG. 5 is a view for explaining the determination signal TEXT. Reference numeral 401 denotes an image example of the original 202 or a printout; and 402, an image that two-dimensionally represents the determination signal TEXT. That is, in the image 402, character/line image portions alone are indicated by black, and other portions are indicated by white. In an image 403 obtained by partially enlarging the image 402, a pixel indicated by a full circle "●" 404 is the one that forms a character or line image, and the corresponding signal TEXT is set at "1". On the other hand, a pixel indicated by an open circle "○" 405 is the one other than a character or line image, and the corresponding signal TEXT is set at "0".

[PWM Circuit]

FIG. 6 is a block diagram showing the arrangement of the, PWM circuit 313. Note that the arrangement shown in FIG. 6 is for one color, and is required in units of Y, M, C, and K.

Reference numeral 601 denotes a D/A converter for converting an input digital image signal into an analog signal, and sending the analog signal to a comparator 605. Reference numeral 602 denotes a triangular wave generator for an image that attaches importance to gradation characteristics, which generates a triangular wave with a one-pixel period. Reference numeral 603 denotes a triangular wave generator for an image that attaches importance to resolution, which generates a triangular wave with a two-pixel period. Reference numeral 604 denotes a selector which selects one of the two triangular waves in correspondence with the determination signal TEXT, and sends the selected triangular wave to the comparator 605.

With the above-mentioned arrangement, in an image area that forms a character or line image where the determination signal TEXT is "1", a triangular wave for an image that attaches importance to resolution output from the triangular wave generator 603 is compared with the analog signal by the comparator 605. On the other hand, in an image area that forms an image other than a character or line image, a triangular wave for an image that attaches importance to gradation characteristics output from the triangular wave generator 602 is compared with the analog signal by the comparator 605. The output from the comparator 605 is input to a laser driver 606 for driving a semiconductor laser element 607 as a PWM signal.

FIGS. 7A and 7B show pulse-width modulation processes, and FIG. 7A shows those for an image that attaches importance to gradation characteristics. An output 801 from the D/A converter 601 is compared with a triangular wave 802 with a two-pixel period, and a PWM signal 803 is obtained. On the other hand, FIG. 7B shows the pulse-width modulation processes for an image that attaches importance to resolution. An output 804 from the D/A converter 601 is compared with a triangular wave 805 with a one-pixel period, and a PWM signal 806 is obtained.

In practice, the PWM signals 803 and 806 are adaptively switched and output in correspondence with the determination signal TEXT, thus realizing preferred image formation corresponding to the image area characteristics of the image to be formed.

[Image Forming Unit]

The PWM signal output from the comparator 605 in FIG. 6 is input to the laser driver 606 to drive the semiconductor laser element 607, thus outputting a laser beam. The laser beam is scanned by the polygonal scanner (mirror) 213, and forms a latent image on the corresponding photosensitive drum.

Figure 8:
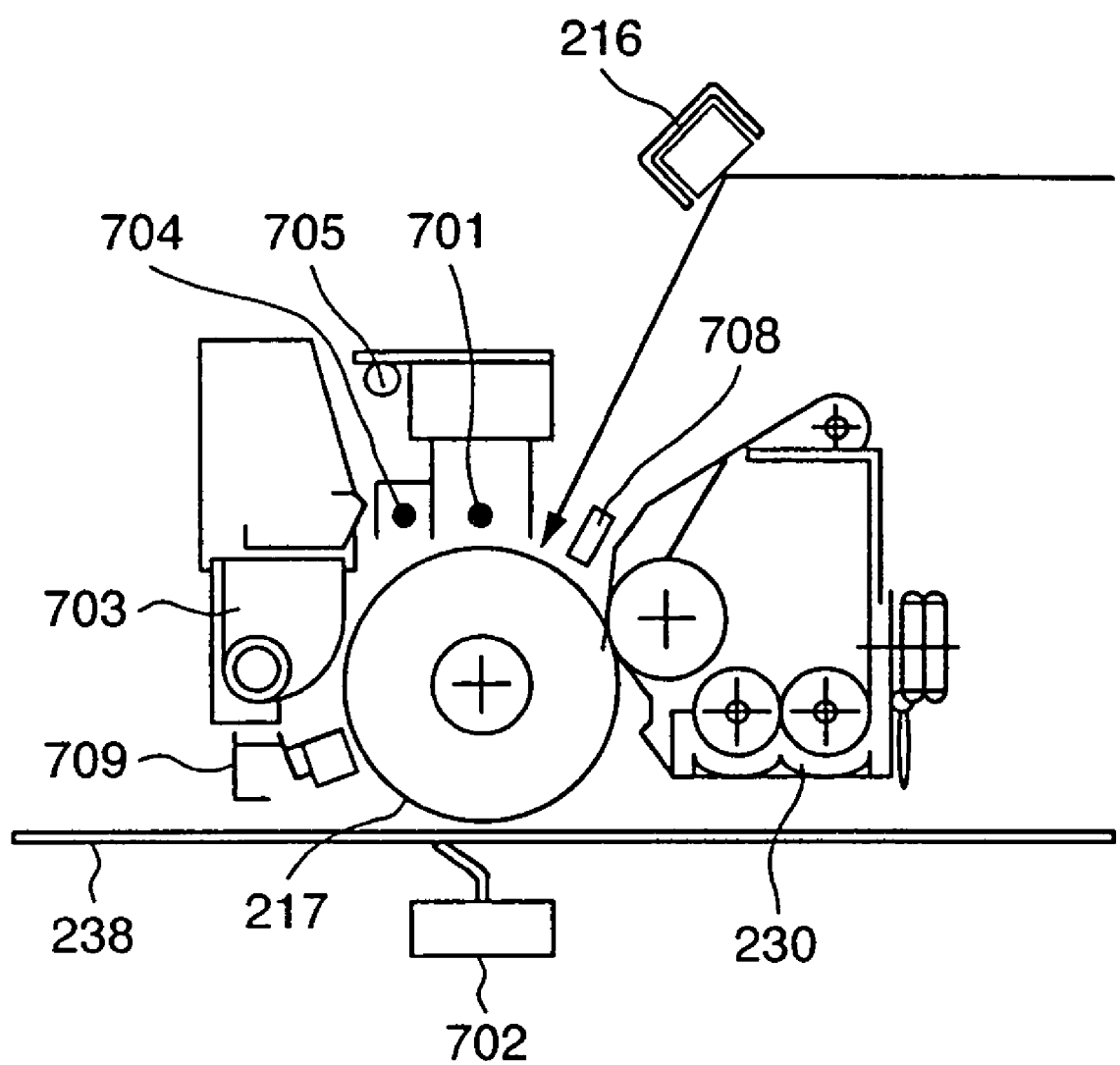
FIG. 8 is a view showing the detailed arrangement of the image forming unit.

As described above, since image forming units corresponding to Y, M, C, and K have identical arrangements, the Y image forming unit alone will be explained below with reference to FIG. 8, and a description of other color image forming units will be omitted.

Around the photosensitive drum 217 in the Y image forming unit, a primary charger 701 for charging the surface of the photosensitive drum 217 to a predetermined potential, the developer 230 for developing a latent image on the photosensitive drum 217 to form a toner image, a transfer blade 702 for discharging from the rear surface of the transfer belt 238 to transfer the toner image on the photosensitive drum 217 onto a recording paper sheet on the transfer belt 238, a cleaner 703 for cleaning the surface of the photosensitive drum 217 after transfer, an auxiliary charger 704 for removing any residual charge on the surface of the photosensitive drum 217 after the transfer, and a pre-exposure lamp 705 are located.

The recording paper sheet onto which the Y toner image is transferred is conveyed by the transfer belt 238, and the respective toner images are transferred onto the recording paper sheet by the corresponding image forming units, thus superposing four color toner images. The recording paper sheet that has left the K image forming unit is subjected to charge removal by a charge remover 261 (see FIG. 2) to facilitate its separation, and is then separated from the transfer belt 238. The recording paper sheet separated from the transfer belt 238 is charged by a pre-fixing charger 262 (see FIG. 2) to compensate for the attraction force of toner and to prevent image disturbance, and is then supplied to the fixing device 240 (see FIG. 2), thus fixing the toner image.

On the other hand, the transfer belt 238 from which the recording paper sheet is separated is subjected to charge removal by a transfer belt charge remover 263 (see FIG. 2), and is cleaned by a belt cleaner (not shown) to prepare for electrostatically attracting the next recording paper sheet.

Note that reference numeral 708 denotes a surface potentiometer for measuring the surface potential of the photosensitive drum 217; and 709, an image density sensor for detecting the image density.

[First Automatic Gradation Correction]

In this embodiment, in order to obtain stable image density and gradation characteristics upon formation of a full-color image, two different kinds of density & gradation control (to be referred to as "automatic gradation correction" hereinafter) are done. The first control in the first automatic gradation correction will be described first.

First Control

Figure 9:
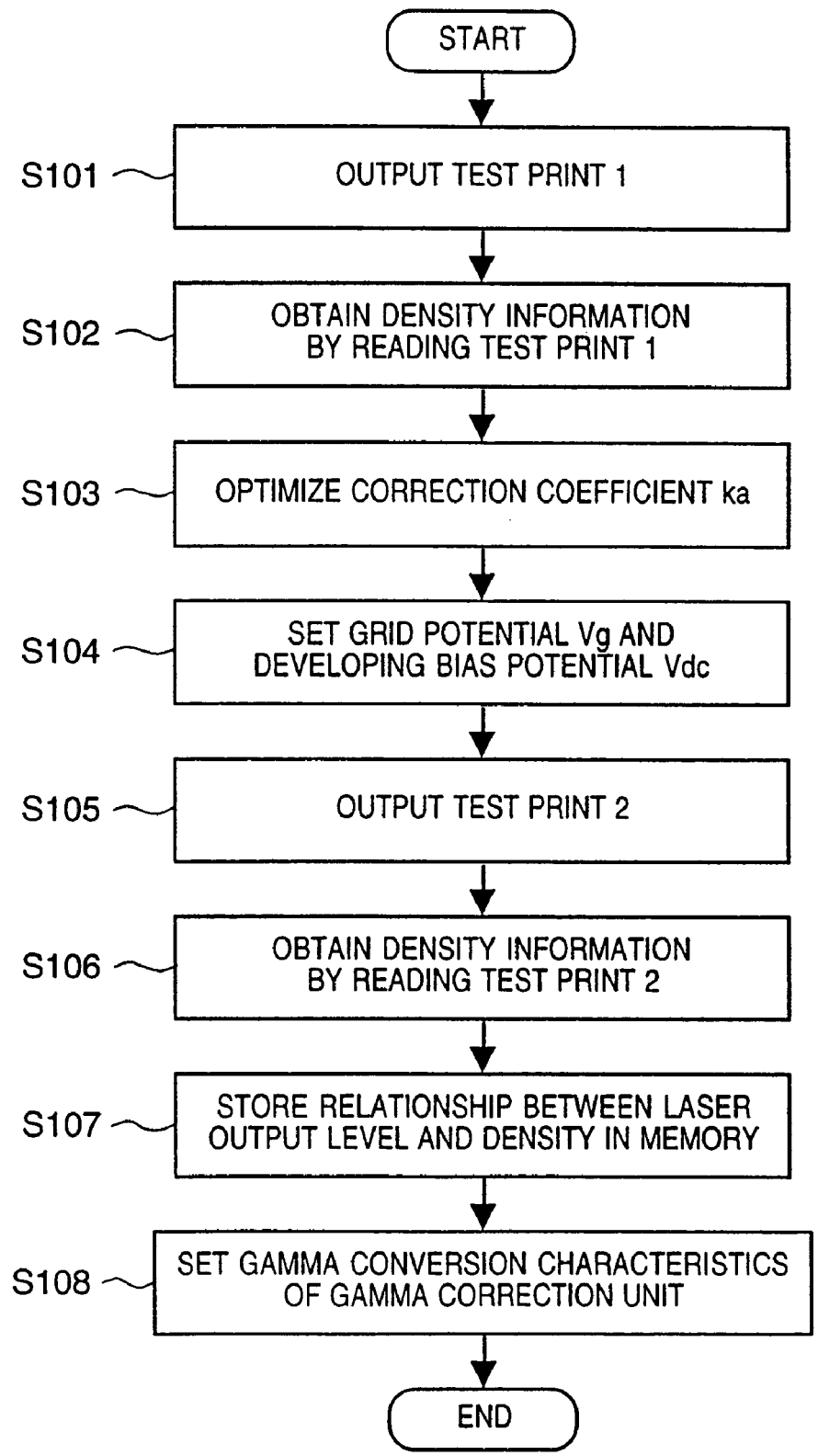
FIG. 9 is a flow chart showing the first control in the first automatic gradation correction.

FIG. 9 is a flow chart showing the first control in the first automatic gradation correction, which is executed by the CPU 300a. FIGS. 10A to 10D show display examples on the control panel 300d of the image forming apparatus 103.

Figures 10A, 10B:
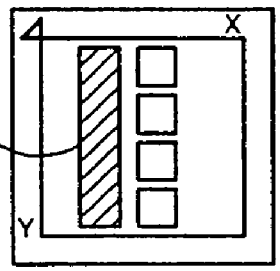
FIGS. 10A to 10D show display examples on a control panel of the image forming apparatus.

When an "automatic gradation correction" key (not shown) placed on the control panel 300d is pressed, the first control starts. A screen shown in FIG. 10A is displayed on the control panel 300d. When a "test print 1" key is pressed, test print 1 is output in accordance with the aforementioned image forming processes instep S101 shown in FIG. 9. At that time, the CPU 300a checks the presence/absence of recording paper sheets required for forming test print 1, and if no recording paper sheets are present, a warning is displayed. Upon forming test print 1, a standard contrast potential (to be described later) corresponding to the environmental conditions of the image forming apparatus 103 is used as a default value. Test print 1 includes a band pattern 1001 defined by an intermediate gradation density of four, Y, M, C, and K colors, and patch patterns 1002, 1003, 1004, and 1005 respectively defined by Y, M, C, and K maximum density patches (density signal level=255), as shown in FIG. 11.

Subsequently, a screen shown in FIG. 10B is displayed on the control panel 300d. When output test print 1 is placed on the platen 201 and a "read" key is pressed, test print 1 begins to be read in step S102. R, G, and B data of the individual patterns of test print 1 are converted into optical densities by the LUT of the LOG converter 304. Note that the LUT of the LOG converter 304 is pre-set with a coefficient calculated using equation (2) above. In other words, a coefficient α in equation (2) is adjusted to obtain optical densities.

A method of correcting the maximum density based on the obtained density information will be explained below. FIG. 12A shows the relationship between the relative value of the surface potential of the photosensitive drum (to be simply referred to as a "surface potential" hereinafter), and the density information obtained by the above-mentioned process.

If a represents the surface potential difference of the photosensitive drum obtained when the photosensitive drum primarily charged to the contrast potential used upon formation of test print 1, i.e., to the developing bias potential is scanned with a laser beam output from the semiconductor laser element driven at maximum emission level, and Da represents the maximum density at that time, the density value normally has a linear relationship with respect to the surface potential of the photosensitive drum in a region near the maximum density, as indicated by a solid line L in FIG. 12A. However, in a two-component developing system, when the toner density in a developer drops, the density value changes nonlinearly with respect to the surface potential of the photosensitive drum in a region near the maximum density, as indicated by a broken curve N in FIG. 12A. Hence, the control amount is determined by setting the control target value of the maximum density to be 1.7 by adding a margin of 0.1 to the target value 1.6 of the final maximum density.

Note that the contrast potential b is calculated by:

$$b = (a + ka) \times 1.7 / Da \quad (10)$$

where ka is a correction coefficient, which is preferably optimized depending on the type of developing scheme in step S103.

A method of obtaining the grid potential and developing bias potential from the contrast potential b will be briefly described below. FIG. 12B shows the relationship between the grid potential and surface potential of the photosensitive drum.

The surface potentiometer 708 (see FIG. 8) measures surface potentials Vd and Vl obtained when a grid potential Vg is set at −300 V, and the photosensitive drum is scanned with a laser beam while driving the semiconductor laser element respectively at minimum and maximum emission levels. Similarly, Vd and Vl upon setting the grid potential Vg at −700 V are measured. From the obtained data at Vg=−300 V and −700 V, data therebetween are obtained by interpolation and the relationship between the grid potential Vg and surface potential of the photosensitive drum is obtained by extrapolation of the obtained data. The control for obtaining the potential data will be referred to as "potential measurement control" hereinafter.

Based on the obtained Vd, a predetermined potential difference Vback (e.g., 150 V) is set to prevent so-called fog toner that becomes attached to an image, thereby setting a developing bias Vdc. The contrast potential Vd is the difference voltage between the developing bias Vdc and Vl, and a larger maximum density can be assured as Vb is larger. On the other hand, the grid potential Vg and developing bias potential Vdc used for obtaining the calculated contrast potential Vb can be calculated from FIG. 12B.

In this embodiment, the contrast potential Vb is calculated to obtain the aforementioned target value=1.7 of the maximum density, and the grid potential Vg and developing bias potential Vdc are set to obtain that contrast potential Vb in step S104.

Figure 13:
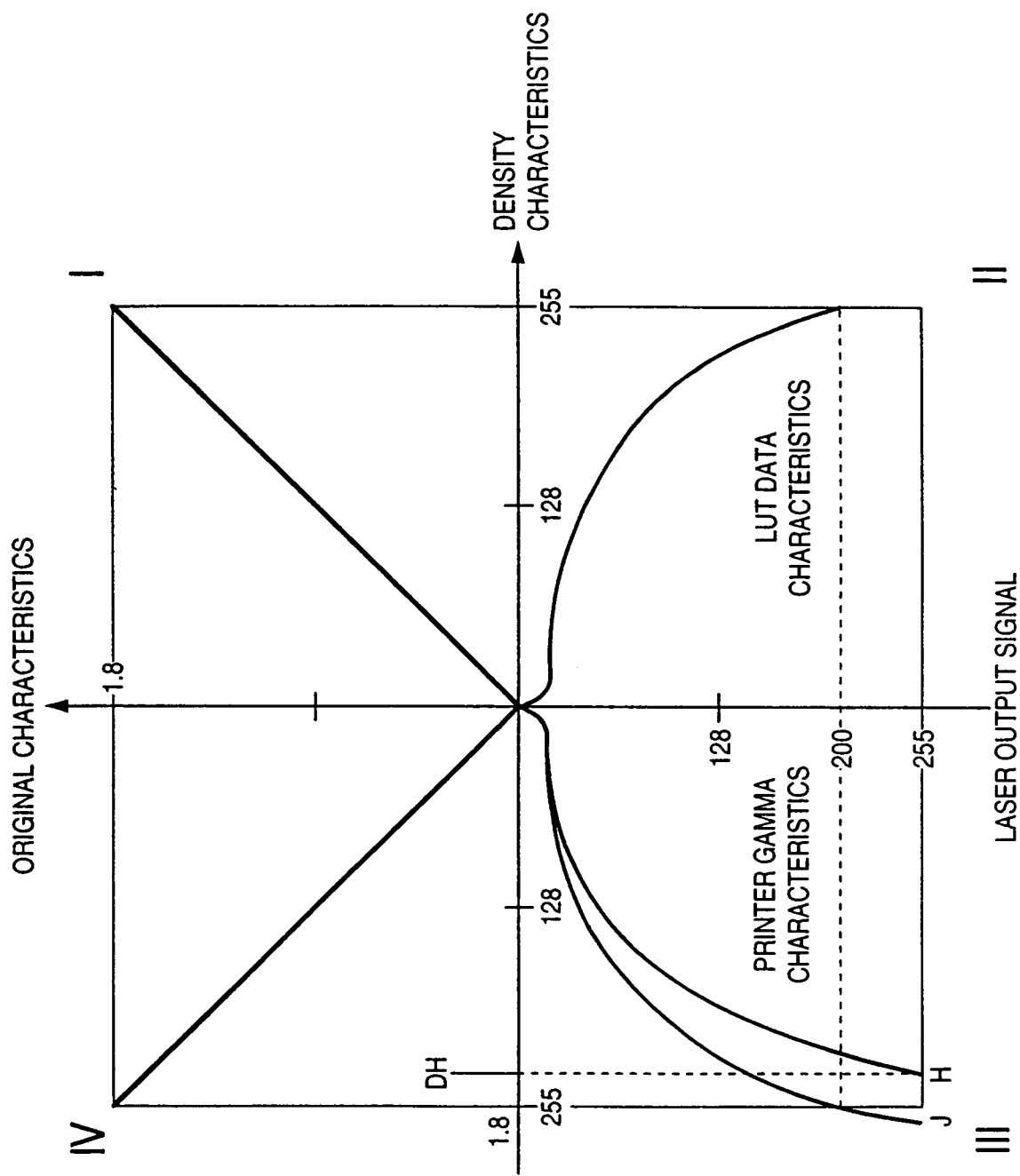
FIG. 13 is a characteristic conversion chart showing an example of the density reproduction characteristics.

The role of the gamma correction unit 312 and the method of correcting gradation will be explained below. FIG. 13 is a characteristic conversion chart showing an example of density reproduction characteristics.

A first region I shown in FIG. 13 indicates the image reading characteristics for converting an original image into a density signal, a second region II indicates the conversion characteristics of the gamma correction unit 312 for gamma-correcting a density signal, a third region III indicates the printer gamma characteristics, which represent the relationship between the laser output signal and image density, and a fourth region IV indicates the relationship between the original density and output image density. That is, the fourth region IV represents the total gradation characteristics of the image forming apparatus 103. In this embodiment, since an 8-bit digital signal is processed per color, the number of gradation levels per color is 256.

Under the maximum density control that sets the relatively high target value of the maximum density, the printer gamma characteristics in the third region III become as represented by a solid curve J. When the control for setting the relatively high target value of the maximum density is not done, the printer gamma characteristics may not reach the target density=1.6, as indicated by a solid curve H. In case of a printer that exhibits the characteristics represented by the solid curve H, since the gamma correction unit 312 has no ability of increasing the maximum density independently of its setups, it is impossible to reproduce densities between a density DH and 1.6.

In the image forming apparatus 103, in order to obtain linear characteristics in the fourth region IV, the curve of the printer gamma characteristics in the third region III is corrected by the gamma conversion characteristics in the second region II. The gamma conversion characteristics to be given to the gamma correction unit 312 can be easily obtained by reversing the I/O relationship of the printer gamma characteristics in the third region III.

Figures 10C, 10D:
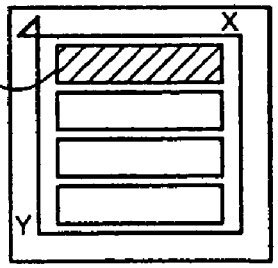

In step S105, test print 2 is output in accordance with a display on the control panel 300d shown in FIG. 10C. Upon outputting test print 2, the gamma correction function of the gamma correction unit 312 is stopped.

Test print 2 includes 4 (rows)×16 (columns) 64-level gradation patch groups, i.e., Y patch groups 1101 and 1105, M patch groups 1102 and 1106, C patch groups 1103 and 1107, and K patch groups 1104 and 1108. These 64-level patches are preponderantly assigned a low-density region of a total of 256 gradation levels, so that the gradation characteristics of a highlight portion can be satisfactorily adjusted. The patch groups 1101, 1102, 1103, and 1104 include patches with a resolution of 200 LPI (lines/inch), and the patch groups 1105, 1106, 1107, and 1108 include patches with a resolution of 400 LPI. Patch groups having identical gradation patterns may be output at two resolutions. However, when the gradation characteristics largely vary depending on different resolutions, specific gradation patterns are preferably set corresponding to individual resolutions.

A screen shown in FIG. 10D is then displayed on the control panel 300d. When output test print 2 is placed on the platen 201 and the "read" key is pressed, test print 2 begins to be read in step S106. In step S107, the density information output from the LOG converter 304 is stored in a memory together with the laser output level and the position information of the corresponding patch.

In this process, the printer gamma characteristics shown in the third region III in FIG. 13 can be obtained, and the gamma conversion characteristics of the gamma correction unit 312 are set by reversing the I/O relationship of the obtained gamma characteristics in step S108. Upon obtaining the gamma conversion characteristics, since only data corresponding in number to the patches of the gradation patterns in test print 2 are available, short data are obtained by interpolation so that the laser output levels can correspond to all levels 0 to 255 of the density signal.

Second Control

The second control in the first automatic gradation correction will be explained below.

When latent images are developed successively, the toner density of toner in the developer lowers, resulting in developing characteristic drop. Also, the developing characteristics change due to changes in environments, repetition of the developing process, and the like, and consequently, the image density and gradation reproducibility change.

In this embodiment, in order to suppress changes in image density and gradation reproducibility and to obtain stable density and gradation reproducibility, image density detection control for controlling the image density and gradation reproducibility by forming a test pattern on the photosensitive drum, and detecting the density of the test pattern by the image density sensor 709 (see FIG. 8) set at a position opposing the photosensitive drum is done as the second control. Furthermore, as for chromatic color image formation, toner density detection control for detecting and controlling the toner density of toner in each developer using a toner density sensor equipped in that developer is done. Note that the image density sensor 709 and toner density sensor each comprise a light-emitting unit such as an LED, and a light-receiving unit such as a photodiode for receiving light output from the light-emitting unit.

In this embodiment, in the developing process of chromatic colors, i.e., upon forming Y, M, and C color images, the signal output by the image density detection control is used in correction of the toner density detection control. The toner density detection control will be explained below taking Y image formation as an example.

The developer 230 includes the toner density sensor. This toner density sensor uses characteristics in which toner in two-component toner reflects infrared light, and conversely, carrier absorbs infrared light. That is, the LED irradiates infrared light onto toner in the developer 230, and the photodiode detects the amount of infrared light reflected by the toner, thus calculating the toner density of the toner. By replenishing toner in correspondence with the calculated toner density, the image density is controlled.

Let $SIG_{(init-Y)}$ be the output from the photodiode obtained by measuring the amount of light reflected by toner while the toner is still unused immediately after toner is put into the developer 230. $SIG_{(init-Y)}$ is stored in the memory as the control target value of the toner density of toner.

When the image forming processing is started and the toner begins to be used, the output $SIG_{(cal-Y)}$ of the photodiode is measured for the toner at that time every formation of an image, and a difference $\Delta SIG$ from $SIG_{(init-Y)}$ stored in the memory is calculated $$\Delta SIG(Y) = SIG_{(init-Y)} - SIG_{(cal-Y)} \qquad (11)$$

From equation (11) above and an output sensitivity value RATE per 1 wt. % variation of toner density, which is measured in advance, a deviation $\Delta D$ of the toner density at that time from the initial value is calculated as $$\Delta D = \Delta SIG / RATE \qquad (12)$$

The amount of toner to be replenished into the developer 230 is determined based on the calculated value of the deviation $\Delta D$. That is, when the deviation $\Delta D$ assumes a negative value, toner corresponding to that deviation ΔD is replenished; when the deviation ΔD assumes a positive value, toner replenishment is stopped. For example, when ΔD is −1 wt. %, 1 wt. % toner is replenished; when ΔD is +1 wt. %, no toner is replenished. In this way, the initial toner density is maintained.

The image density detection control will be explained below.

The image density detection control is executed at a predetermined timing, and forms a patch image as a reference image for density detection on the photosensitive drum 217. More specifically, a patch image signal of a signal level corresponding to a predetermined density, which is generated by a pattern generator, is supplied to the PWM circuit 313. With this signal, a patch electrostatic latent image corresponding to the predetermined density is formed on the photosensitive drum 217, and is developed by the developer 230. Note that the density of the patch is set at a value that most easily allows control of the developing characteristics. With this control, not only the image density but also the gradation reproducibility can be controlled to desired characteristics.

The density of the patch toner image is measured by the image density sensor 709. The measured patch density corresponds to the toner density of toner in the developer 230.

More specifically, a signal $S_{(sig-Y)}$ output from the photodiode of the image density sensor 709 is supplied to one input terminal of a subtracter (not shown). The other input terminal of this subtracter receives a reference signal $S_{(int-Y)}$ corresponding to the prescribed density (initial density) of the patch. Hence, the subtracter outputs a signal $S_{(cal-Y)}$ representing the difference between the density of the patch toner image and initial density, i.e., the density difference. The signal $S_{(cal-Y)}$ is supplied to the CPU 300a. This signal $S_{(cal-Y)}$ is used in correction of the toner replenishment control to the developer 230 under the above-mentioned toner density detection control.

In general, the image density increases with increasing toner density of toner. Conversely, the image density decreases with decreasing toner density of toner. Also, developing efficiency changes due to variations of environments, deteriorated durability, and the like. Hence, a constant density cannot be guaranteed by the toner density detection control alone. For this reason, in this embodiment, the target value $SIG_{(init-Y)}$ of the toner density detection control is adjusted based on the signal $S_{(cal-Y)}$ representing the density difference and obtained by the image density detection control.

An example of the method of adjusting the target value $SIG_{(init-Y)}$ of the toner density detection control will be described below. Assume that the initial toner density of toner is 6 wt. %. When the image density detection control is done after toner has been replenished based on the output from the toner density sensor to have a toner density of 6 wt %, and it is determined that the patch density is lower than the initial density and 5 g of toner are required to restore the initial density, the current toner density is probably lower around 1 wt. % than the initial density. Hence, the target value of the toner density detection control is changed from 6 wt. % to 7 wt. % as a new target value $SIG_{(tgt-Y)}$, and after that, the toner density detection control is done using the new target value. With this control, the image density can be maintained at a desired value. Of course, in the developer of this embodiment, 5 g of toner correspond to about 1 wt. %, but this value varies depending on developers.

[Second Automatic Gradation Correction]

The toner density is controlled using the second control in the aforementioned first automatic gradation correction, and the control target value of the toner density is corrected based on the density of a patch formed on the photosensitive drum, thus suppressing variations of the developing characteristics and assuring stable image density and gradation reproducibility.

However, the image density and gradation reproducibility are not determined by only the developing characteristics corrected under the second control. For example, the image density and gradation reproducibility vary due to various other factors such as changes in light attenuation characteristics of the photosensitive drum, changes in intensity of a laser beam, variations of mechanical precision of the apparatus, and the like. Changes in image density and gradation reproducibility resulting from these factors cannot be absorbed by the first control in the first automatic gradation correction mentioned above. That is, when the variations resulting from the above factors are corrected by the first control, such correction changes the conditions of the second control, and not only desired control performance cannot be obtained, but also the variations corrected by the first control reappear, i.e., the state before the correction is reassumed.

Hence, in this embodiment, in order to effectively apply the first control and second control, the second control is adjusted on the basis of the result in the first control. This adjustment will be described in detail below taking Y control as an example.

A patch in the image density detection control is formed at a predetermined density optimal to guarantee the gradation reproducibility. That is, a patch image signal output from the pattern generator is sent to the gamma correction unit 312, and is gamma-converted to obtain a desired density. Then, the patch is formed on the photosensitive drum based on the gamma-converted patch image signal.

The gamma conversion characteristics of the gamma correction unit 312 are appropriately changed under the first control, as described above. Hence, the density of the patch formed on the photosensitive drum has been adjusted to a pre-set optimal density by executing the first control.

The density difference signal $S_{(cal-Y)}$ obtained from the patch density $S_{(sig-Y)}$ obtained by forming and detecting the patch, and the reference signal $S_{(int-Y)}$ is saved in a memory as a correction value $S_{(adj-Y)}$ of the reference signal, and after that, the aforementioned image density detection control is done using a new reference signal $S_{(aint-Y)}$ obtained by adding/subtracting the correction value $S_{(adj-Y)}$ to/from the reference signal $S_{(int-Y)}$ as the prescribed density (initial density) of the patch. As a result of this control, desired image density and optimal gradation characteristics that had been obtained by correction by the first control can be maintained using the image density detection control.

Furthermore, immediately after the first control, the toner density of toner is in a transition period of control, and does not often converge to the new target value $SIG_{(tgt-Y)}$ set by the image density detection control. In this embodiment, simultaneously with the first control, the toner density $SIG_{(cal-Y)}$ is detected by the toner density sensor, and replaces a new target value $SIG_{(tgt-Y)}$. As a result, desired image density and optimal gradation characteristics that had been obtained by correction by the first control can be maintained using the toner density detection control.

To restate, according to this embodiment, the image density and gradation reproducibility are controlled by the first control according to the present invention, and are also controlled by the second control. Furthermore, by adjusting the second control based on the result of the first control, a full-color image with a stable image density and gradation reproducibility can be formed.

[PDL]

FIGS. 15A to 15D are views for explaining PDL data.

Figures 15A, 15B, 15C, 15D:
FIGS. 15A to 15D are views for explaining PDL data.

PDL represented by PostScript® of Adobe Corporation is a language for describing an image for one page by combining elements such as an image description by a character code, image description by a figure code, image description by raster image data, and the like, as shown in FIG. 15A, and data that describes an image by PDL is the PDL data.

FIG. 15B shows a description example by a character code. In FIG. 15B, line L100 includes a description for designating a character color, and the contents in parentheses { } represent the densities of C, M, Y, and K in turn from the left (minimum value=0.0, maximum value=1.0). Hence, the description in line L100 designates a black character color.

Also, line L101 includes a description for substituting a character string "IC" in a variable String1, and line L102 includes a description for laying out the character string. In this line, the first and second parameters represent the x- and y-coordinates of the lower left vertex of a rectangular region where the character string is to be laid out, the third parameter the character size, the fourth parameter the character spacing, and the fifth parameter the character string to be laid out. That is, the description in line L102 instructs to lay out the character string "IC" stored in the variable String1 from a coordinate position (0.0, 0.0) to have a size=0.3 and a spacing=0.1.

FIG. 15C shows a description example by a figure code. Line L103 includes a description for designating the line color as in line L100, and red is designated as the line color. Line L104 designates drawing of a line. In this line, the first and second parameters represent the start point coordinates of the line, the third and fourth parameters the end point coordinates of the line, and the fifth parameter the thickness of the line. That is, the description in line L104 instructs to draw a line having a thickness=0.1 from a coordinate position (0.9, 0.0) to a coordinate position (0.9, 1.0).

FIG. 15D shows a description example by raster image data. Line L105 includes a description for substituting a raster image in a variable image1. In line L105, the first parameter represents the image type and the number of color components of the raster image, the second parameter the number of bits per color component, and the third and fourth parameters the image sizes of the raster image in the x- and y-directions. The fifth parameter and subsequent parameters represent raster image data. Hence, the number of raster image data corresponds to the product of the number of color components represented by the first parameter, and the image sizes in the x- and y-directions represented by the third and fourth parameters. In the description in line L105, since CMYK having four color components is designated as the image type and the image sizes in the x- and y-directions are respectively 5, the number of raster image data is 4×5×5=100.

Line L106 includes a description for laying out raster image data. In this line, the first and second parameters represent the x- and y-coordinates of the lower left vertex of a rectangular region where the raster image data is to be laid out, the third and fourth parameters x- and y-sizes of the rectangular region, and the fifth parameter the raster image data to be laid out. That is, the description in line L106 instructs to lay out raster image data stored in the variable image1 in a 0.5×0.5 rectangular region having a coordinate position (0.0, 0.5) as the lower left vertex.

Figure 16:
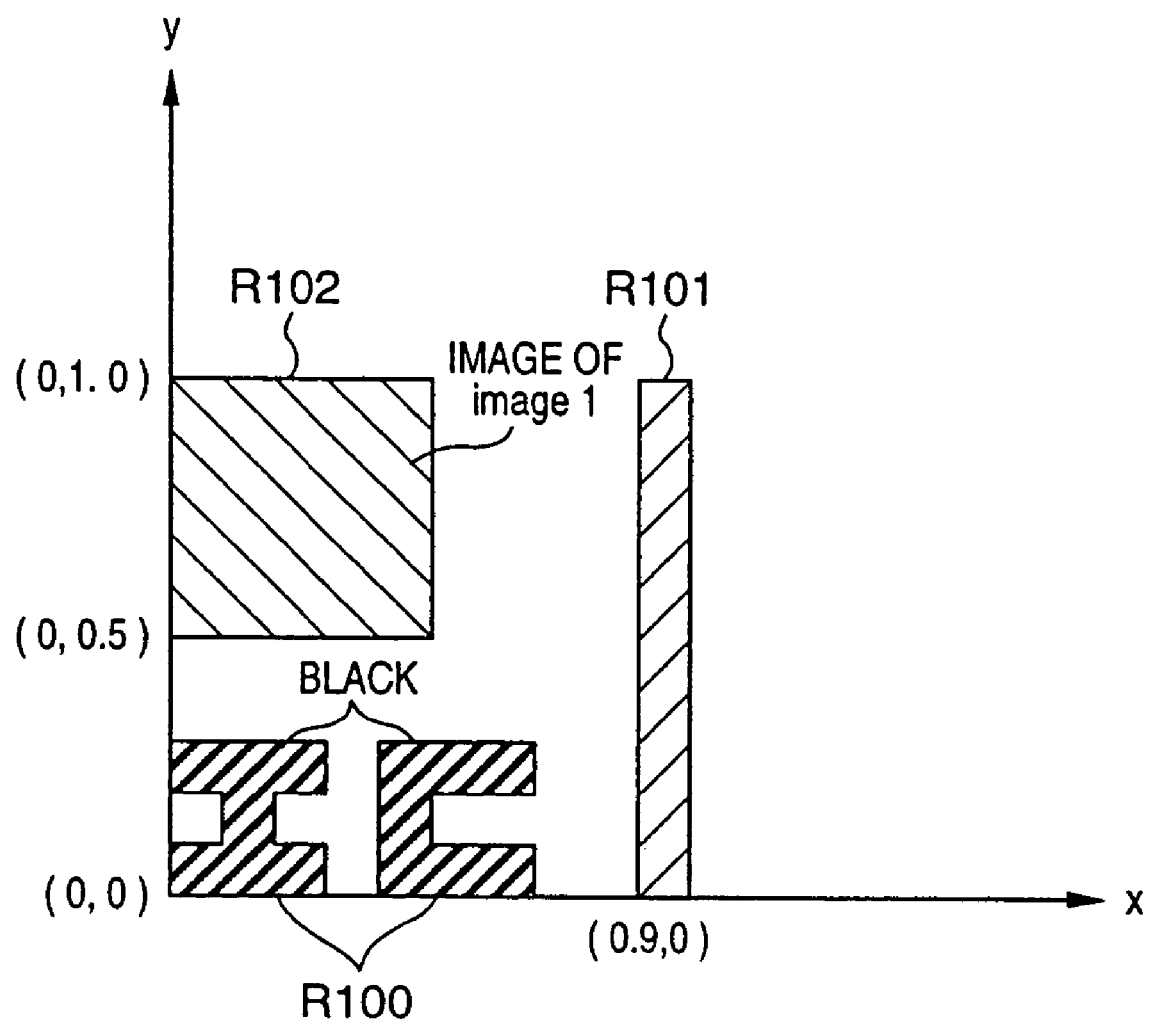
FIG. 16 shows raster image data mapped or rasterized by interpreting the PDL data shown in FIGS. 15A to 15D.

FIG. 16 shows raster image data mapped by interpreting the PDL data shown in FIGS. 15A to 15D.

Images R100, R101, and R102 are obtained by mapping the PDL data shown in FIGS. 15B, 15C, and 15D. These raster image data are mapped on the DRAM 352 in units of C, M, Y, and K color components in practice. For example, in a portion of image R100, data of C, M, Y, and K planes on the DRAM 352 are respectively C=0, M=0, Y=0, and K=255. On the other hand, in a portion of image R101, data of C, M, Y, and K planes on the DRAM 352 are respectively C=0, M=255, Y=255, and K=0.

In this way, PDL data sent from the host computer 101 is mapped into raster image data by the CPU 351a of the controller 102, and is written in the DRAM 352. In the above example, PDL data which is mapped into C, M, Y, and K raster image data has been exemplified. Also, even PDL data which is mapped into R, G, and B raster image data can be mapped into the raster image data by interpreting the PDL data.

[Mapping of PDL]

Figure 17:
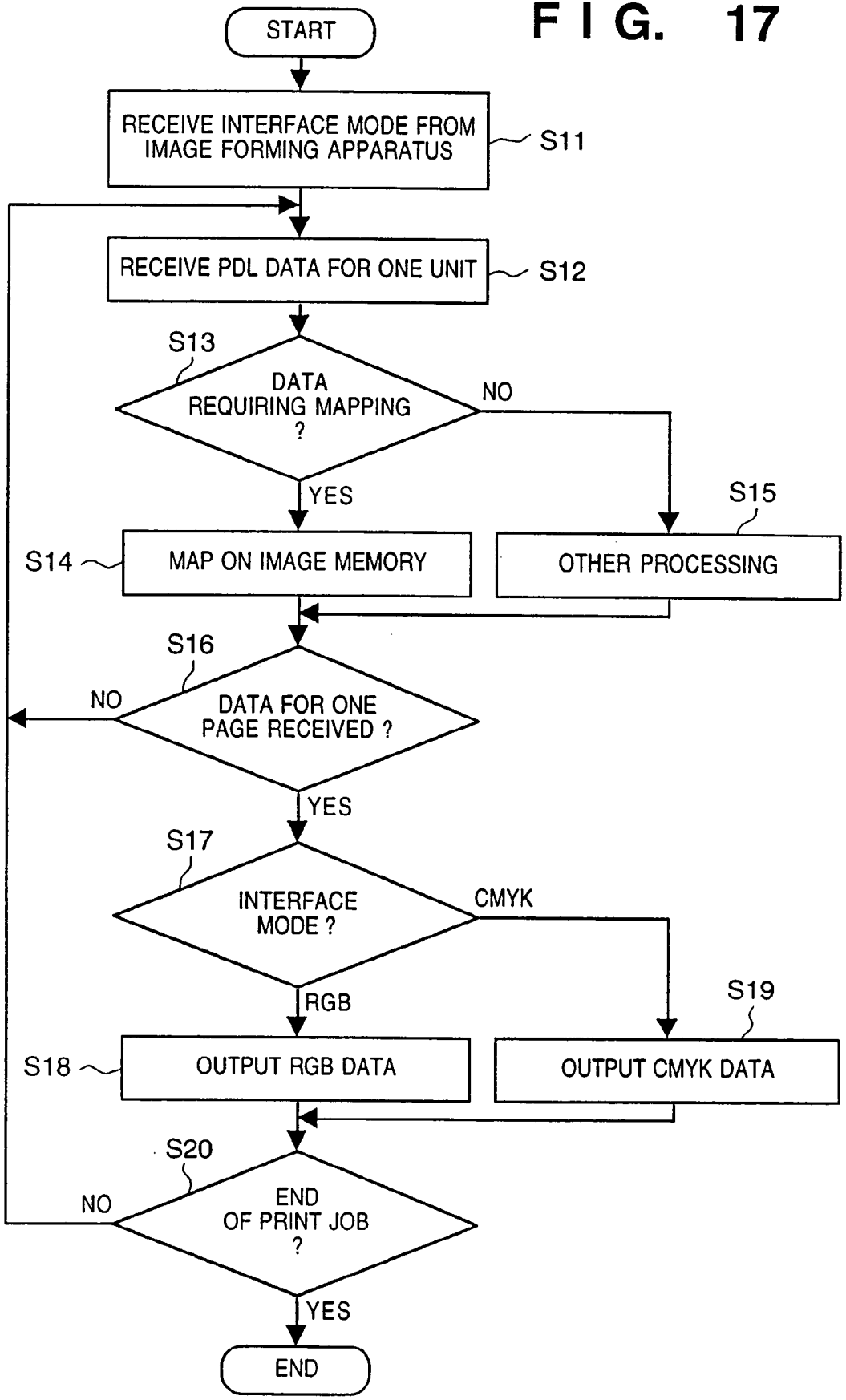
FIG. 17 is a flow chart showing the control of a controller shown in FIGS. 3A and 3B.

FIG. 17 is a flow chart showing the control of the controller 102, which is executed by the CPU 351a upon reception of a print job from the host computer 101.

In step S11, an interface mode is received from the image forming apparatus 103. The interface mode represents if R, G, and B data or C, M, Y, and K data are to be sent to the image forming apparatus 103.

In step S12, PDL data for one unit is received from the host computer 101. The one unit may be the one suitable for processing, and may be in units of several bytes, several lines, pages, and so forth.

In step S13, it is checked if the received PDL data are the data to be mapped into raster image data, e.g., line L102 in FIG. 15B, line L104 in FIG. 15C, or line L105 in FIG. 15D. If YES in step S13, the received PDL data are mapped into raster image data and are written in the DRAM 352 in step S14. On the other hand, if the received PDL data does not require any mapping, e.g., line L100 in FIG. 15B, processing for setting the data in internal variables for the RIP or the like is executed in step S15. FIG. 17 shows an example wherein the processing in steps S13 to S15 repeats itself in units of data received in step S12. However, when PDL data more than the processing unit in steps S13 to S15 are received in step S12, the received PDL data may be divided into processing units to repeat the processing in steps S13 to S15.

It is then checked in step S16 if PDL data for one page have been received and mapped. The processing in steps S12 to S16 repeats itself until the PDL data for one page have been received and mapped. Normally, since PDL data contain information indicating the end of page like an EOF (End of File) code, or information for instructing the start of printing, the end of page is determined using such information.

When the PDL data for one page have been received and mapped, it is checked in step S17 if the interface mode is the RGB or CMYK mode. If the interface mode is the RGB mode, R, G, and B image data are sent to the image forming apparatus 103 in step S18; if the interface mode is the CMYK mode, C, M, Y, and K image data are sent to the image forming apparatus 103 in step S19. Hence, if the raster image data mapped on the DRAM 352 has a format different from that to be sent to the image forming apparatus 103, the image data read out from the DRAM 352 must be subjected to RGB-CMYK conversion.

The image forming apparatus 103 forms an image for one page on the basis of the image data sent from the controller 102. Note that the R, G, and B image data received by the image forming apparatus 103 are sent to the LOG converter 304 via the external interface 309, or the received C, M, Y, and K image data are sent to the selector 310 via the external interface 309.

The above-mentioned processing repeats itself until it is determined in step S20 that the print job ends.

In the above description, image data with the format according to the interface mode received from the image forming apparatus 103 instep S11 is output. Conversely, the controller 102 may inform the image forming apparatus 103 of the format of image data represented by PDL data sent from the host computer 101, and the interface mode may be set in correspondence with that format.

[Generation of Determination Signal TEXT from PDL]

A case will be exemplified below wherein an image shown in FIG. 19, which is described by PDL data shown in FIG. 18, is to be mapped.

Figure 19:
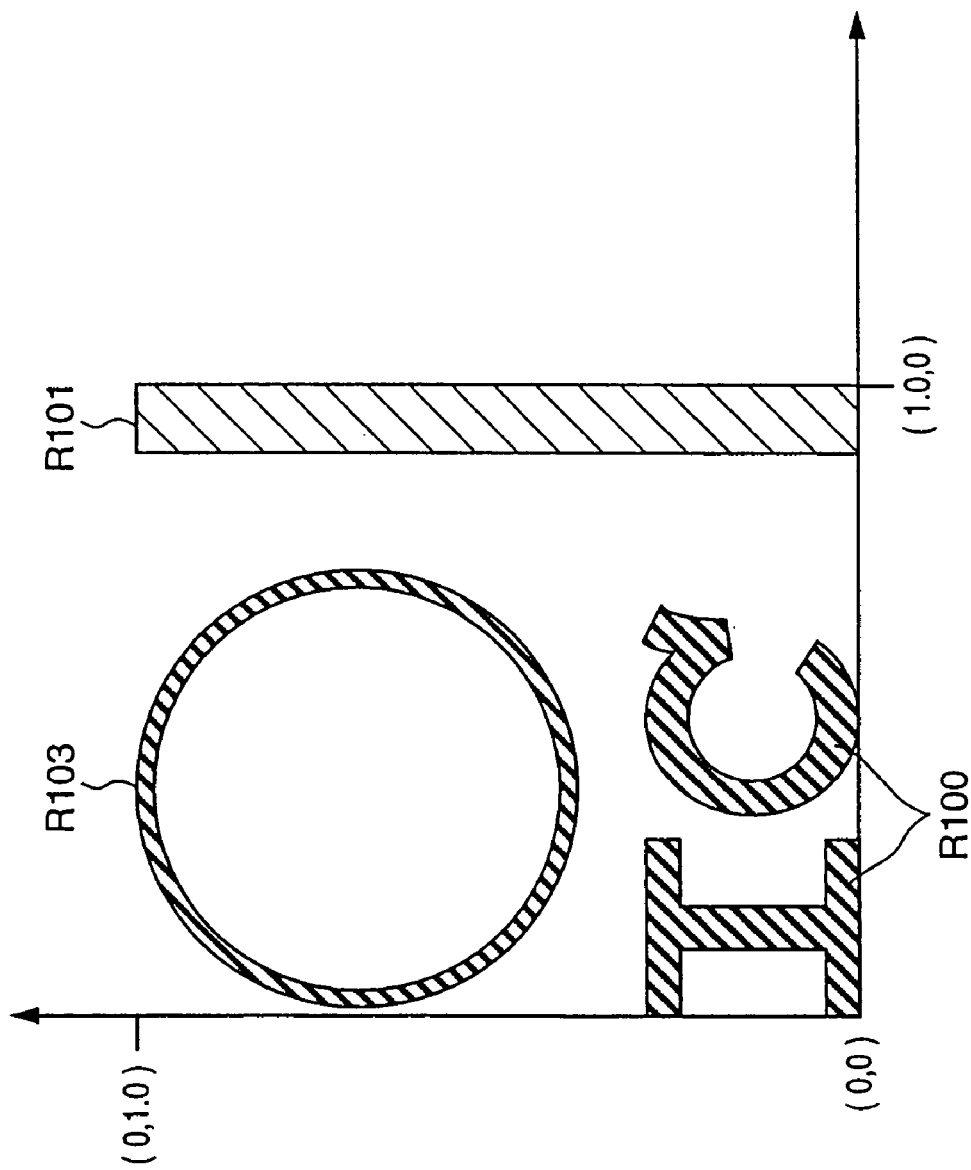
FIG. 19 shows images represented by the PDL data shown in FIG. 18.

An image described in lines L100 to L104 in FIG. 18 is the same as that described in lines L100 to L104 in FIGS. 15B and 15C, and images R10 and R101 shown in FIG. 19 are mapped as in FIG. 16. A description of a figure code in lines L107 to L108 in FIG. 18 instructs to form a circle R103 having a central position (0.3, 0.7), radius=0.3, and an edge line width=0.05 so as to have an edge color of magenta and interior color of yellow.

Figure 20:
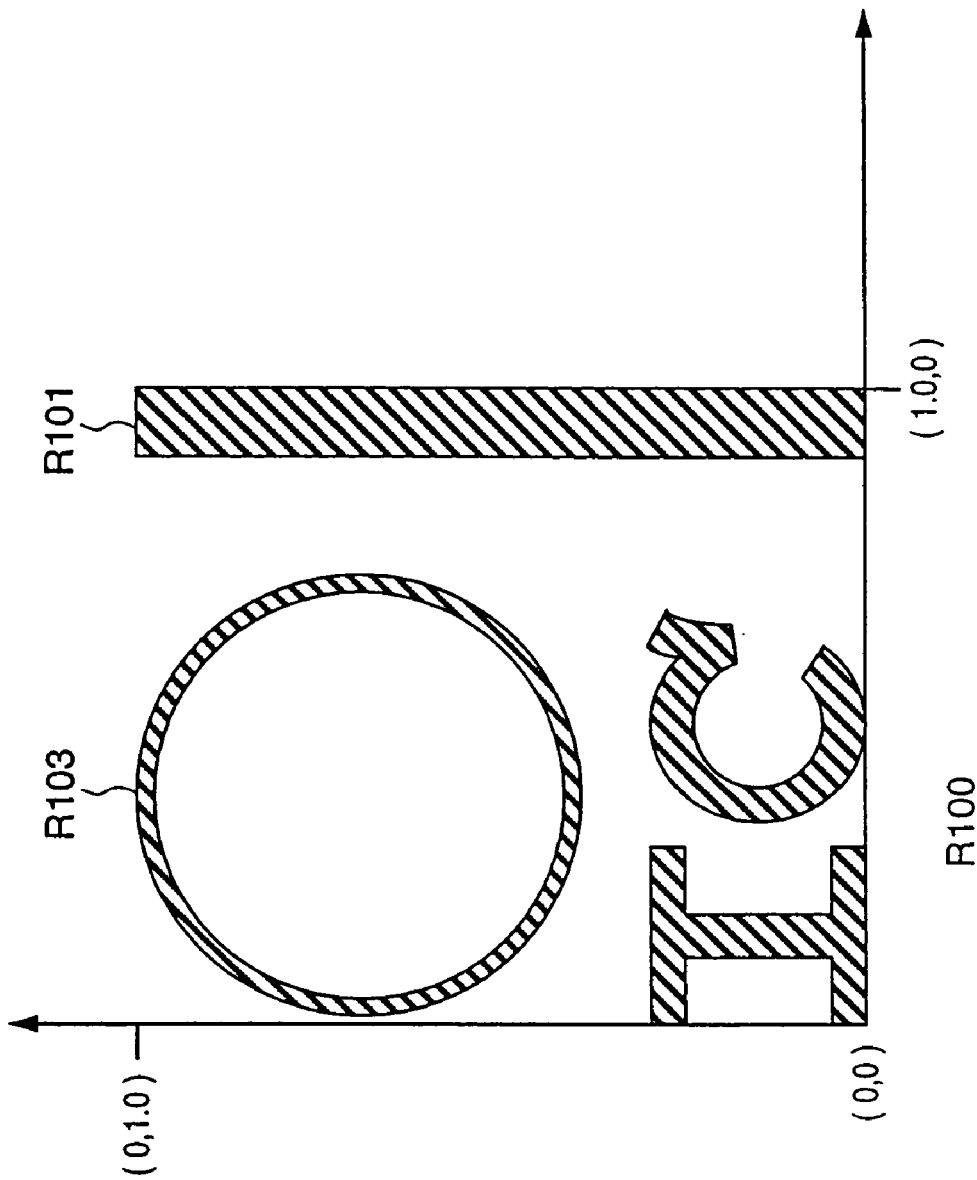
FIG. 20 shows images obtained by extracting lines and edge portions that form character portions and figures of the images shown in FIG. 19.
Figure 22A:
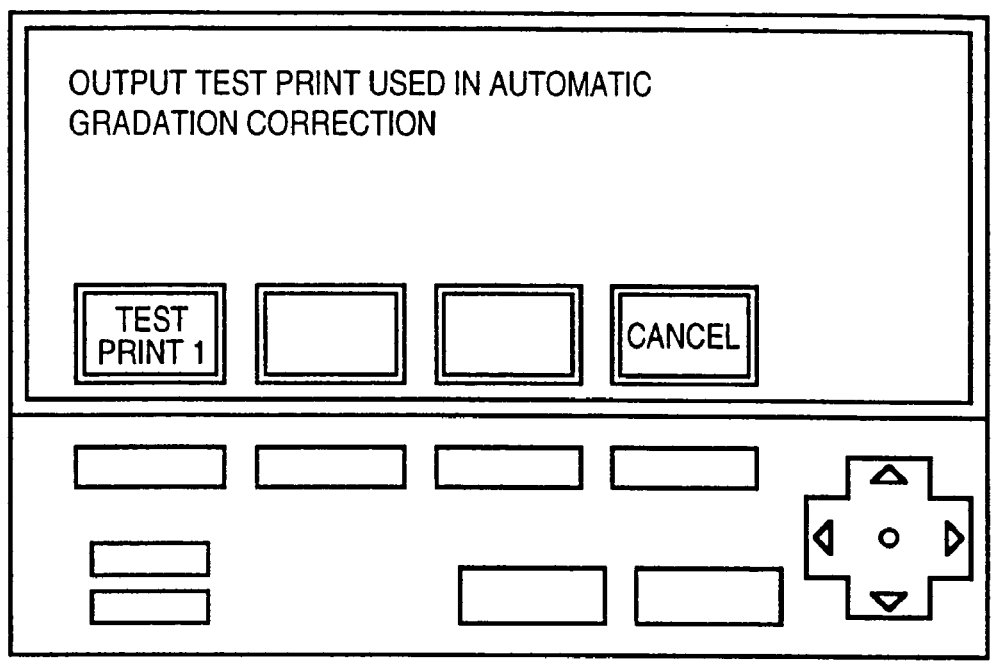
FIGS. 22A to 22D show display examples on the control panel of the controller upon execution of automatic gradation correction from the controller.
Figure 22B:
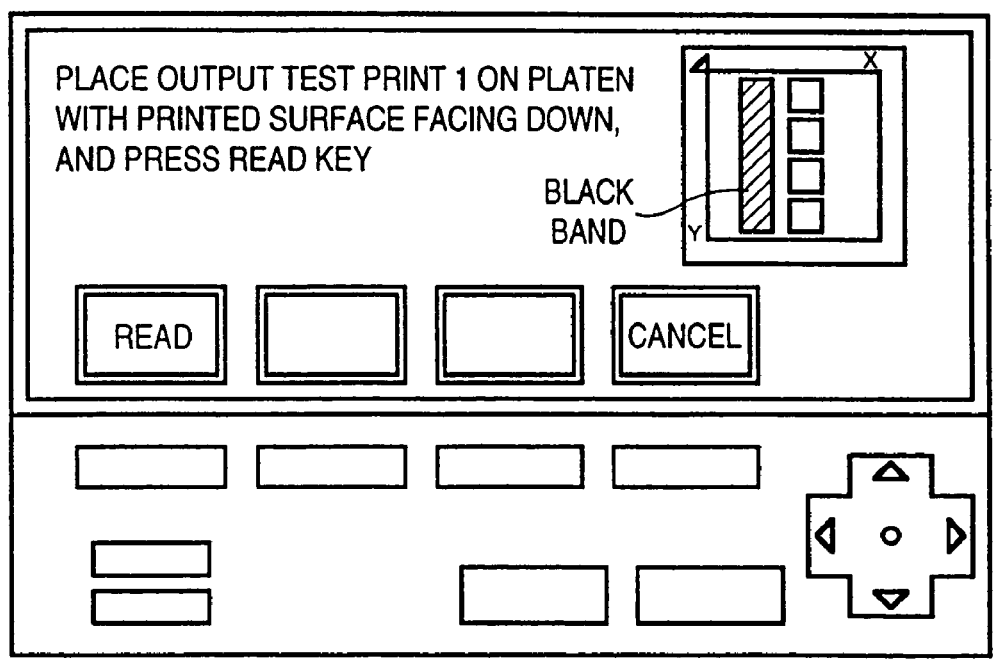
Figure 22C:
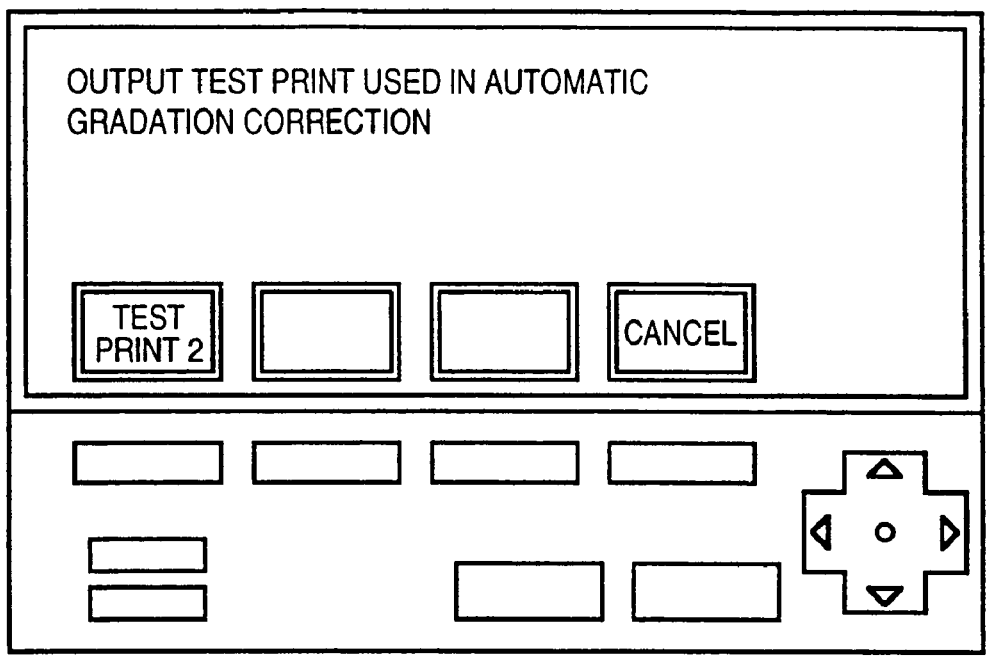
Figure 22D:
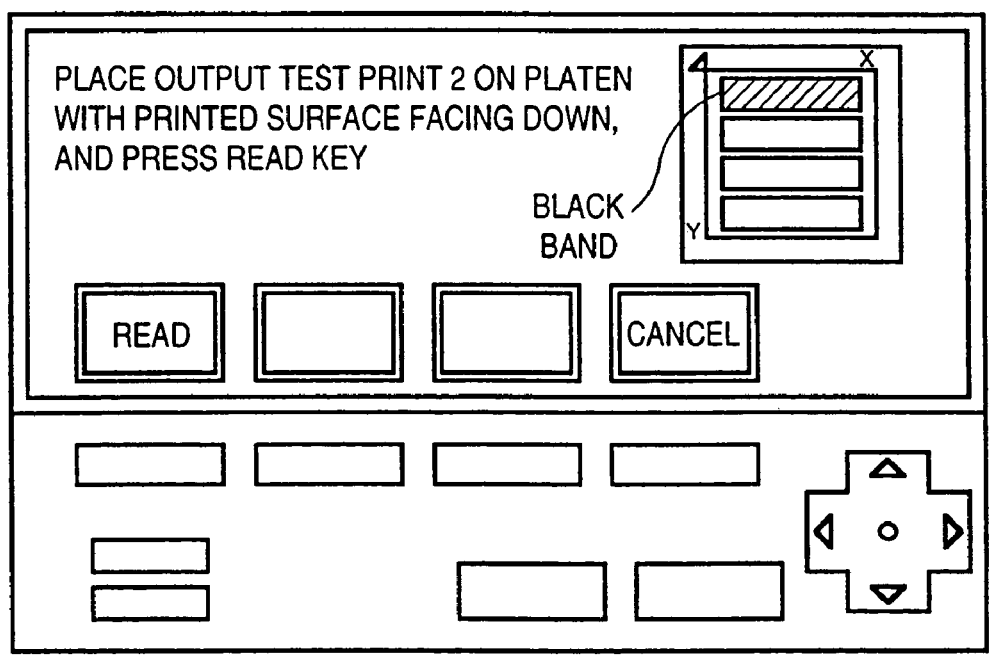

FIG. 20 shows an image obtained by extracting line and edge portions that form a character portion and figure of the image shown in FIG. 19. Determination signals TEXT of the respective pixels of the extracted images shown in FIG. 20, i.e., those of the pixels corresponding to the line and edge portions that form the character portion and figure are set at "1", determination signals corresponding to other pixels are set at "0", and these determination signals are stored in the DRAM 352 as TEXT data. The TEXT data is generated simultaneously with mapping of the PDL data described above. Therefore, when the mapped image data is C, M, Y, and K image data, a total of 33-bit data, i.e., C, M, Y, and K 8-bit data and 1-bit TEXT data, per pixel are stored in the DRAM 352.

[Switching of Number of Lines Based on Determination Signal TEXT]

FIG. 21 is a flow chart for explaining the control for switching the number of lines based on the determination signal TEXT, which control is executed by the CPU 300a after the power switch of the image forming apparatus 103 is turned on.

In step S21, a line number switching mode is designated from the control panel 300d. The line number switching mode is not always required, but a mode that was set upon previous startup or a default mode may be used. Also, the host computer 101 may instruct the line number switching mode via the controller 102 in place of the control panel 300d. The execution timing of this control is not limited to that immediately after power ON of the image forming apparatus 103, but the line number switching mode may be instructed any time unless a print job is being executed.

The line number switching mode includes the following three modes. (1) 200-line fixed mode: this mode forms an image while fixing the number of lines to 200 lines, and is suitable for outputting an image which includes a picture on the entire page; (2) 400-line fixed mode: this mode forms an image while fixing the number of lines to 400 lines, and is suitable for outputting an image which includes characters and line images on the entire page; and (3) image area separation switching mode: this mode determines in units of image areas if the image area of interest includes a character/line image or picture and forms a character/line image area at 400 lines and a picture area at 200 lines in accordance with the determination results, and is suitable for outputting an image which includes both characters/line images and pictures and allows easy determination of a character/line image area and picture area.

Also, in the image area separation switching mode, it may be checked in units of image areas if image data included in the area of interest has a specific value, and an image area that has the specific value may be formed at 400 lines; other image areas may be formed at 200 lines. Such mode is suitable for outputting an image which includes both characters/line images and pictures, and in which the characters/line images have a specific value, e.g., a value representing black.

After the line number switching mode is designated in step S21, the control waits for a print request command received from the controller 102 instep S22. Upon reception of the print request command, the line number switching mode is checked in step S23. If the current mode is the 200-line fixed mode, the 200-line fixed mode is set by fixing the determination signal TEXT to "0" in step S24. On the other hand, if the current mode is the 400-line fixed mode, the 400-line fixed mode is set by fixing the determination signal TEXT to "1" in step S25. Also, if the current mode is the image area separation switching mode, the image area separation switching mode is set without fixing the determination signal TEXT in step S26. Instep S27, printing is done.

That is, when the image area separation switching mode is set, a determination signal TEXT read out from the memory 108 of the image forming apparatus or the DRAM 352 of the controller 102 is supplied to the PWM circuit 313 and the like. The read timing of the determination signal TEXT is synchronized with that of image data shown in FIG. 4. If it is hard to access different addresses of a single memory in terms of time upon reading out TEXT data from the memory, identical TEXT data may be stored in four memory planes and may be read out from the corresponding memory plane in synchronism with the read timing of each color image data.

[Automatic Gradation Correction from Controller]

Execution of the above-mentioned automatic gradation correction can be designated from the controller 102. The processing flow in this case is substantially the same as that in FIG. 9, except that a test print image is described by PDL data, and operations are made at a control panel 351d of the controller 102 or the host computer 101.

FIGS. 22A to 22D show display examples on the control panel 351d of the controller when the automatic gradation correction is executed from the controller 102, and respectively correspond to those on the control panel 300d of the image forming apparatus 103 shown in FIGS. 10A to 10D. When displays corresponding to FIGS. 22A to 22D are made on the monitor of the host computer, execution of the automatic gradation correction can be designated from the host computer 101.

Figure 23:
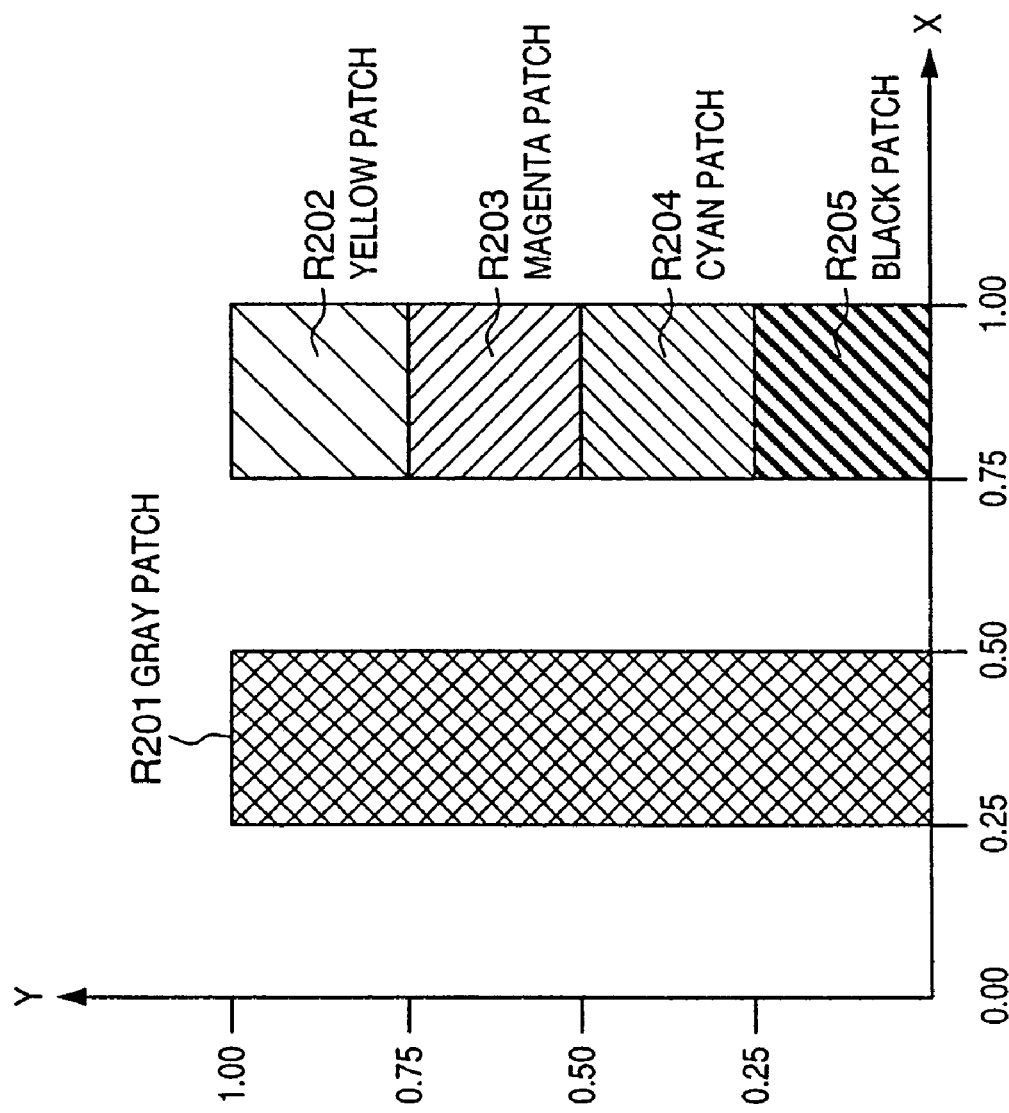
FIG. 23 shows an image example of test print 1 upon execution of automatic gradation correction from the controller 102.

FIG. 23 shows an image example of test print 1 upon executing the automatic gradation correction from the controller 102, and PDL data for forming this test print 1 has descriptions shown in FIG. 24. In FIG. 24, square_color describes the color of a rectangle in CMYK, the first to fourth parameters define the color inside the rectangle, and the fifth to eighth parameters define the color of the edge line of the rectangle. Also, Put_Square( ) describes the layout of the rectangle, the first and second parameters define the x- and y-coordinates of the lower left vertex of the rectangle, the third and fourth parameters the x- and y-coordinates of the upper right vertex of the rectangle, and the fifth parameter the thickness of the edge line.

The PDL data shown in FIG. 24 is prepared in advance in the ROM 351b of the controller 102. The PDL data is read out from the ROM 351b upon depression of a "test print 1" key shown in FIG. 22A, and is rasterized by the CPU 351a. After that, the raster image data is sent to the image forming apparatus 103. Similarly, PDL data corresponding to test print 2 is prepared in advance in the ROM 351b of the controller 102. The PDL data is read out from the ROM 351b upon depression of a "test print 2" key shown in FIG. 22C, and is rasterized by the CPU 351a. After that, the raster image data is sent to the image forming apparatus 103.

Figure 25:
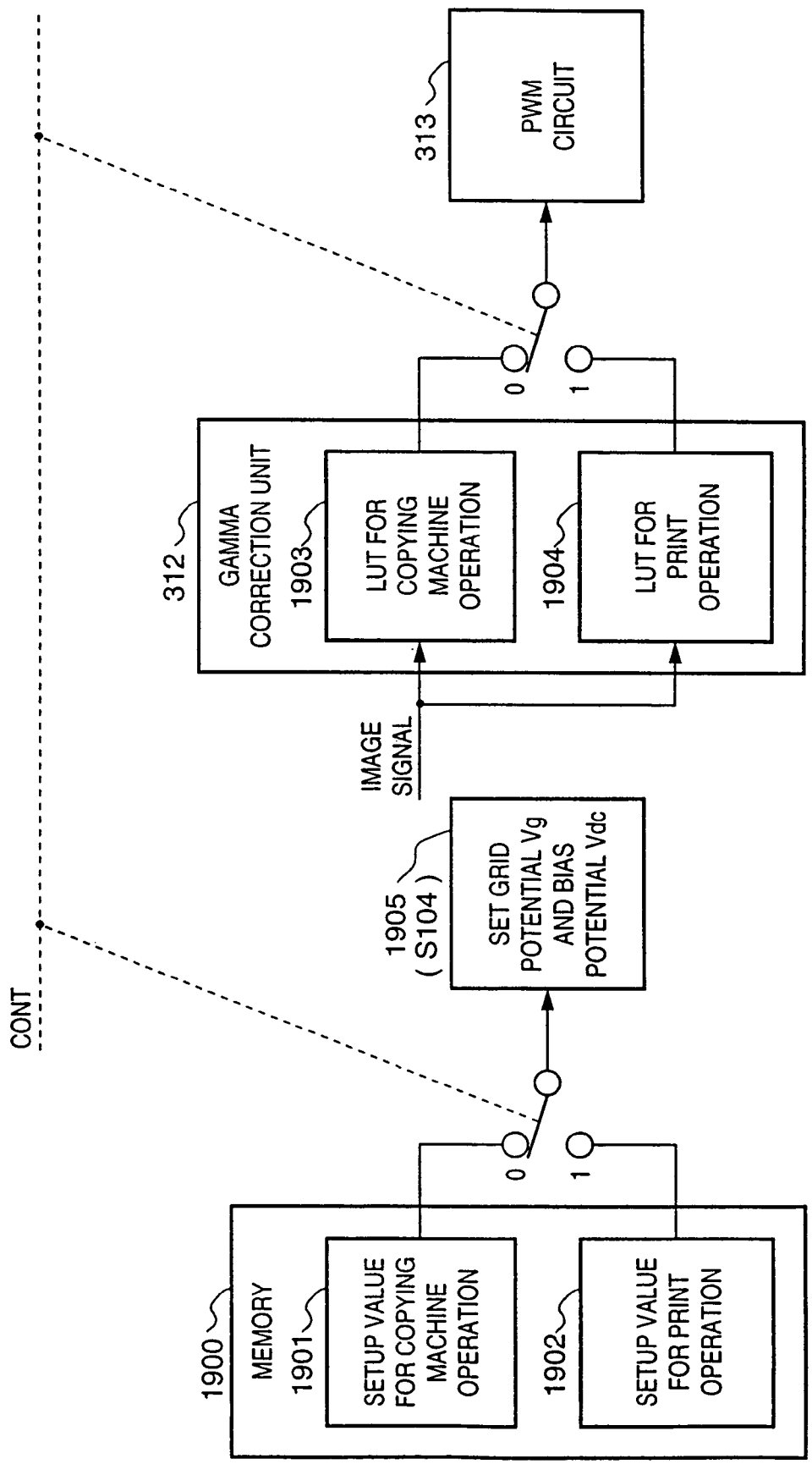
FIG. 25 is a diagram showing a memory and table that store the data obtained by the automatic gradation correction.

On the other hand, the setup values of the grid potential Vg and bias potential Vdc obtained by the automatic gradation correction sequence (see step S104 in FIG. 9) are distinguished from those obtained by performing the automatic gradation correction by the image forming apparatus 103 alone, and are stored in a RAM with a backup battery or a rewritable nonvolatile memory 1900 (FIG. 25). Similarly, the LUT that defines the gamma conversion characteristics obtained by the automatic gradation correction sequence (see step S108 in FIG. 9) is distinguished from the setup value obtained by performing the automatic gradation correction by the image forming apparatus 103 alone, and is stored in a RAM with a backup battery or a rewritable nonvolatile memory.

As shown in FIG. 25, in case of image formation by the image forming apparatus 103 alone, i.e., the copying machine operation, setup values 1901 of the grid potential Vg and bias potential Vdc, and an LUT 1903 for gamma conversion are selected to form an image. On the other hand, in case of image formation based on image data received from the controller 102, i.e., print operation, setup values 1902 of the grid potential Vg and bias potential Vdc, and an LUT 1904 for gamma conversion are selected to form an image. Such selection is attained based on a control signal CONT ("0" in the copying machine operation; "1" in the print operation) output from the CPU 300a.

[Table Switching Based on Determination Signal TEXT]

Figure 26:
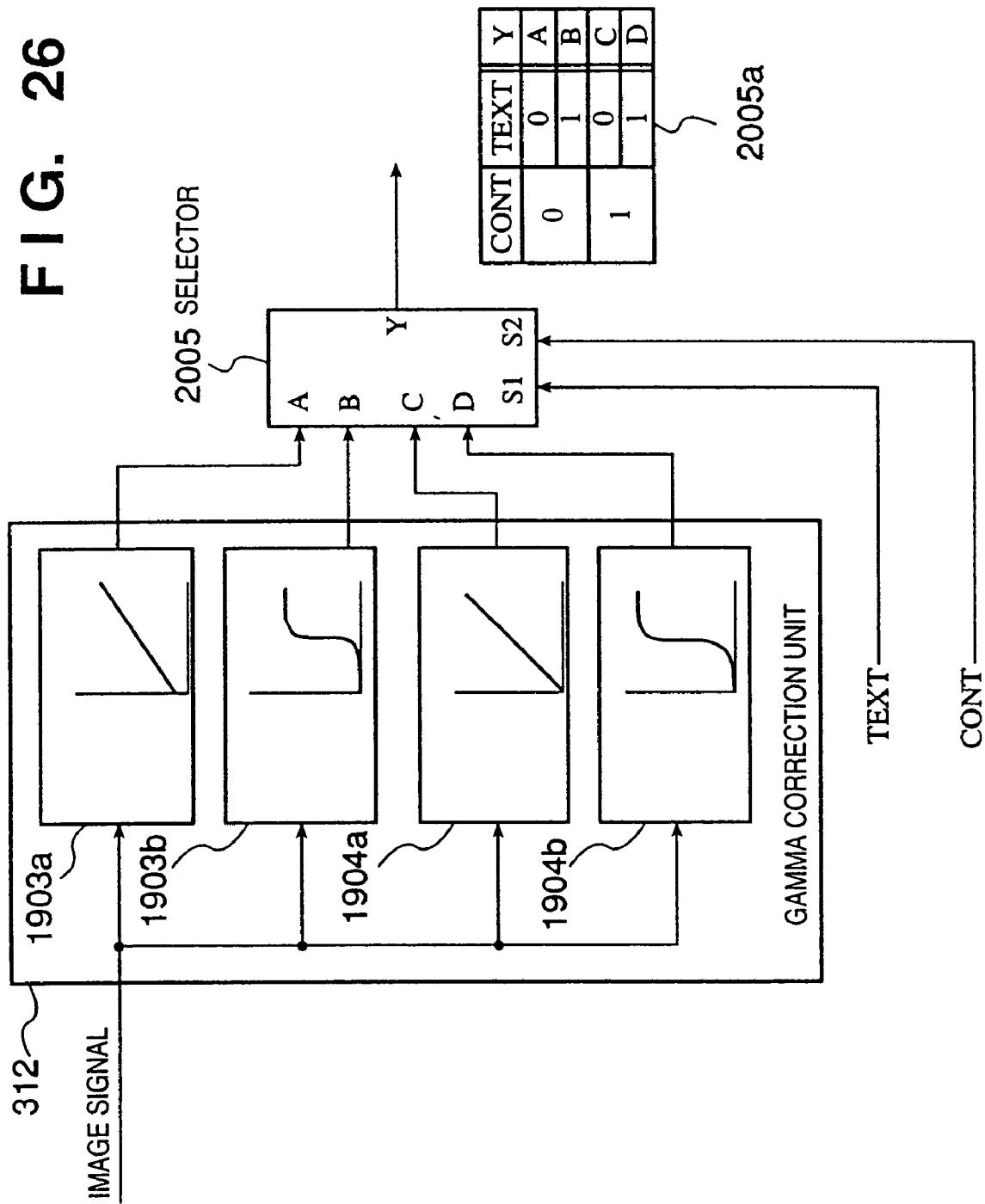
FIG. 26 is a diagram for explaining switching of a gamma conversion table in accordance with the determination signal TEXT.

Furthermore, the gamma conversion LUT of the gamma correction unit 312 is also selected based on the determination signal TEXT. That is, as shown in FIG. 26, a selector 2005 that selects the output from the gamma correction unit 312 receives the determination signal TEXT as a selection signal in addition to the aforementioned control signal CONT. The selector 2005 performs selection shown in a table 2005a in accordance with these signals. That is, the selector 2005 selects the output from a gamma conversion LUT 1903a which is suitable for the copying machine operation and attaches importance to gradation when CONT="0" and TEXT="0"; the output from a gamma conversion LUT 1903b which is suitable for the copying machine operation and attaches importance to resolution when CONT="0" and TEXT="1"; the output from a gamma conversion LUT 1903c which is suitable for the print operation and attaches importance to gradation when CONT="1" and TEXT="0"; and the output from a gamma conversion LUT 1903d which is suitable for the print operation and attaches importance to resolution when CONT="1" and TEXT="1".

Figure 14:
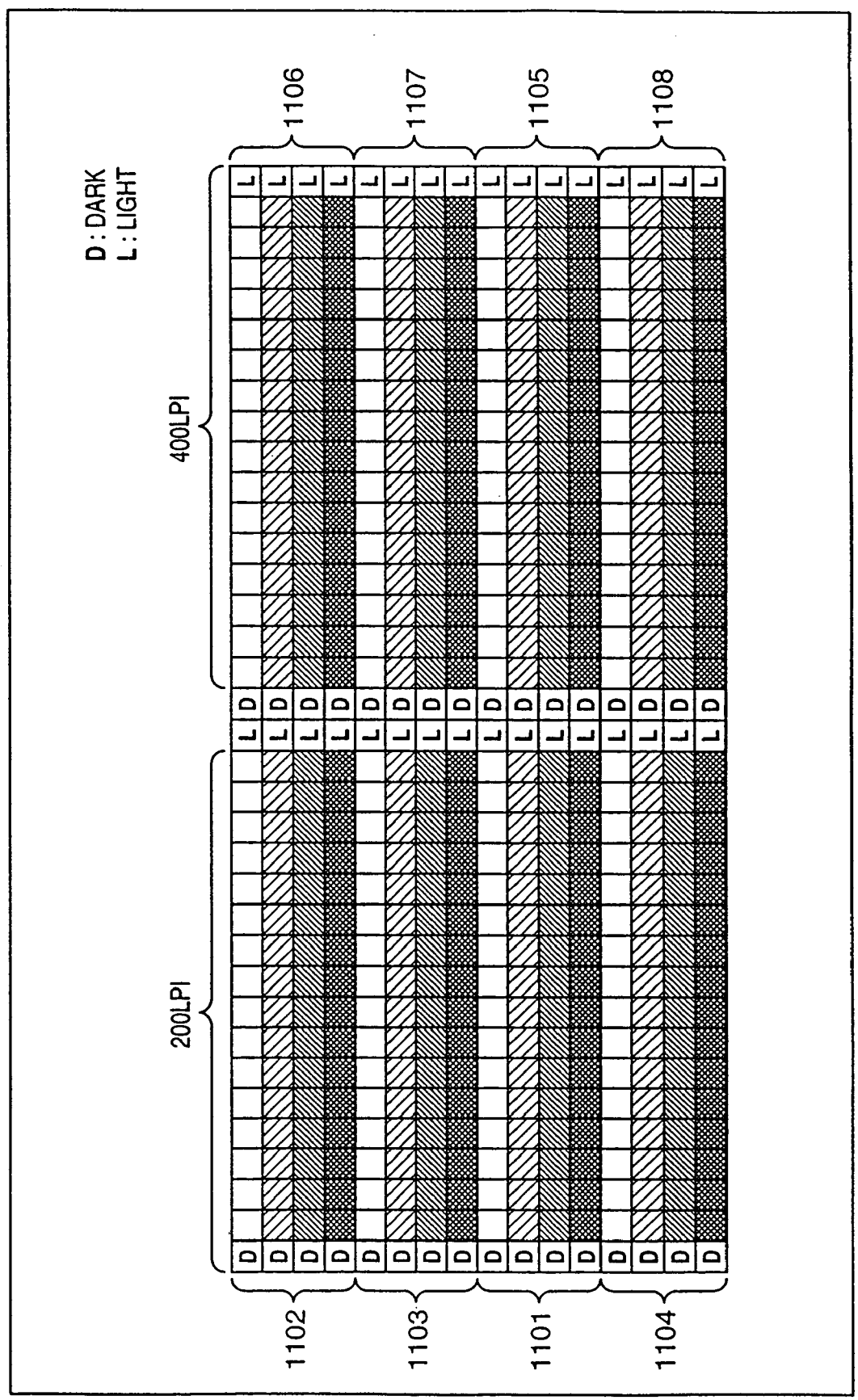
FIG. 14 shows an example of test print 2.

Such gamma conversion characteristics that respectively attach importance to gradation and resolution are obtained by outputting two different patch groups at 400 lines and 200 lines upon outputting test print 2 and reading them, as shown in FIG. 14. That is, the gamma conversion characteristics that attach importance to resolution are obtained from the 400-line patch group, and the gamma conversion characteristics that attach importance to gradation are obtained from the 200-line patch group.

Second Embodiment

An image processing apparatus according to the second embodiment of the present invention will be explained below. Note that the same reference numerals in this embodiment denote substantially the same parts as in the first embodiment, and a detailed description thereof will be omitted.

In this embodiment, in order to suppress changes in image density and gradation reproducibility and to obtain stable density and gradation reproducibility, the first control of the automatic gradation correction is done as in the first embodiment. As the second control of the automatic gradation correction, as for chromatic color image formation, toner density detection control for detecting and controlling the toner density of toner in each developer by a toner density sensor equipped in that developer is executed. On the other hand, as for black image formation, image density detection control for detecting and controlling the density of a test pattern formed on each photosensitive drum by the corresponding image density sensor 709 set at a position facing the photosensitive drum is executed. Furthermore, video count control for calculating and controlling the required toner amount from the signal levels in units of pixels sent from a video counter (not shown) is executed.

The image density detection control of the second embodiment will be described below.

The image density detection control is executed at a predetermined timing, and forms a patch image as a reference image for density detection on the photosensitive drum. The method of forming the patch image is the same as that in the first embodiment. The density of the patch is set at a value that most easily allows control of the developing characteristics. With the control to be described below, not only the image density but also the gradation reproducibility can be controlled to desired characteristics.

The actual image density of the patch image is detected using the image density sensor 709. The detected density of the patch image corresponds to the toner density of toner in the developer. Density difference is calculated by comparing an output signal $S_{(sig-K)}$ of the image density sensor 709, which represents the density of the patch image, and a reference signal $S_{(int-K)}$, and a signal $S_{(cal-K)}$ that represents the density difference is supplied to the CPU 300a. Control for replenishing toner to the developer is done in accordance with this signal $S_{(cal-K)}$. That is, when the signal $S_{(cal-K)}$ is large, i.e., when the density of the patch image is high, no toner is replenished; when the signal $S_{(cal-K)}$ is small, i.e., when the density of the patch image is low, toner is replenished in accordance with the value of the signal $S_{(cal-K)}$ thus converging the density of the patch image to the target value. As a result, the image density and gradation reproducibility are controlled.

However, the image density detection control can only be done once per image formation cycle. For this reason, control upon continuously forming an identical image is required. In the second embodiment, since the toner density detection control using reflected light is hardly applied to black toner, the control for replenishing toner to the developer is done by the video count control for obtaining a required toner amount by accumulating image signal levels in units of pixels.

Furthermore, a conversion gain $SUP_{(gain)}$ of the toner amount replenished by the video count control is corrected in accordance with the output signal $S_{(Sig-K)}$ of the image density sensor 709 in the image density detection control. More specifically, when the signal $S_{(sig-K)}$ is small, the patch image has a low density and, hence, the toner consumption amount for an identical output level decreases. For this reason, the gain $SUP_{(gain)}$ is decreased with decreasing signal $S_{(sig-K)}$. Conversely, the gain $SUP_{(gain)}$ is increased with increasing signal $S_{(sig-K)}$. With this control, an optimal amount of toner corresponding to the toner consumption amount can always be replenished.

Furthermore, in the second embodiment as well, in order to effectively apply the first control and second control in the automatic gradation correction, the parameters of the second control are adjusted on the basis of the result of the first control. Black image formation will be exemplified below.

In the image density control, a patch image is output at a predetermined optimal density to guarantee good gradation characteristics. A patch image signal output from the pattern generator is sent to the gamma conversion unit 312, and is gamma-converted to obtain a desired density. After that, the converted signal is sent to the PWM circuit 313 to form the patch image on the photosensitive drum.

The gamma conversion characteristics of the gamma correction unit 312 are appropriately changed under the first control, as described above. Hence, the density of the patch image formed on the photosensitive drum has been adjusted to a pre-set optimal density by executing the first control. In this case, a patch image is formed by the patch image signal gamma-converted by the new gamma conversion characteristics, and a density difference signal $S_{(cal-K)}$ obtained from a signal $S_{(sig-K)}$ that represents the density of that patch image, and a reference signal $S_{(int-K)}$ is saved in a memory as a correction value $S_{(adj-K)}$ of the reference signal. After that, the image density detection control is done using a new correction reference signal $S_{(aint-K)}$ obtained by adding/subtracting the correction value $S_{(adj-K)}$ to/from the reference signal $S_{(int-K)}$ as a density target value. As a result of this control, desired image density and optimal gradation characteristics that had been obtained by correction by the first control can be maintained using the image density detection control.

Furthermore, after the first control, since the new correction reference signal $S_{(aint-K)}$ obtained by adding/subtracting the correction value $S_{(adj-K)}$ to/from the reference signal $S_{(int-K)}$ is set as the density target value, the conversion gain $SUP_{(gain)}$ of the video count control is restored to an initial value. In this fashion, desired image density and optimal gradation characteristics that had been obtained by correction by the first control can be maintained using the toner density detection control.

As described above, in the second embodiment as well, the image density and gradation reproducibility are controlled by the first control according to the present invention, and are also controlled by the second control. Furthermore, by adjusting the second control based on the result of the first control, a full-color image with a stable image density and gradation reproducibility can be formed.

To recapitulate, the image forming apparatus 103 of the first or second embodiment has the first control for controlling the image density and gradation reproduction characteristics of an output image by forming constant density patterns of a plurality of colors and gradation patterns of a plurality of colors on a recording paper sheet without gamma correction processing, and correcting the contrast voltage and the conversion characteristics for gradation control on the basis of signals obtained by reading these density and gradation patterns, and the second control for controlling the image density and gradation reproduction characteristics by forming a reference density pattern of each color on a photosensitive body, and setting the density of the reference density pattern detected from light reflected by the reference density pattern to be a target value of the toner density control that controls the toner density by replenishing toner on the basis of the detection result of the toner density of each color toner. Hence, one or both of the density target value of the reference pattern on the photosensitive body and the target value of the toner density control are adjusted on the basis of the result of the first control, thereby correcting short- and long-term variations of the image density and gradation reproducibility, and various other variations of image density and gradation reproducibility, thus standardizing the density and gradation reproducibility of a copy image and print image.

Furthermore, since gradation correction can be made in each of the copying machine operation and print operation in accordance with their attribute signals (determination signal TEXT), the image density and gradation characteristics can be reproduced more faithfully.

Third Embodiment

An image processing apparatus according to the third embodiment of the present invention will be described below. Note that the same reference numerals in this embodiment denote substantially the same parts as in the first embodiment, and a detailed description thereof will be omitted.

Automatic gradation correction performed by the controller 102 as the third embodiment will be explained below.

Figure 27:
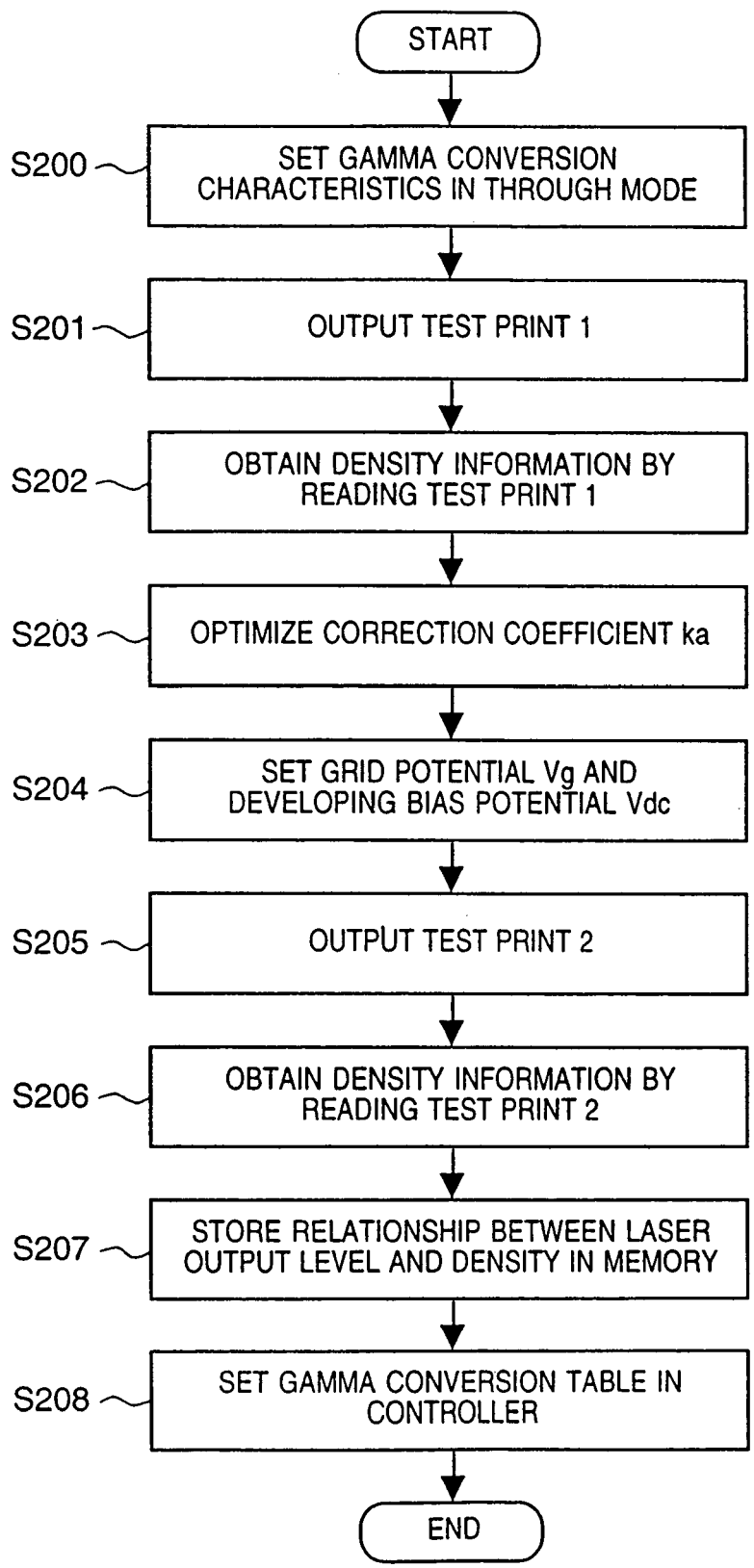
FIG. 27 is a flow chart showing the processing sequence of automatic gradation correction from a controller according to the third embodiment of the present invention.

FIG. 27 is a flow chart showing the processing sequence of the automatic gradation correction from the controller 102. Note that display examples on the control panel 351*d* are shown in FIGS. 22A to 22D as in the first embodiment.

In step S200, the conversion table of the gamma correction unit 312 is switched to a through-pass table that directly outputs the input signal. The reason why the through-pass table is selected is to entrust the controller 102 with the gradation correction, and to prevent color occlusion in dark portions and missing gradation in highlight portions, since they may be produced if gamma conversion is done by both the gamma conversion table of the controller 102 and that of the gamma correction unit 312. Hence, if such problems are negligible, the through-pass table need not be used. Note that a through-pass table is also set to the gamma correction unit 312 in printing from the controller 102 as in the automatic gradation correction.

As the subsequent steps S201 to S207 are the same as those in the first embodiment, a detailed description thereof will be omitted. Note that R, G and B image data is obtained by reading the test print in the steps S202 and s206, and the optimization processing of the correction coefficient in step S203 and the setup processing of the grid potential Vg and bias potential Vdc in step S204 can be replaced by the values described in the "first automatic gradation correction" and "second automatic gradation correction" by approximation.

Hence, if the sequences of the "first automatic gradation correction" and "second automatic gradation correction" are executed first, the processing in steps S201 to S204 may be omitted as in the flow chart shown in FIG. 28.

Figure 29A:
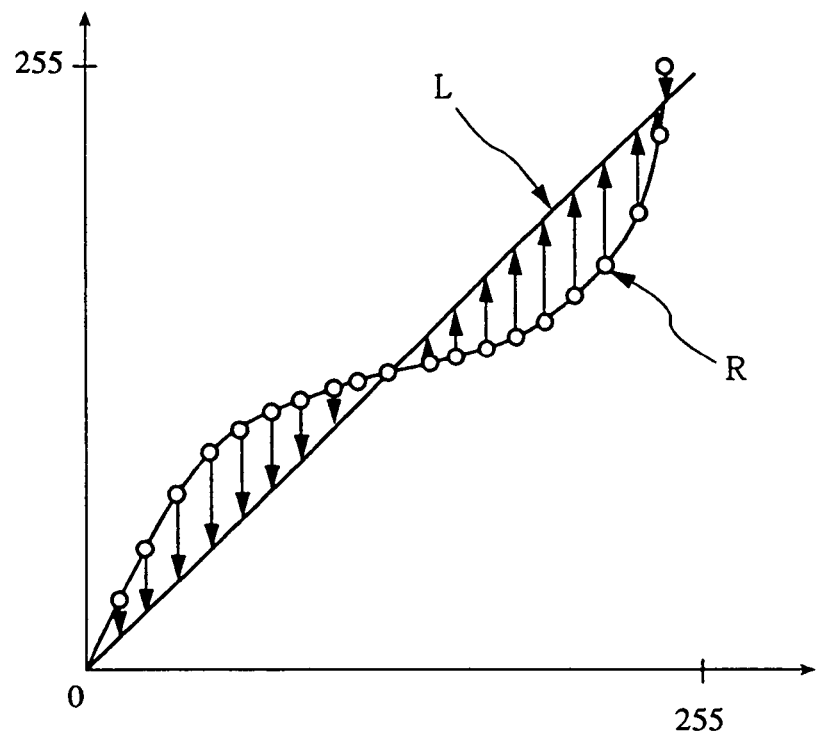
FIGS. 29A and 29B are graphs for explaining the method of generating a gamma conversion table set in the controller of the third embodiment.
Figure 29B:
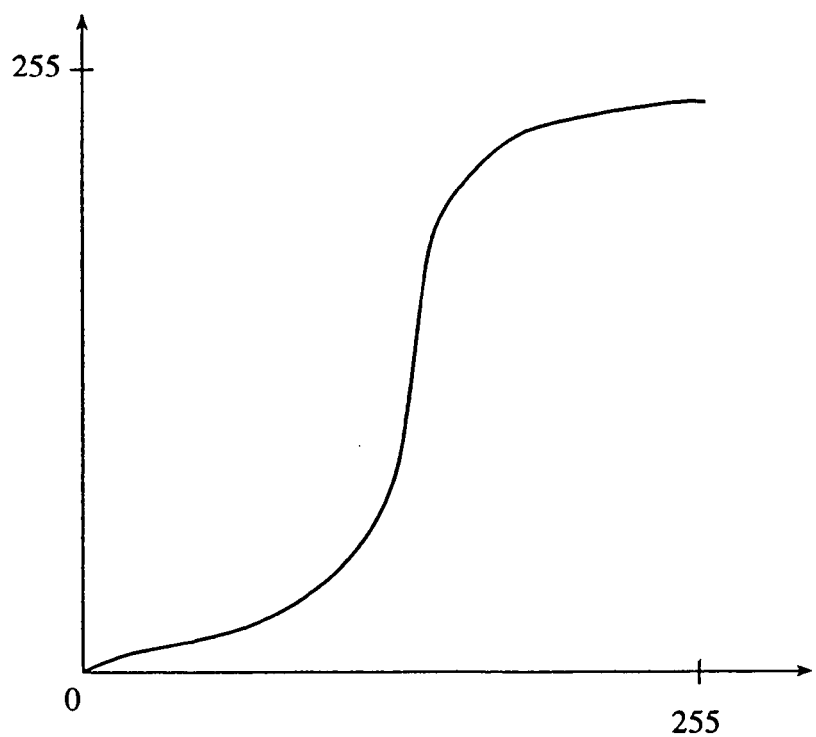

R, G, and B image data obtained from test print 2 are stored in the DRAM 352, and are converted into C, M, Y, and K image data. Instep S208, the CPU 351a samples some of patch groups of test print 2 shown in FIG. 14, and calculates a characteristic curve R shown in FIG. 29A from the sampled image data after the sampled image data are averaged. The CPU 351a then sets gamma conversion characteristics to obtain ideal characteristics (linear characteristics) L. The gamma conversion characteristics for converting the curve R to the line L are defined by a curve shown in FIG. 29B, and a table corresponding to this curve is a gamma conversion table of the controller 201.

The correction coefficient ka, the grid potential Vg, the developing bias Vdc and the gamma correction table are stored into the hard disk 354 as a set of calibration data used in the calibration.

The calibration data stored in the hard disk 354 is loaded from the hard disk 354 onto the RAM 351c upon power ON of the controller 102. The CPU 351a gamma-corrects image data to be sent to the image forming apparatus 103 using the gamma conversion table included in the calibration data which is loaded onto the RAM 351c. Consequently, the grid potential Vg and the developing bias Vdc is instructed to the image forming apparatus 103 by the CPU 351a before image forming, and the calibrated image data are sent from the controller 102 to the image forming apparatus 103.

To restate, according to this embodiment, the same effects as in the first and second embodiments can be obtained by the calibration processing which is led by the controller 102, and calibration suitable for the image forming system can be attained using the reader/scanner attached to the color copying machine without using any expensive densitometer.

Fourth Embodiment

The image processing apparatus of the third embodiment added a calibration function corresponding to color samples will be described below as the fourth embodiment of the present invention. Note that the same reference numerals in this embodiment denote substantially the same parts as in the first to third embodiments, and a detailed description thereof will be omitted.

Color patches called color samples or color chips are known, and SWOP, DIC, EURO, and the like are popular color samples. In addition, color samples unique to the user may be used. Many users want printouts having colors according to such color samples; it is convenient for such users if calibration corresponding to these color samples can be done.

Figure 31A:
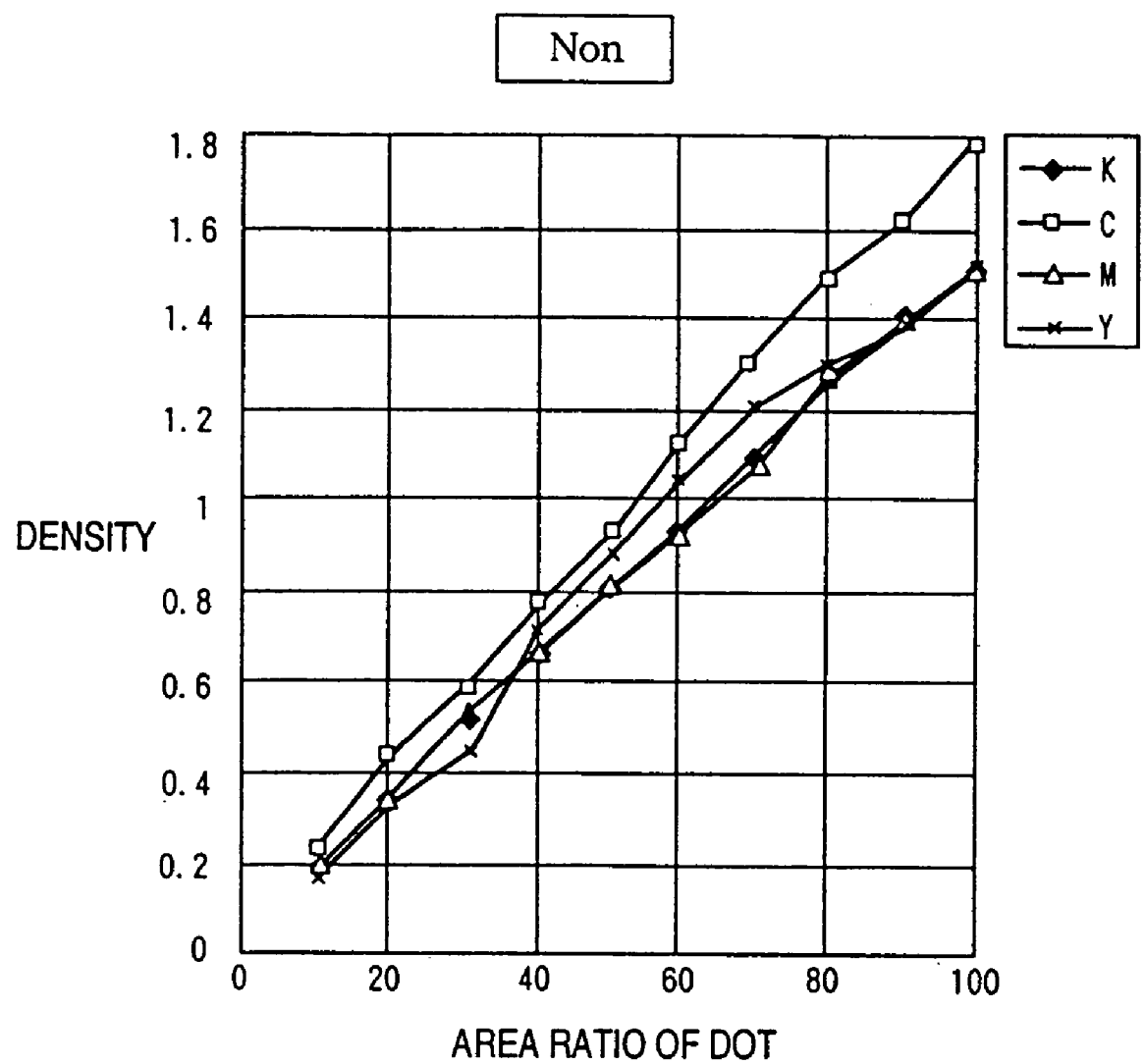
FIG. 31A is a graph showing the density characteristics obtained when the output from the controller is not adjusted in correspondence with a color sample.
Figure 31B:
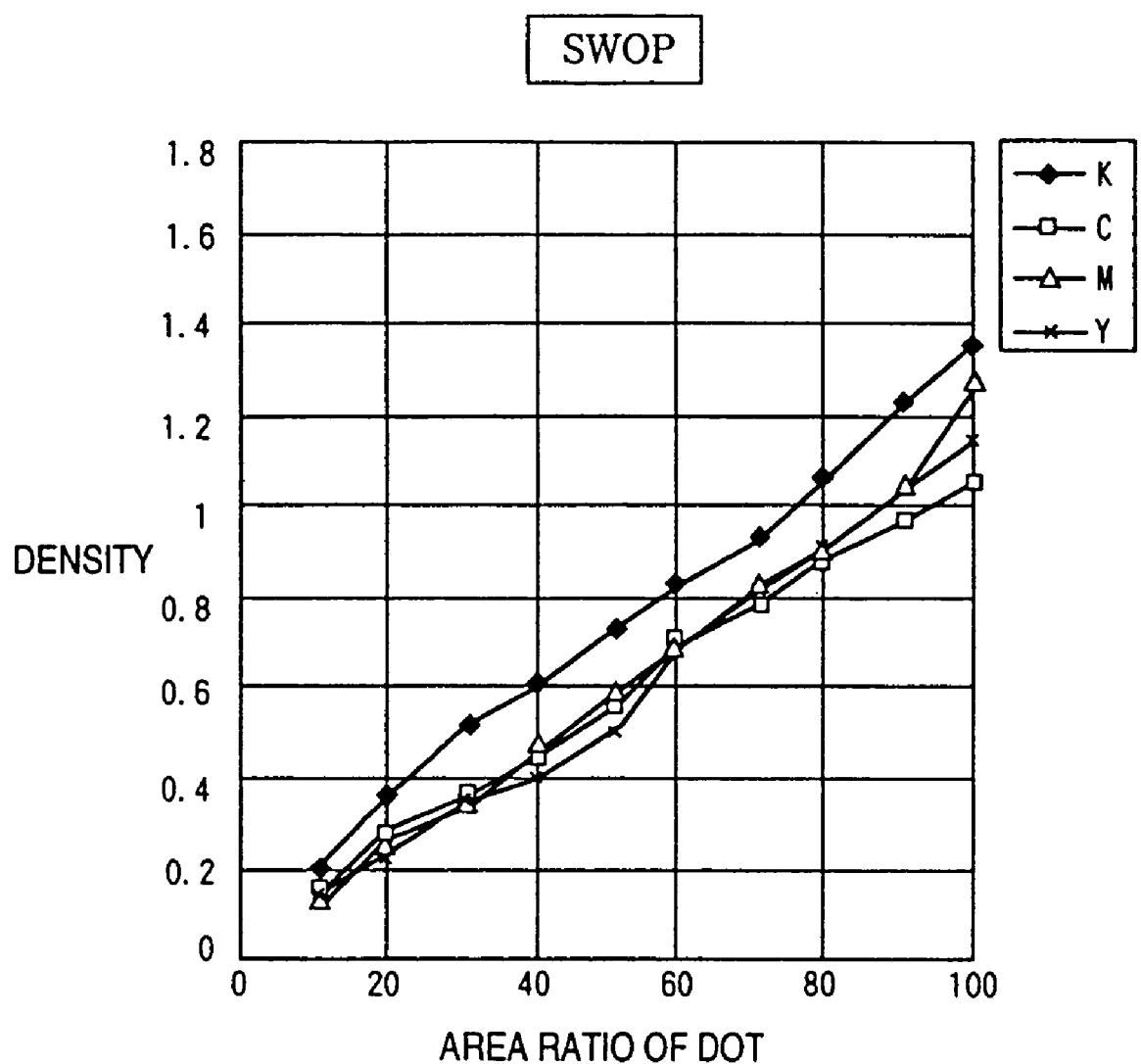
FIG. 31B is a graph showing the density characteristics obtained when the output from the controller is adjusted in correspondence with an SWOP color sample.
Figure 31C:
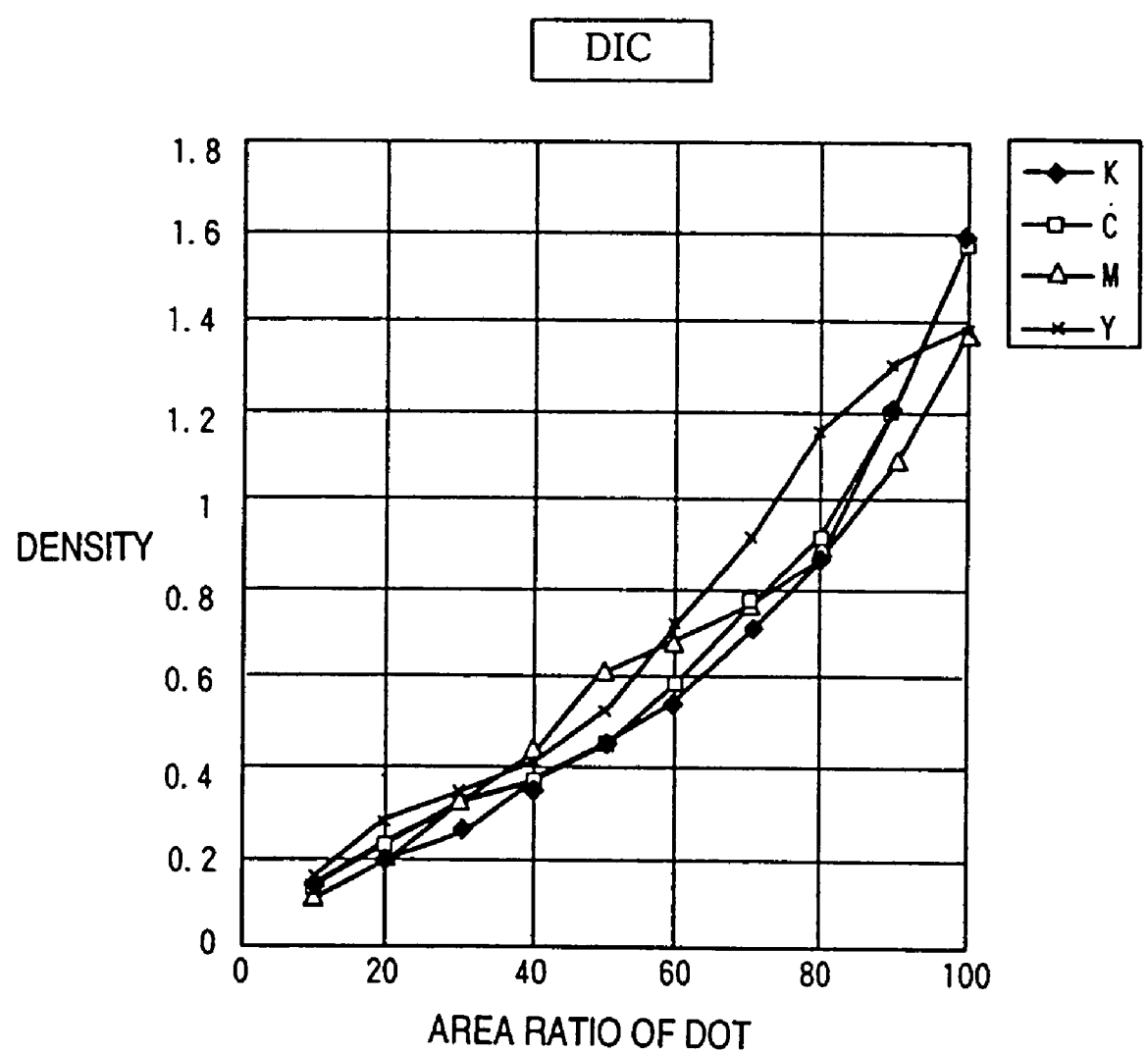
FIG. 31C is a graph showing the density characteristics obtained when the output from the controller is adjusted in correspondence with a DIC color sample.
Figure 31D:
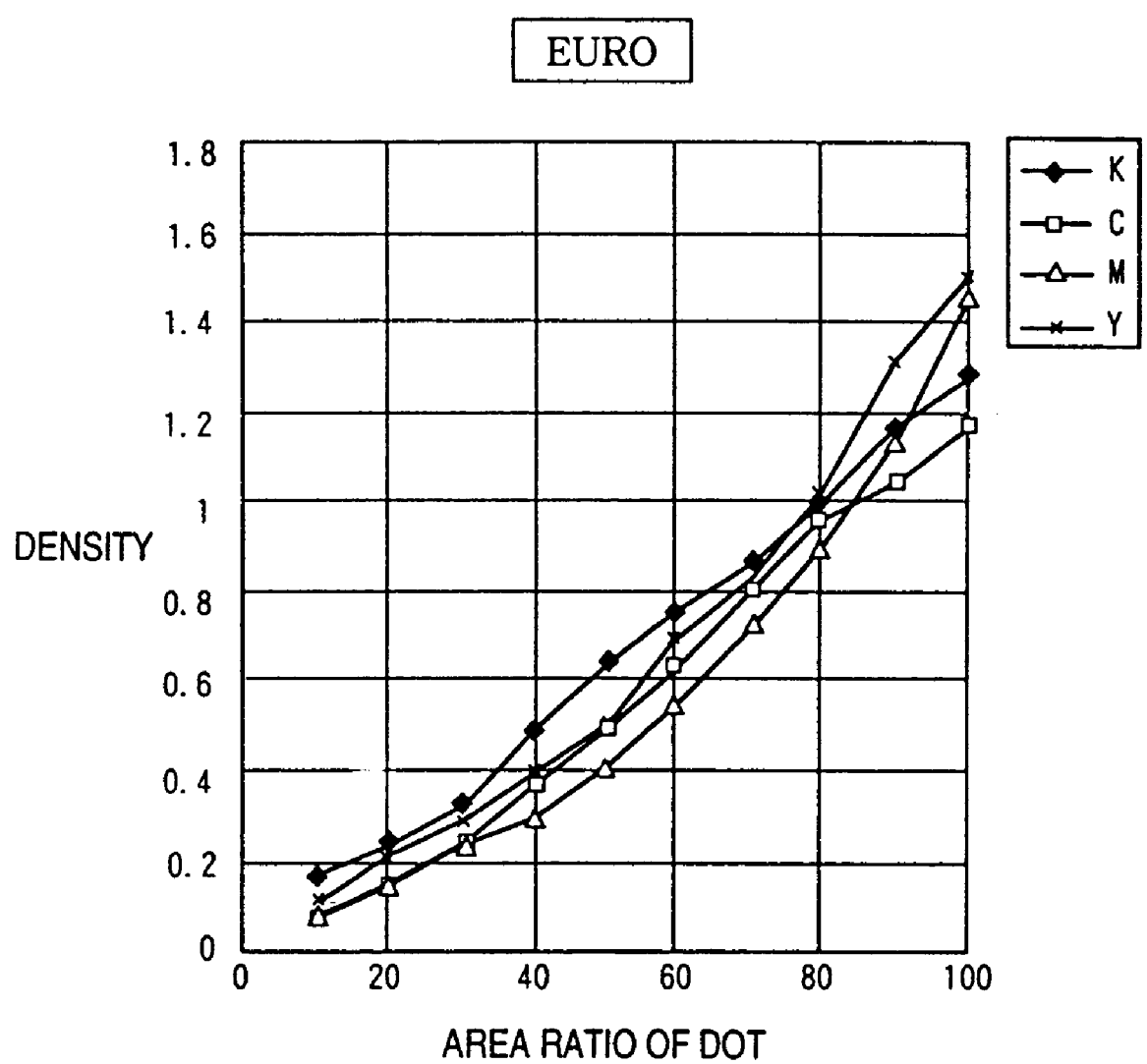
FIG. 31D is a graph showing the density characteristics obtained when the output from the controller is adjusted in correspondence with a EURO color sample.

Results obtained by adjusting a color signal output from the controller 102 in correspondence with the color samples so that the area ratio representing the relative area of a dot pattern falls within the range from 10% to 100% in 10%-steps, and measuring print results using a standard densitometer are presented below. Note that FIG. 31A shows the density characteristics when the output from the controller 102 is not adjusted in correspondence with the color samples.

FIGS. 31B to 31E show the density characteristics adjusted in correspondence with color samples: SWOP color samples (FIG. 31B), DIC color samples (FIG. 31C), EURO color samples (FIG. 31D), and CUSTOM color samples (FIG. 31E), i.e., those unique to the user.

Figure 32A:
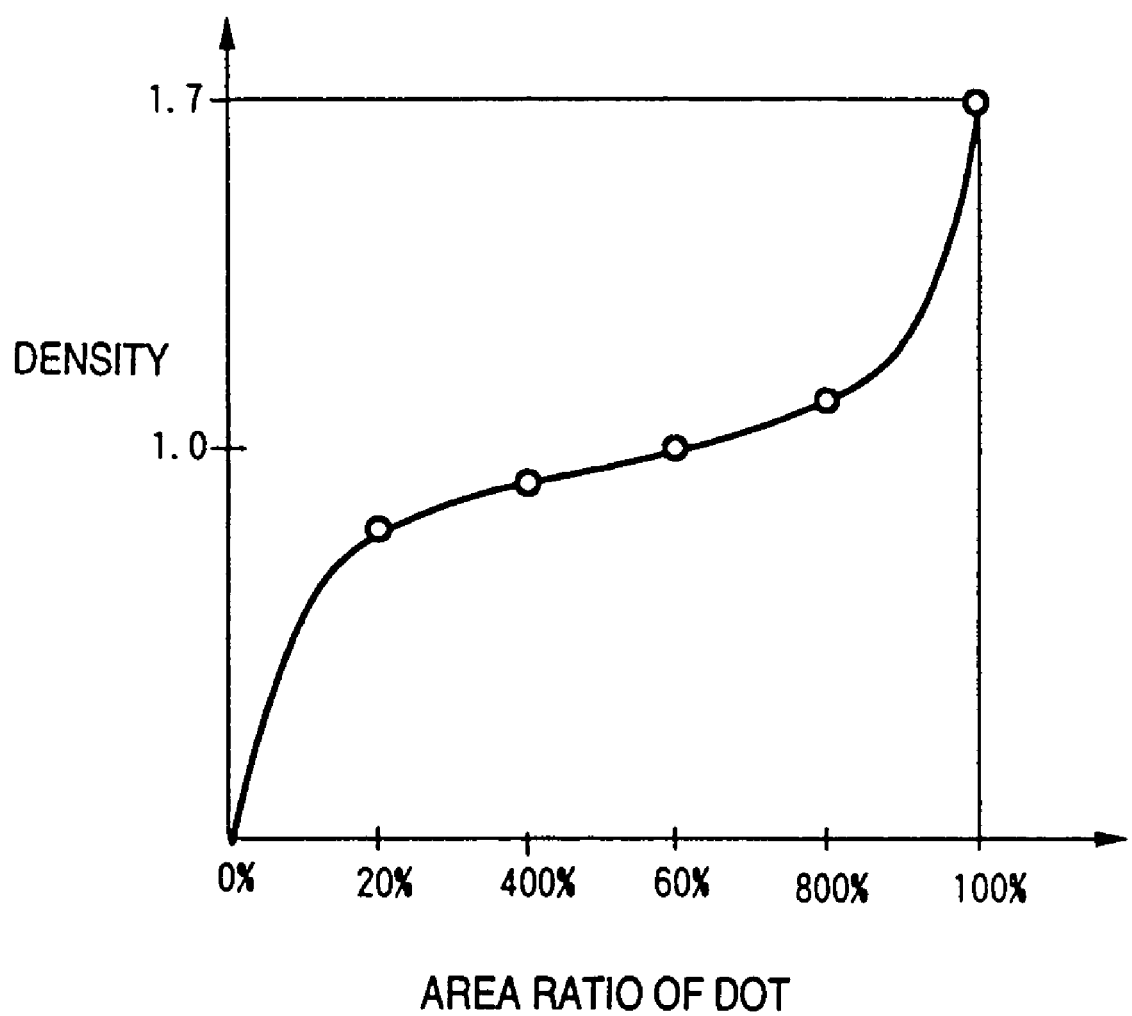
FIG. 32A is a graph showing an example of the relationship between the area ratio and density of a dot pattern.

Based on these measurement results, the relationship between the maximum density and gamma table can be determined. That is, a contrast potential Vcont is adjusted so that the same color tone as that obtained when the area ratio of a dot pattern in the color sample is 100% is expressed at a maximum density at the area ratio=100% of the dot pattern. As a result, the relationship between the area ratio of the dot pattern and density shown in, e.g., FIG. 32A, is obtained. A gamma table at that time is expressed as shown in FIG. 32B, i.e., a conversion table having characteristics opposite to those shown in FIG. 32A is obtained.

Conversion tables which are obtained in such way and have the conversion characteristics corresponding to the color samples are pre-stored in the hard disk 354, ROM 351b, ROM 300b, or a storage medium in the computer 101 using, e.g., color sample names as indices.

Figure 33A:
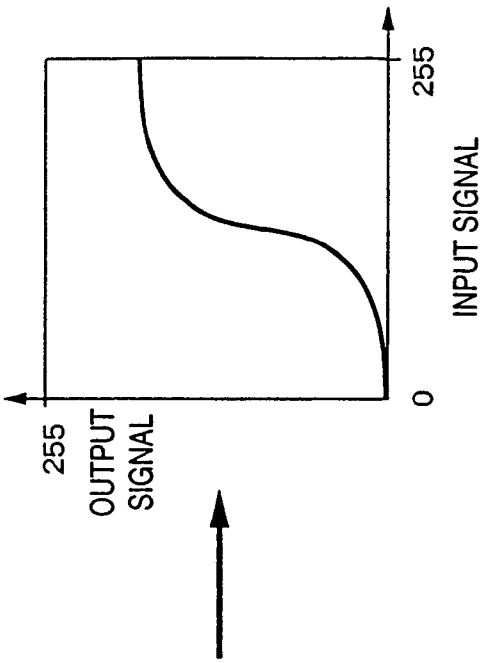
FIGS. 33A to 33C is a view for explaining the processes of synthesizing gamma tables.
Figure 33B:
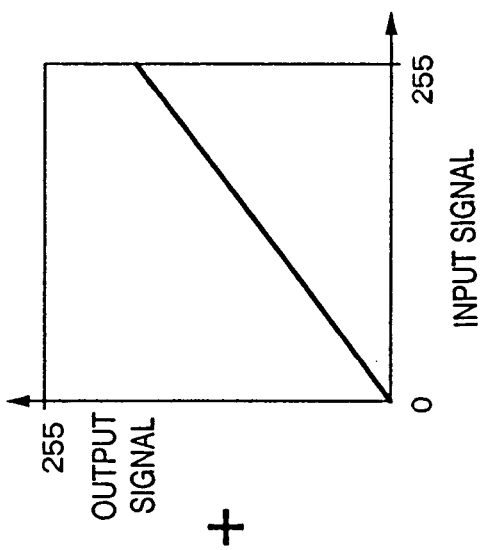
Figure 33C:
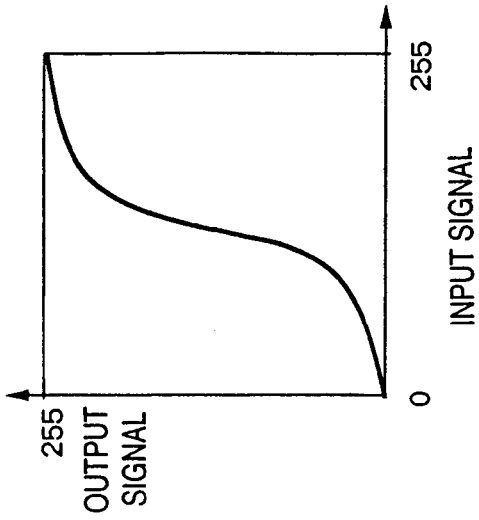

On the other hand, when the gamma table of the controller 102 is as shown in FIG. 33A, and the gamma table of the printer alone is as shown in FIG. 33B, these two characteristics can be synthesized to obtain a single gamma table shown in FIG. 33C. That is, if one of the controller 102 and printer has a gamma table obtained by synthesizing two characteristics in place of their independent gamma tables, gradation expression that can suppress errors can be attained, and high-quality images can be obtained.

Hence, when the arrangement of the gamma conversion LUT of the gamma correction unit 312 shown in FIG. 26 is modified to that shown in FIG. 34, and a gamma table (FIG. 33C) corresponding to the color sample is set as an LUT 1904a or 1904b via a selector 2006 on the basis of a selection signal that designates to select no color sample (Non), SWOP, DIC, EURO, or CUSTOM, a printout with a color tone corresponding to the color sample that the user desired can be provided.

Note that FIG. 34 shows an arrangement for setting the conversion table having the characteristics corresponding to the color sample by the selector 2006. Alternatively, the CPU 351a or 300a may set the conversion table of the LUT 1904a or 1904b on the basis of a conversion table read out from the hard disk 354, ROM 351b, or ROM 300b, or supplied from the computer 101.

With this arrangement, according to this embodiment, when calibration is done in correspondence with standard color samples such as SWOP, DIC, EURO, or the like that the user desired upon outputting an image signal from the controller 102, a printout with a color tone corresponding to the color samples that the user desired can be obtained, by performing the calibration described in the first to third embodiments, which targets the above color sample such as Non, SWOP, DIC, EURO or CUSTOM. Furthermore, when a plurality of calibration tables (gamma tables) are combined into one table, and an image signal is subjected to table processing only once, a high-quality image can always be printed out while suppressing deterioration of the image quality.

Note that in a case where the image forming apparatus having a gamma correction table described in the first or second embodiment is applied to the fourth embodiment, a target of calibration performing by the image forming apparatus is corresponded to any one of the color samples.

Modification of Embodiments

Figure 30A:
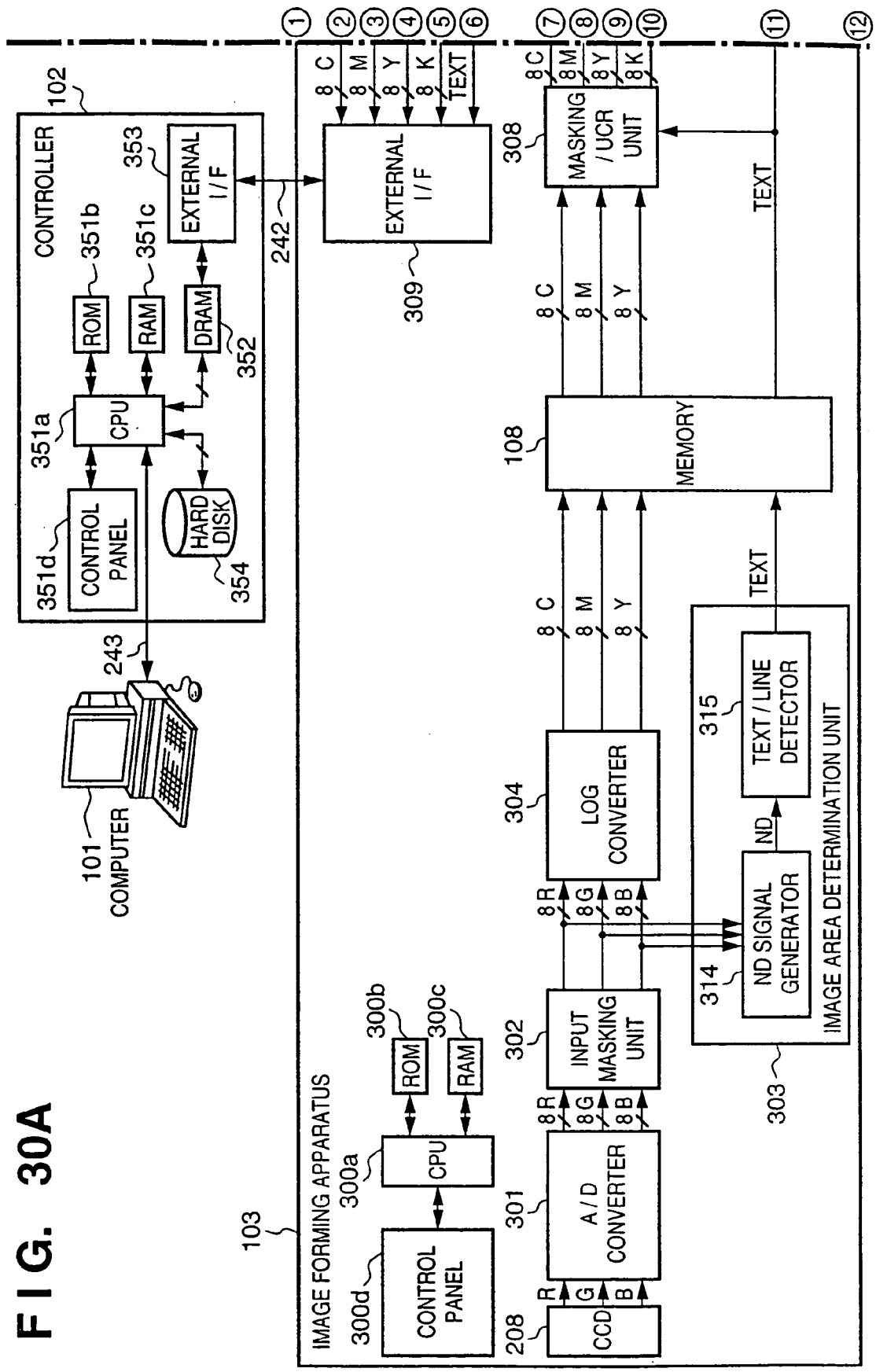
FIGS. 30A and 30B is a block diagram showing a modification of an image forming unit according to the respective embodiments of the present invention.
Figure 30B:
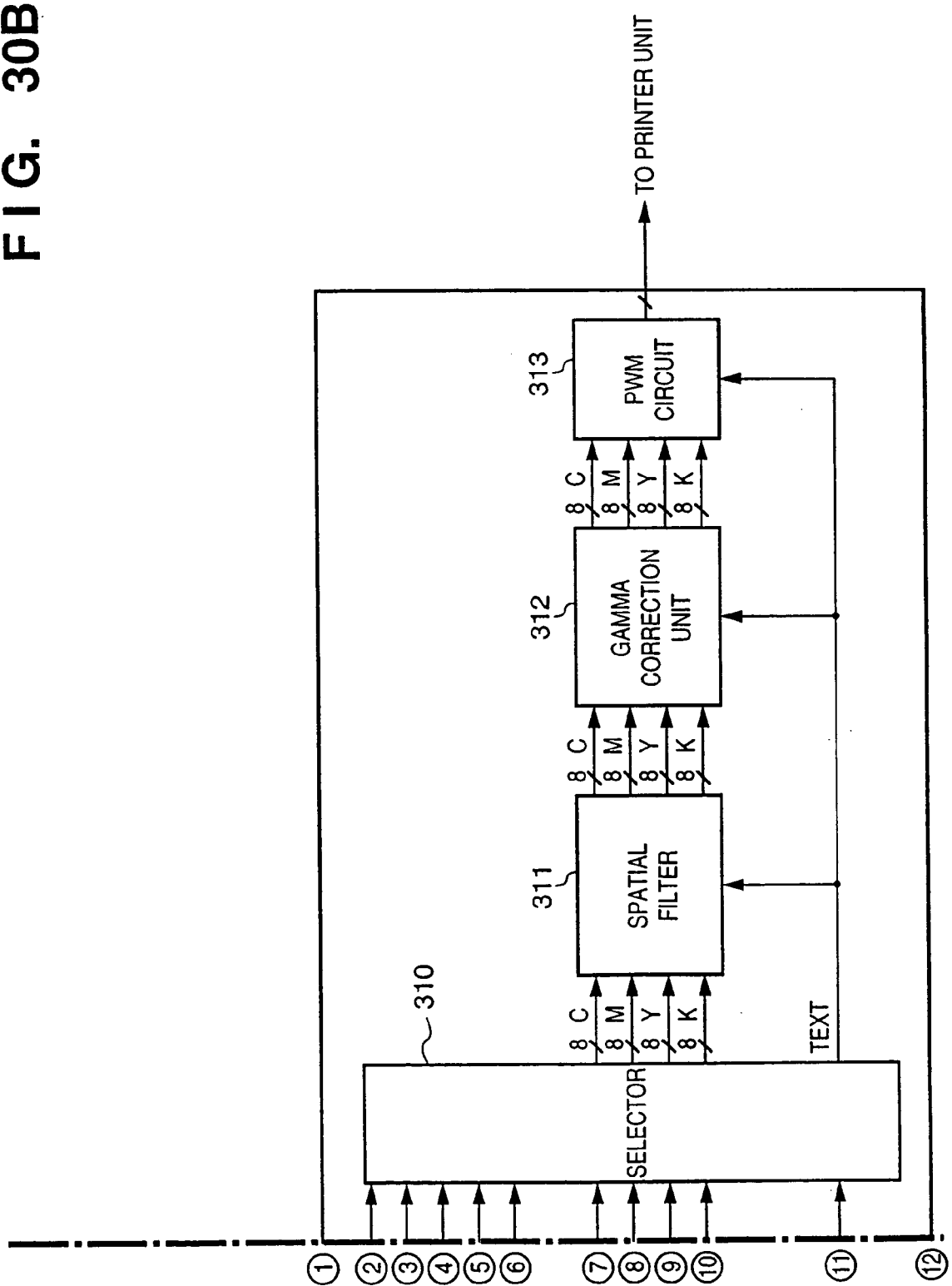

In the calibration processing of each of the above embodiments, the reading operation of the test print by the scanner of the image forming apparatus 103 may obtains C, M, Y, and K data. FIGS. 30A and 30B shows the arrangement of the image forming apparatus in such case. In FIGS. 30A and 30B, R, G, and B data read by the scanner from the test print upon scan operation are converted into C, M, and Y data by the LOG converter 304, and the C, M, and Y data are input to the memory 108. Then, these image data are converted into C, M, Y, and K data by the masking/UCR unit 308, and the converted image data are sent to the controller 102 via the selector 310 and external interface 309.

In such case, in the arrangement shown in FIGS. 30A and 30B, the compression circuit 305 and expansion circuit 307 are omitted not to distort image data by data compression. However, if lossless compression is used, data compression may be performed. In FIGS. 30A and 30B, data are temporarily stored in the memory 108 even in the scan operation in consideration of the copying machine operation, but C, M, and Y data after LOG conversion may be directly input to the masking/UCR unit 308.

As many apparently widely different embodiments of the present invention can be made without departing from the spirit and scope thereof, it is to be understood that the invention is not limited to the specific embodiments thereof except as defined in the appended claims.

OTHER EMBODIMENT

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment/embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment/embodiments are realized by executing the program codes which are read by a computer, the present invention includes a case where an OS (operating system) or the like working on the computer performs a part or entire processes in accordance with designations of the program codes and realizes functions according to the above embodiment/embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment/embodiments.

What is claimed is:

1. An image processing method, comprising the steps of:
    storing conversion properties to realize a plurality of standard color representations which include at least SWOP colors;
    selecting one of the conversion properties; and
    converting image data using the selected conversion property; and
    controlling a contrast potential of a printer, which forms an image represented by the image data, to control a maximum density of the printer when the plurality of standard color representations are realized by using a measuring value which is measured from a print printed by the printer.

2. The method according to claim 1, wherein the plurality of standard color representations further include DIC colors and EURO colors.

3. The method according to claim 1, wherein the conversion properties are stored in a hard disk of a printer controller, or are provided from a computer which outputs the image data to be converted.

4. An image processing apparatus, comprising:
    an obtaining section, arranged to obtain conversion properties to realize a plurality of standard color representations which include at least SWOP colors;
    a selector, arranged to select one of the conversion properties;
    a converter, arranged to convert image data using the selected conversion property; and
    a controller, arranged to control a contrast potential of a printer engine, which forms an image represented by the image data, to control a maximum density of the printer engine when the plurality of standard color representations are realized by using a measuring value which is measured from a print printed by the printer engine.

5. The apparatus according to claim 4, wherein the plurality of standard color representations further include DIC colors and EURO colors.

6. The apparatus according to claim 4, wherein the conversion properties are stored in a hard disk of a printer controller, or a hard disk of a computer which outputs the image data to be converted.

* * * * *

UNITED STATES PATENT AND TRADEMARK OFFICE
CERTIFICATE OF CORRECTION

PATENT NO. : 7,130,082 B2  
APPLICATION NO. : 10/704804  
DATED : October 31, 2006  
INVENTOR(S) : Hiroyuki Takahashi Page 1 of 1

It is certified that error appears in the above-identified patent and that said Letters Patent is hereby corrected as shown below:

COLUMN 20:
Line 23, "instep" should read --in step--.
Line 33, "Instep" should read --In step--.

COLUMN 24:
Line 62, "s206," should read --S206,--.

COLUMN 25:
Line 7, "Instep" should read --In step--.
Line 40, "added" should read --adding--.

COLUMN 26:
Line 59, "performing" should read --performed--.
Line 65, "may" should be deleted.

COLUMN 27:
Line 10, "not" should read --so as not--.

Signed and Sealed this

Thirty-first Day of July, 2007

JON W. DUDAS  
*Director of the United States Patent and Trademark Office*